US011008216B2

United States Patent
Enomura et al.

(10) Patent No.: US 11,008,216 B2
(45) Date of Patent: May 18, 2021

(54) PRECISE MODIFYING METHOD FOR FINE PARTICLE DISPERSION LIQUID

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 16/074,645

(22) PCT Filed: Feb. 1, 2017

(86) PCT No.: PCT/JP2017/003669
§ 371 (c)(1),
(2) Date: Aug. 1, 2018

(87) PCT Pub. No.: WO2017/135326
PCT Pub. Date: Aug. 10, 2017

(65) Prior Publication Data
US 2019/0031508 A1 Jan. 31, 2019

(30) Foreign Application Priority Data

Feb. 2, 2016 (JP) .............................. JP2016-018434
Feb. 2, 2016 (JP) .............................. JP2016-018435
Nov. 29, 2016 (WO) ................... PCT/JP2016/085460

(51) Int. Cl.
*C01B 13/36* (2006.01)
*C01G 49/06* (2006.01)
(Continued)

(52) U.S. Cl.
CPC ............. *C01B 13/36* (2013.01); *B01F 3/1214* (2013.01); *B01F 3/2261* (2013.01); *C01B 13/14* (2013.01);
(Continued)

(58) Field of Classification Search
CPC ......... C01B 13/16; C01B 13/36; C01B 13/14; C01P 2004/04; C01P 2004/654;
(Continued)

(56) References Cited

U.S. PATENT DOCUMENTS 3,630,952 A * 12/1971 Nielsen ..................... C09C 1/28
106/14.34
5,792,434 A * 8/1998 Ferlings ................. B01D 29/01
422/275

(Continued)

FOREIGN PATENT DOCUMENTS

EP        2610215 A1      7/2013
JP       63166422 A  *   7/1988   ........ B01F 15/00954
(Continued)

OTHER PUBLICATIONS

English Translation of JP 2012206933; Inv: Watanabe; Publication Date: Oct. 2012.*

(Continued)

*Primary Examiner* — Joseph C Rodriguez
(74) *Attorney, Agent, or Firm* — Birch, Stewart, Kolasch & Birch, LLP

(57) ABSTRACT

A method for modifying a fine particle dispersion liquid has excellent dispersibility and dispersion stability. In this method for modifying a fine particle dispersion liquid having improved fine particle dispersibility, impurities included in an agglomeration of fine particles contained in the fine particle dispersion liquid are released into the dispersion liquid by applying physical energy to the agglomeration and performing dispersion processing for dispersion into particles that are smaller than the agglomeration of fine particles. The impurities are removed from the dispersion liquid (Continued)

by means of a removal unit provided with a filtration membrane before reagglomeration is caused by the impurities.

10 Claims, 17 Drawing Sheets

(51) Int. Cl.
*C01G 49/00* (2006.01)
*C01G 9/02* (2006.01)
*C01B 13/14* (2006.01)
*B01F 3/12* (2006.01)
*B01F 3/22* (2006.01)
*C01B 13/16* (2006.01)

(52) U.S. Cl.
CPC .............. *C01B 13/16* (2013.01); *C01G 9/02* (2013.01); *C01G 49/00* (2013.01); *C01G 49/06* (2013.01); *B01F 2003/125* (2013.01); *C01P 2002/84* (2013.01); *C01P 2004/04* (2013.01); *C01P 2004/64* (2013.01)

(58) Field of Classification Search
CPC .. C01P 2002/84; B01F 3/1214; B01F 3/2261; C01G 49/00; C01G 49/06; C01G 9/02
See application file for complete search history.

(56) References Cited

U.S. PATENT DOCUMENTS

| 5,891,565 | A | * | 4/1999 | Watanabe | B01J 13/0008 |
|---|---|---|---|---|---|
| | | | | | 106/286.2 |
| 6,376,168 | B1 | | 4/2002 | Kawanishi | |
| 9,005,567 | B2 | * | 4/2015 | Kuraki | B01F 7/00775 |
| | | | | | 423/592.1 |
| 2010/0202960 | A1 | | 8/2010 | Enomura | |
| 2011/0015054 | A1 | * | 1/2011 | Enomura | B01F 7/0075 |
| | | | | | 501/137 |
| 2011/0152433 | A1 | | 6/2011 | Bechtloff et al. | |
| 2013/0156682 | A1 | | 6/2013 | Kuraki et al. | |
| 2018/0215628 | A1 | * | 8/2018 | Lee | C01G 1/02 |
| 2019/0031509 | A1 | * | 1/2019 | Enomura | C01G 49/00 |

FOREIGN PATENT DOCUMENTS

| JP | 5-155616 | A | | 6/1993 |
|---|---|---|---|---|
| JP | 2001-11081 | A | | 1/2001 |
| JP | 2003-20228 | A | | 1/2003 |
| JP | 2005-219934 | A | | 8/2005 |
| JP | 2007-99548 | A | | 4/2007 |
| JP | 2010-223985 | A | | 10/2010 |
| JP | WO2009/035019 | A1 | | 12/2010 |
| JP | 2011-530476 | A | | 12/2011 |
| JP | 2012-206933 | A | | 10/2012 |
| JP | 2012206933 | A | * | 10/2012 |
| JP | 2013-82609 | A | | 5/2013 |
| JP | 2013-82621 | A | | 5/2013 |
| WO | WO 2011/090085 | A1 | | 7/2011 |

OTHER PUBLICATIONS

International Search Report, issued in PCT/JP2017/003669, dated Apr. 4, 2017.
Database WPI, Week 200735, Thomson Scientific, London, GB, Database Accession No. 2007-368099, Apr. 19, 2007, XP002791705, 2 pages.
Database WPI, Week 201152, Thomson Scientific, London, GB, Database Accession No. 2011-J61820, Jul. 28, 2011, XP002791706, 5 pages.
Database WPI, Week 201332, Thomson Scientific, London, GB, Database Accession No. 2013-G94701, May 9, 2013, XP002791698, 2 pages.
Extended European Search Report, dated Jun. 13, 2019, for European Application No. 17747480.6.

* cited by examiner (A)

(B)

PRECISE MODIFYING METHOD FOR FINE PARTICLE DISPERSION LIQUID

TECHNICAL FIELD

The present invention relates to a precision reforming method of a fine particle dispersion solution.

BACKGROUND ART

Fine particle is the material used in wide fields such as a semiconductor, a tonner, a paint, a ceramic, a metal, a drug, a cosmetic, a chemical, and a color filter, wherein when these materials are made to fine particles, new characteristics emerges so that various production methods thereof have been proposed.

These fine particles are actually used by dispersing them in various solvents, wherein when they are in the state of aggregates, namely in the state of forming secondary particles, characteristics as nanoparticles cannot be fully expressed in many cases. Especially when they are made to fine particles with the size of 200 nm or less, the characteristics thereof improve; however, in it there is a problem of readily forming aggregates. Therefore, a method for producing fine particle dispersion solution with which not only dispersion property of the fine particles is controlled but also the particles are dispersed to primary particles is being wanted.

When fine particles are produced in a liquid phase, in general, a fine particle raw material solution obtained by dissolving fine particle raw materials into a solvent is mixed with a separating solvent capable of separating the fine particles from the raw material solution thereof so as to separate the fine particles. Especially as disclosed in Patent Literatures 1 and 2, when the fine particles are separated in between processing surfaces which are disposed so as to be able to approach to and separate from each other as well as to rotate relative to each other, the fine particle dispersion solution with high dispersion can be obtained comparatively easily.

However, when the liquid phase method is used, the fine particle dispersion solution includes impurities derived from the fine particle raw material solution or from the fine particle separating solvent. Therefore, during a certain period after separation of the fine particles, a high dispersion state can be retained; however, because of these impurities, with a passage of time the fine particles are aggregated in the fine particle dispersion solution to cause precipitation thereof in many instances. In the case where a fluid processing apparatus with a forced thin film type provided with processing surfaces which are disposed so as to be able to approach to and separate from each other as well as to rotate relative to each other, the equipment being described in Patent Literatures 1 and 2, is used, the fine particles immediately after separation thereof have small and uniform particle diameters and are originally highly dispersive, so that in some instances these are highly influenced by aggregation with passage of time.

In general, impurities are removed from the fine particle dispersion solution like this in the way as follows. Namely, the fine particle dispersion solution is concentrated by a method such as centrifugal separation, suction filtration, or filter press, and then, after a washing solution such as pure water is charged to it; the centrifugal separation, the suction filtration, or the like is repeated so as to remove the impurities in the fine particle dispersion solution.

For example, in Patent Literature 3, a purification method for removing by separating ionic impurities included in fine particles is disclosed. In Patent Literature 3, by using membrane filtration, ionic impurities are removed by separation together with a permeated solution to obtain a concentrated fine particle dispersion solution, into which water is added so as to dilute the solution to a certain concentration of the fine particles; and then, the membrane filtration is repeated with a circulation membrane filtration by a cross-flow method so as to purify the fine particles. At this time, by monitoring pH of the permeated solution, progress of removal process of the ionic impurities can be readily confirmed, thereby with this it is considered that a high dispersion is obtained. However, because there is no mechanism installed to disperse or crush the aggregate, even if purification to a target pH is performed, it is difficult to remove the impurities included in the aggregate; and thus, it has been difficult to obtain a fine particle dispersion solution whose dispersion property is controlled.

Alternatively, as illustrated in Patent Literature 4, it is presumed that to stir the fine particle dispersion solution before treatment thereof with filtration membrane may be effective; however, it is difficult to disperse the aggregate of the fine particles to primary particles by mere stirring. Further, in the paragraph 0159 (Example 12) of Patent Literature 5, it is described that a disperser (BATCH SAND, manufactured by Kanpe Co., Ltd.) was used before the treatment with filtration membrane; however, this method is applied only to production of the dispersion solution of zirconia from the powders thereof. Moreover, this disperser is for rough dispersion and is used in a batch system; therefore, it is difficult to continuously disperse this with filtration membrane. It is also described that washing is carried out until conductivity of the dispersion solution reaches preferably 3 mS/cm or less, while more preferably 0.3 mS/cm or less, indicating that this is rough washing. Accordingly, the inventions disclosed in Patent Literatures 4 and 5 propose neither the technology focusing on the origin of the impurities in the fine particle dispersion solution nor the removal process of the impurities before re-aggregation. Therefore, the inventions disclosed in these literatures proposed neither to reduce total amount of the impurities in the dispersion solution including the fine particles nor to enhance dispersion property of the fine particles after completion of the treatment.

CITED LITERATURES

Patent Literatures

Patent Literature 1: Japanese Patent Laid-Open Publication No. 2013-82621
Patent Literature 2: Re-Publication of International Patent Application No. 2009/035019
Patent Literature 3: Japanese Patent Laid-Open Publication No. 2012-206933
Patent Literature 4: National Publication of International Patent Application No. 2011-530476
Patent Literature 5: Japanese Patent Laid-Open Publication No. 2013-82609

DISCLOSURE OF INVENTION

Problems to be Solved by the Invention

Problems to be solved by the present invention is to provide a method for reforming a fine particle dispersion solution with which impurities present not only in the fine particle dispersion solution but also in aggregate etc. of the primary particles thereof are removed thereby reducing total amount of the impurities present in the dispersion solution including the fine particles.

Another object of the present invention is to provide a method for reforming a fine particle dispersion solution with which dispersion property of the fine particles can be enhanced.

Means for Solving the Problems

The present invention provides a method for reforming a fine particle dispersion solution, wherein in the method for reforming the fine particle dispersion solution with which dispersion property of the fine particles is enhanced, a physical energy is applied to an aggregate of the fine particles included in the fine particle dispersion solution thereby carrying out a dispersion process to disperse the aggregate to smaller particles than the said aggregate of the fine particles, thereby discharging impurities included in the aggregate into the dispersion solution, and before re-aggregation by the impurities takes place entirely, a removal process to remove the impurities from the dispersion solution is carried out by a removing unit. When the present invention is carried out, even if the impurities in the aggregate is discharged into the dispersion solution, it is difficult to completely avoid re-aggregation by the impurities discharged or by the impurities previously present in the dispersion solution; however, total amount of the impurities present in the dispersion solution including the fine particles can be reduced by removing the impurities from the dispersion solution by the removing unit during part of the impurities discharged is still present in the dispersion solution. Meanwhile, there is no restriction in the form of the impurities; therefore, the impurities may be in a solid state or in an ionic state.

The present invention also provides the method for reforming the fine particle dispersion solution, wherein the impurities comprises in-solution impurities present in the dispersion solution independent of the aggregate and in-particle impurities present in the aggregate, and the method comprises processes of: discharging the in-particle impurities from the aggregate to the dispersing solution by the dispersion process thereby changing them to the in-solution impurities; transporting the dispersion solution after the discharge process to the removing unit before re-aggregation by the in-solution impurities; and carrying out removal process to remove the in-solution impurities from the dispersion solution by the removing unit.

In addition, the present invention provides the method for reforming the fine particle dispersion solution, wherein the dispersion process and the removal process are carried out continuously and repeatedly. In addition, the present invention provides the method for reforming the fine particle dispersion solution, wherein the removing unit is equipped with a filtration membrane, and the dispersion solution is supplied to the filtration membrane to carry out filtration by a cross-flow method so as to remove the impurities from the dispersion solution. In addition, the present invention provides the method for reforming the fine particle dispersion solution, wherein the filtration membrane is an ultrafiltration membrane.

When the present invention is carried out, it is presumed that after the impurities in the aggregate are discharged into the dispersion solution, re-aggregation takes place with passage of time; and thus, it is efficient to remove the impurities during more amount of the impurities are still present in the dispersion solution. Therefore, it can be said that it is most preferable to start the removal immediately after the impurities are discharged into the dispersion solution. Therefore, even if it is difficult to set the time between the discharge and the removal to zero due to physical restriction of the equipment or the like, for efficient removal of the impurities, it is preferable to carry out (start) the removal process to remove the impurities from the dispersion solution within 3 seconds after the impurities are discharged into the dispersion solution. For example, when the removal process is carried out by a filtration membrane, it is preferable that the dispersion solution into which the impurities are discharged reaches the filtration membrane within 3 seconds. In addition, the present invention provides the method for reforming the fine particle dispersion solution, wherein dispersion property of the fine particles in the fine particle dispersion solution is controlled by controlling at least any one of a path length, a flow rate, a flow amount, a fluid pressure, and a temperature in a just-before transporting path to send the dispersion solution after the impurities are discharged thereinto to the removing unit. In addition, the present invention provides the method for reforming the fine particle dispersion solution, wherein the dispersion process is a process to apply the physical energy to the aggregate by a rotation type disperser which rotates a stirring blade in the dispersion solution, and the dispersion process is carried out with setting a circumferential velocity of the stirring blade at 10 m/sec or more.

In addition, the present invention provides the method for reforming the fine particle dispersion solution, wherein dispersion property of the fine particles in the fine particle dispersion solution is controlled by controlling pH of the fine particle dispersion solution obtained after the removal process. The pH of the fine particle dispersion solution may be controlled by continuing the dispersion process and the removal process continuously and repeatedly, or by adding a pH-adjusting agent or the like after completion of these processes, or by performing the both.

Primary particle diameter of the fine particle is not particularly restricted, thereby this method can also be applied to the particles having a very fine primary particle diameter. Therefore, the method can be applied to the dispersion solution of the fine particles whose primary particle diameter is, for example, 200 nm or less.

Structure of the fine particle is not particularly restricted. For example, the method can be applied to metal fine particles such as a silver-copper metal alloy fine particle, organic substance fine particles such as a curcumin fine particle, and oxide fine particles such as a zinc oxide fine particle or an iron oxide fine particle whose surface is covered with a silicon oxide.

In addition, the fine particles used in carrying out the present invention may be those obtained by breaking down or by building up, whereby there is no particular restriction in origin of the fine particle or of the dispersion solution thereof. In the case of fine particles having the primary particle diameter of a nanometer order, as the efficient and good method for producing the fine particle dispersion solution, one example thereof may be the method including a process wherein a fine particle raw material solution including at least a fine particle raw material therein is mixed with a fine particle separating solvent including at least a fine particle separating substance to separate the fine particle in between processing surfaces which are disposed so as to be able to approach to and separate from each other as well as rotate relative to each other, whereby separating the fine particle in the mixed fluid thus formed. The present invention could provide the method for producing a fine particle dispersion solution having a stable dispersion property by carrying out the method for reforming the fine particle dispersion solution after carrying out the process to obtain this dispersion solution.

Advantages

The present invention could provide a method for reforming a fine particle dispersion solution with which total amount of the impurities present in the dispersion solution including impurities present in the fine particle dispersion solution and impurities present in aggregate etc. of the primary particles thereof could be reduced. In addition, the present invention could provide a method for producing a fine particle dispersion solution, wherein this method is applied with the method for reforming a fine particle dispersion solution as described above.

BEST MODES FOR CARRYING OUT THE INVENTION

Figure 1:
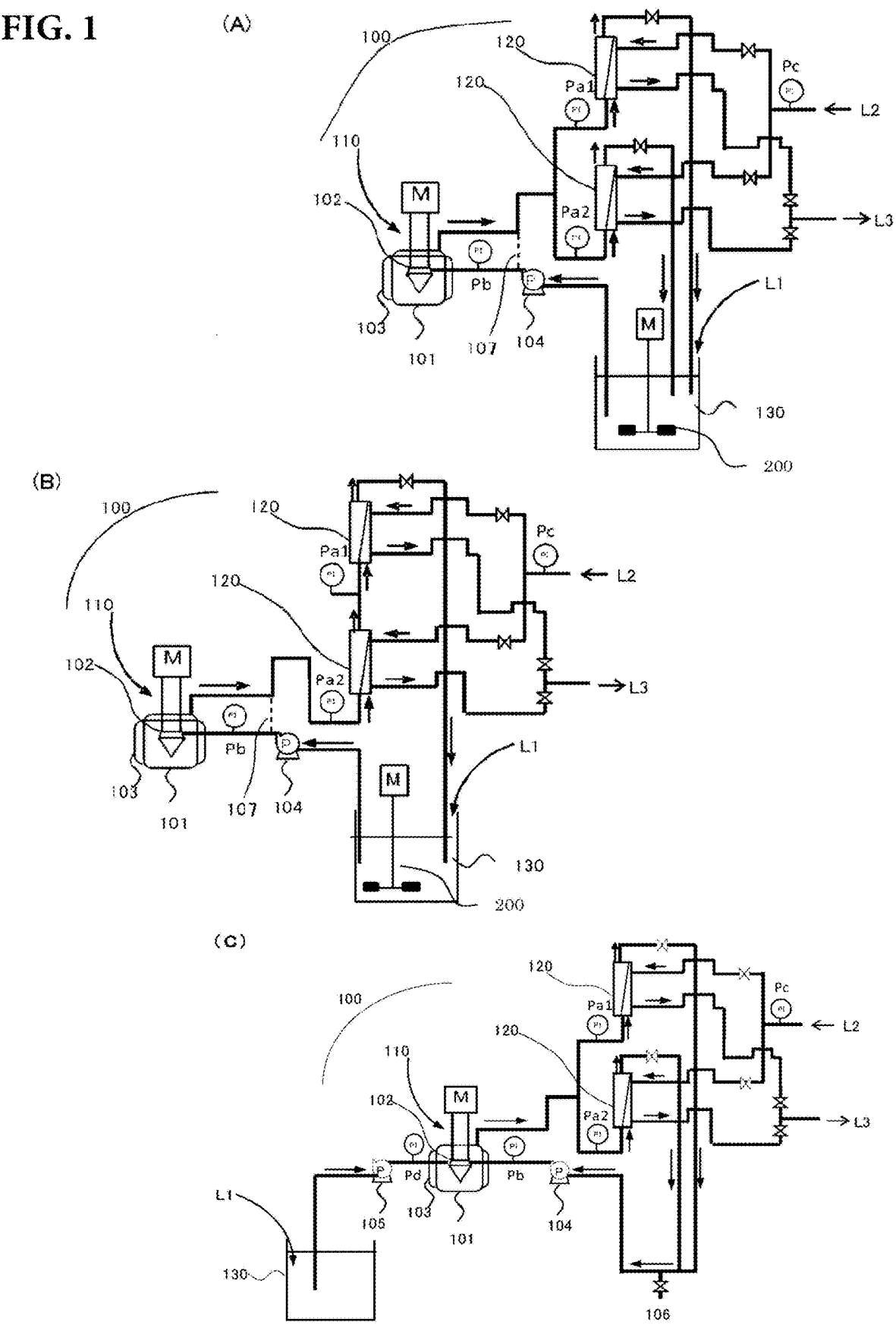
FIG. 1
(A) is a rough diagram of the dispersion solution reformation equipment in an embodiment of the present invention; (B) is a rough diagram of the dispersion solution reformation equipment in other embodiment of the present invention; and (C) is a rough diagram of the dispersion solution reformation equipment in still other embodiment of the present invention.

Hereunder, one embodiment of the present invention will be described on the basis of the drawings.

The method for reforming the fine particle dispersion solution of the present invention is carried out by the method provided with the reformation process using the dispersion solution reformation equipment 100 such as those described in FIG. 1(A), FIG. 1(B), and FIG. 1(C). The fine particle dispersion solution to be reformed may be produced or prepared by various methods, wherein it can be produced with, for example, the separation processing equipment described in FIG. 3.

Hereunder, first, the process in which the fine particle dispersion solution is reformed will be described with referring to FIG. 1, and then, the process in which the fine particle dispersion solution is obtained will be described with referring to FIG. 3.

The dispersion solution reformation equipment 100 of FIG. 1(A) is typical equipment which can be used to carry out the reformation method according to the embodiment of the present invention in which impurities are removed from the fine particle dispersion solution, and pH and conductivity of the fine particle dispersion solution are controlled. Specifically, the dispersion solution reformation equipment 100 comprises the dispersion processing equipment 110, the removing unit 120 which is equipped with a filtration membrane, and the storing vessel 130, wherein these are connected by a piping system. The dispersion processing equipment 110 has composition elements mainly comprising the dispersing vessel 101 and the disperser 102 which is installed in this vessel.

Figure 3:
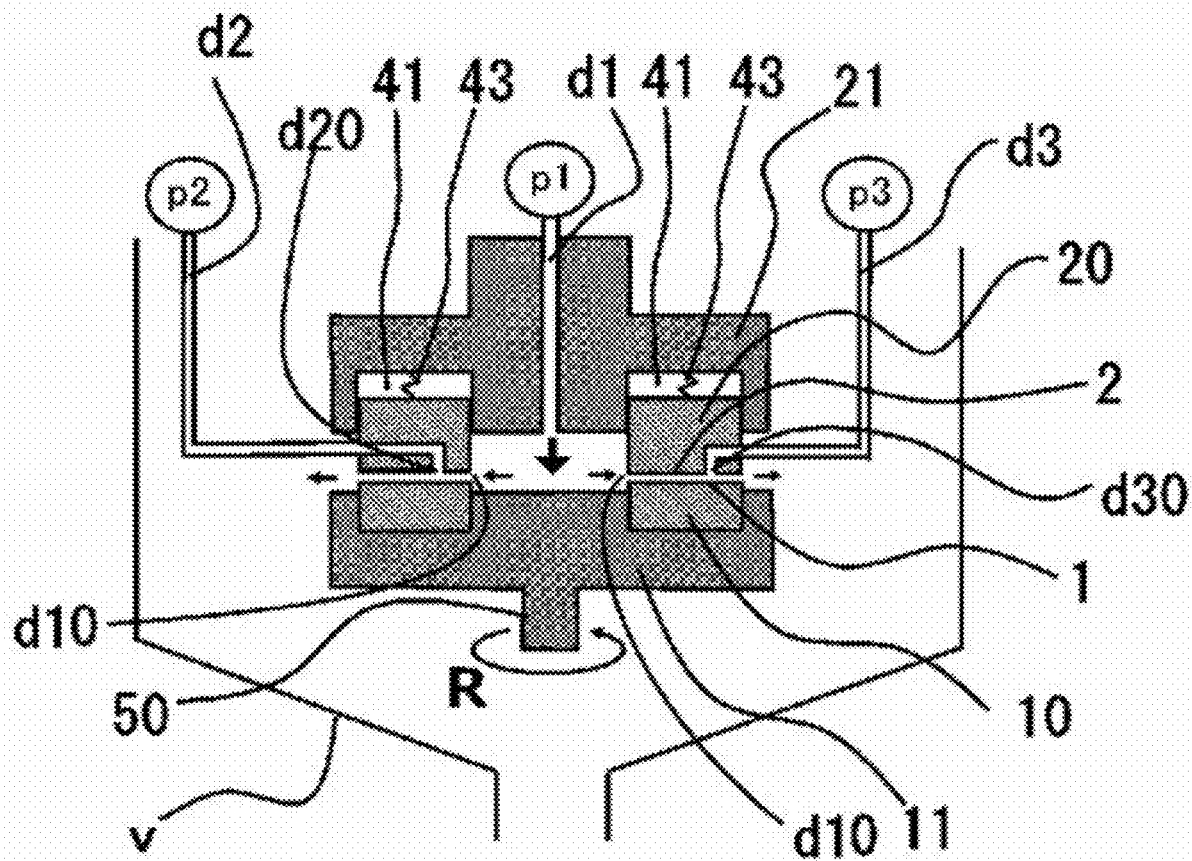
FIG. 3
(A) is a rough cross section view of the separation processing equipment relating to the embodiment of the present invention; and (B) is a rough plan view of the first processing surface of the separation processing equipment.
Figure 3:
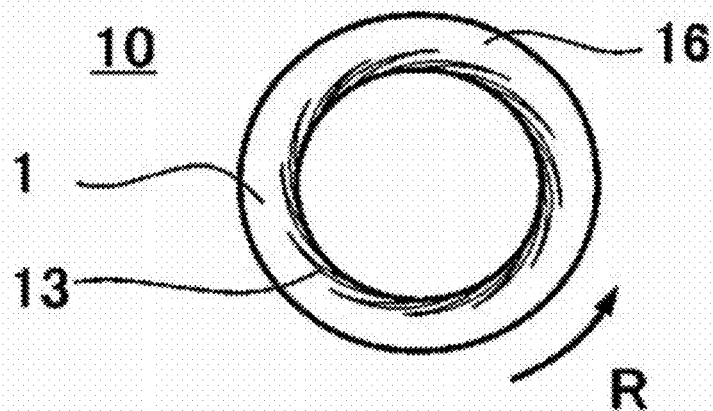

The fine particle dispersion solution L1 formed by the separation processing equipment described in FIG. 3 is charged into the storing vessel 130; and by starting up the pump 104 the fine particle dispersion solution L1 is supplied to the dispersing vessel 101. The fine particle dispersion solution L1 sent by the pump 104 fills the dispersing vessel 101 and overflows so as to be sent to the removing unit 120 which is equipped with the filtration membrane into which the cross-flow washing solution L2 is supplied, whereby the dispersion solution is filtrated. Of the fine particle dispersion solution L1 sent to the removing unit 120, the solution including the impurities after filtration is discharged as the filtrated solution L3 together with the cross-flow washing solution L2, and the rest of it is recharged into the storing vessel 130. Meanwhile, it is preferable that the storing vessel 130 is equipped with the stirrer 200 in order to make concentration of the dispersion solution uniform. The fine particle dispersion solution recharged into the storing vessel 130 is supplied again to the dispersing vessel 101, thereby the dispersion and the removal of the impurities are carried out continuously and repeatedly.

In the fine particle dispersion solution in the present invention, pH and/or conductivity is controlled while the dispersion process is carried out with the disperser 102. Conductivity of the fine particle dispersion solution is preferably 100 µS/cm or less, while more preferably 50 µS/cm or less. The control range of pH can be set to the target pH depending on the fine particle to be processed. In addition, while the dispersion process with the disperser 102 is carried out, when operations of pH control and of the removing unit 120 which is equipped with the filtration membrane are carried out, not only the impurities present in the aggregated fine particles (namely, in-particle impurities which are the impurities included in the aggregate) can be readily removed, but also surface of each particle can be made to the same and uniform state.

Figure 2:
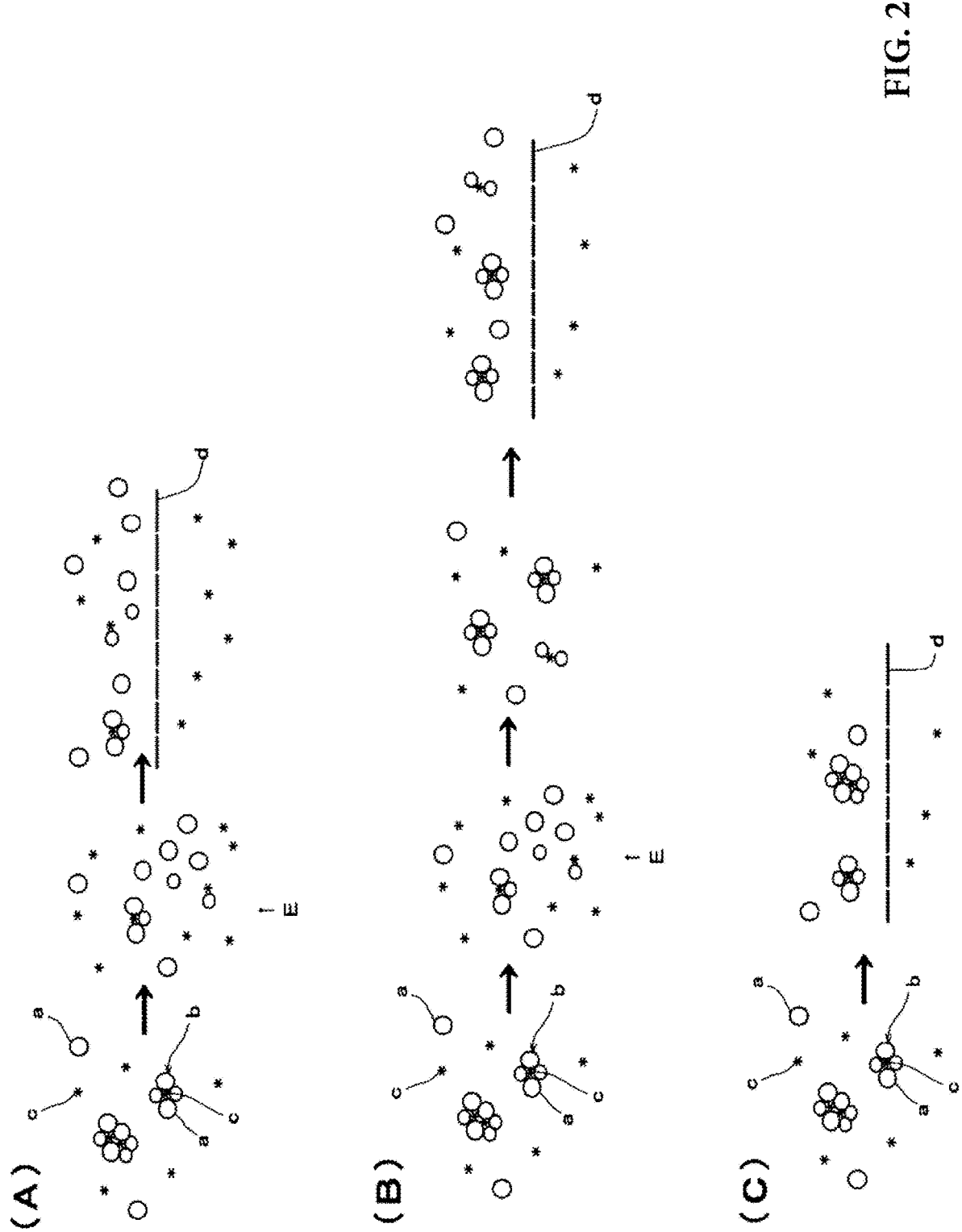
FIG. 2
These are figures illustrating the principle of the method for reforming the dispersion solution of the present invention.

In FIG. 2(A) and FIG. 2(B), principle of the impurity removal is shown when the dispersion solution reformation equipment 100 of the present invention is used. As can be seen in these figures, when the dispersion solution reformation equipment of the present invention is used, the physical energy E of the disperser 102, which is installed in the dispersing vessel 101, is applied especially to the aggregate b of the fine particle a in the dispersion solution, so that the aggregate b is dispersed or crashed temporarily or instantly, thereby the impurities c in the particles are discharged into the dispersion solution. When the fine particle dispersion solution applied with the physical energy E is transported to the removing unit equipped with the filtration membrane immediately after application of the physical energy E, the impurities c discharged into the fine particle dispersion solution a removed by the filtration membrane d. On the contrary, as illustrated in FIG. 2(C), only conventional filtration process is carried out wherein the mechanism such as the disperser 102 which applies the physical energy E to the aggregate is not installed, or a mere stirrer having the shape such as a rod-like shape, a plate-like shape, or a propeller shape, with which it is difficult to apply the physical energy E so as to disperse the aggregate of the fine particles, is used, the aggregate b is transported to the filtration membrane d without being dispersed or crashed; thus, even if the in-solution impurities, which are the impurities c present in the solution, can be removed, it is difficult to remove the in-particle impurities, which are the impurities to cause the aggregation.

However, as illustrated in FIG. 2(B), if the time from the aggregate b is dispersed or crashed by application of the physical energy E to the aggregate b till the resulting dispersion solution is transported to the filtration membrane d is too long, the fine particles a re-aggregate thereby incorporating the impurities c into the aggregate b. In this case, it is difficult to carry out the removal process to remove the in-particle impurities by the filtration membrane d. In addition, the impurities c can cause to aggregate the fine particles a, namely, they can be nuclei of the aggregate b in some instances; therefore, it is preferable to remove the impurities by the filtration membrane d immediately after the impurities c in the particles are discharged into the fine particle dispersion solution by dispersing or crushing the aggregate b. Therefore, the removal process to remove the impurities c from the fine particle dispersion solution is started within 3 seconds, while preferably within 1 second, after the physical energy E is applied to the aggregate b by the disperser 102 in order to discharge the in-particle impurities to the dispersion solution as the in-solution impurities.

The time (T1: second) from the dispersing vessel 101 equipped with the disperser 102 to start of removal of the impurities by the removing unit 120 can be calculated from the formula (1) using the path length (Lea: m), the flow rate (FL: m³/sec), and the pipe's inner diameter (Leb: m).

$$T1 = Lea/(FL/((Leb/2)^2 \times \pi)) \quad \text{Formula (1)}$$

In the present invention, when FL, Lea, and Leb are controlled so as to bring T1 into the range of 0 to 3 seconds, while preferably in the range of 0.05 to 1 second, the removal process to remove the impurities from the fine particle dispersion solution can be carried out within 3 seconds, while preferably within 1 second, after the physical energy E is applied to the aggregate by the disperser 102 in order to discharge the in-particle impurities into the dispersion solution.

In addition, by controlling the fluid pressure and the fluid temperature of the fluid flowing through the dispersion solution reformation equipment, the dispersion property of the fine particles in the fine particle dispersion solution can also be controlled. In actual practice, the range of the fluid pressure and the fluid temperature may be arbitrarily chosen in accordance with the dispersion equipment, the disperser, the kind and construction material of the filtration membrane, and the fine particle dispersion solution to be processed.

In addition, washing operation or pH control is carried out in such a way as to obtain pH at which the dispersion property of the fine particles to be processed that are included in the fine particle dispersion solution can be controlled. By so doing, not only an ionic component, etc., which cause formation of the aggregate of the primary particles, can be removed, but also the surface repulsive force of each of the primary particles of the fine particles is uniformly controlled thereby leading to the state that the primary particles are repulsing to each other; and thus, the fine particles in the fine particle dispersion solution thereby formed can be secured in a stable dispersion state. Meanwhile, among various dispersers described later, the disperser 102 which is installed in the dispersing vessel 101 is preferably a disperser having a stirring blade. Upon processing, as the circumferential velocity of the stirring blade is made faster, it helps to increase the number of the aggregates that are dispersed or crushed in the dispersing vessel 101 and also to decrease the size of the aggregate. Therefore, as compared with the case when the circumferential velocity is slow, more amount of the in-particle impurities can be discharged into the solution. Therefore, it is preferable to control the circumferential velocity of the disperser with considering the filtration membrane's performance which changes depending on the area and construction material of the filtration membrane, as well as the impurity removal performance which is determined depending on the characteristics of the substance to be processed, namely, the removing amount of the impurities per unit time. Specifically, the dispersion process is carried out with the circumferential velocity of the stirring blade at 10 m/sec or more, while more preferably at 15 m/sec or more. Setting the velocity at 10 m/sec or more can suppress the state that the impurities included in the aggregate cannot be removed or the state that surface of each particle cannot be made same and uniform even if pH of the fine particle dispersion solution is made to the pH at which the dispersion property of the fine particles to be processed can be controlled; and thus, such the dispersion property and dispersion stability of the fine particle dispersion solution as obtained by the present invention can be obtained.

With regard to the filtration membrane in the present invention, there is no particular restriction, wherein a filtration membrane for general membrane filtration may be used in accordance with the particle diameter of the fine particle to be processed and with intended processing condition; and thus, various filtration membranes including a microfiltration membrane, an ultrafiltration membrane, and a nanofiltration membrane may be used. Although, there is no particular restriction in the form thereof, wherein a hollow fiber type filtration membrane, a tubular type membrane, a spiral type membrane, a flat-type membrane, etc., may be exemplified. There is no particular restriction in the construction material of the filtration membrane either, wherein ceramics such as alumina and titanium oxide, a polysulfone polymer, polymer, a polyester polymer, an aromatic ether polymer, a (meth)acryl polymer, a (meth)acrylonitrile polymer, a fluorinated polymer, an olefinic polymer, a vinyl alcohol polymer, a cellulose polymer, etc., may be exemplified. In accordance with the particle diameter of the fine particle to be processed, impurities, and kind of the solvent which is a dispersion medium, a membrane having suitable construction material, cut-off molecular weight, pore size may be used. Although there is no particular restriction, illustrative example thereof includes G-5 type, G-10 type, G-20 type, G-50 type, PW type, and HWSUF type (all manufactured by DESAL Inc.); HFM-180, HFM-183, HFM-251, HFM-300, HFK-131, HFK-328, MPT-U20, MPS-U20P, and MPS-U20S (all manufactured by KOCH Co.); SPE 1, SPE 3, SPE 5, SPE 10, SPE 30, SPV 5, SPV 50, and SOW 30 (all manufactured by Synder, Inc.); Mike Rosa (registered trademark) UF series (manufactured by Asahi Kasei, Co., Ltd.); NTR 7410 and NTR 7450 (both manufactured by Nitto Denko Corp.); and Cefilt UF (manufactured by NGK Insulators, Ltd.). In addition, an electric dialysis apparatus such as Acilyzer ED (manufactured by ASTOM Corp.) may also be used.

With regard to the disperser of the present invention, a normal rotation type disperser, a high pressure homogenizer, an ultrasonic homogenizer, etc., may be exemplified, wherein it is preferable to carry out the dispersion by using a disperser such as a rotation type disperser which can realize uniform mixing by applying a shear force or the like to a fluid, such as for example, a disperser equipped with a screen which rotates relative to the stirring blade. Illustrative example of the high pressure homogenizer includes Star Burst (manufactured by Sugino Machine, Ltd.), High Pressure Homogenizer HPH (manufactured by IKA Works, Inc.), and HIGH PRESSURE HOMOGENIZER (manufactured by Sanmaru Machinery Co., Ltd.). Illustrative example of the ultrasonic homogenizer includes UX series (Mitsui Electric Co., Ltd.), US-1200 TCVP and SUSH-300T (both manufactured by Nissei Corp.), and UP 200 and UIP 16000 (both manufactured by Hielscher Ultrasonics GmbH). Preferable example of the usable rotation type disperser includes stirrers and dispersers disclosed in Japanese Patent No. 5147091. It is preferable that the rotation type disperser is used in a continuous way; when it is used in a continuous way, supply to and discharge from a stirring tank may be continuous, or the disperser of a continuous type without using the stirring tank may be used, wherein a stirring energy E may be arbitrarily controlled by using heretofore known stirrers or stirring means. Meanwhile, with regard to the stirring energy E, details thereof is described in Japanese Patent Laid-Open Publication No. H04-114725 filed by the present applicant. The methods for stirring and for the dispersion process in the present invention are not particularly restricted; and thus, it may be carried out using a stirrer or dissolver, emulsifier, disperser, homogenizer, etc. with any of various shearing types, a friction type, a high-pressure jet type, an ultrasonic type, etc. Illustrative example thereof includes: continuous type dispersers such as Ultra-Turrax (manufactured by IKA Works, Inc.), Polytron (manufactured by Kinematica AG), TK Homomixer (manufactured by PRIMIX Corporation), Ebara Milder (manufactured by EBARA CORPORATION), TK Homomic Line Flow (manufactured by PRIMIX Corporation), Colloid Mill (manufactured by Shinko Pantec Co., Ltd.), Slasher (manufactured by NIPPON COKE & ENGINEERING CO., LTD.), Trigonal Wet Type Pulverizer (manufactured by Mitsui Miike Chemical Engineering Machinery Co., Ltd.), Cavitron (manufactured by Eurotec, Ltd.), and Fine Flow Mill (manufactured by Pacific Machinery & Engineering Co., Ltd.); and a batch-type disperser or a combination of batch and continuous type disperser, such as Clearmix (manufactured by M. Technique Co., Ltd.), Clearmix Dissolver (manufactured by M. Technique Co., Ltd.), and FILMIX (manufactured by PRIMIX Corporation). Also, the stirring process in which the energy E is applied to the aggregate b is preferably performed by using a stirrer equipped with a high-speed rotating stirring blade as well as a screen outside the stirring blade thereby ejecting the fluid from the screen opening as a jet stream, wherein especially Clearmix (manufactured by M. Technique Co., Ltd.) or Clearmix Dissolver (manufactured by M. Technique Co., Ltd.) mentioned above is preferably used.

Other embodiments of the dispersion solution reformation equipment 100 in the present invention are illustrated in FIG. 1(B) and FIG. 1(C). In the embodiment illustrated in FIG. 1(B), the removing units 120 equipped with a plurality of the filtration membranes are arranged in series. In this embodiment, the fine particle dispersion solution after the dispersion process in the dispersion processing equipment 110 is processed so as to remove the impurities by a plurality of the filtration membranes, and then returns to the storing vessel 130. In the embodiment illustrated in FIG. 1(C), the storing vessel 130 is connected to the dispersing vessel 101 via the pump 105, wherein the fine particle dispersion solution after filtration by the filtration membrane of the removing unit 120 is sent, without going through the storing vessel 130, to the dispersing vessel 101 whereby carrying out the dispersion process, so that the fine particle dispersion solution circulates without going through the storing vessel 130. The fine particle dispersion solution after this process is sent to the next process or vessel by opening the open/close valve 106 that is arranged in an arbitrary position in the circulation path. Although a drawing is omitted, an alternative embodiment is also possible wherein the removing unit 120 is installed directly to the exit where the fine particle dispersion solution in the dispersing vessel 101 overflows so that the path from the dispersion processing equipment 110 to the removing unit 120 is not substantially installed (Lea=0). Meanwhile, another alternative embodiment is also possible wherein the dispersing vessel 101 in the dispersion processing equipment 110 works as a pipe or the like which does not substantially have a volume while being equipped with the disperser 102 thereby instantly carrying out the dispersion process with the disperser 102 (for example, complete continuous one-pass method) by applying the physical energy E to the fine particle dispersion solution (not illustrated by a drawing). Further, as illustrated in each drawing of FIG. 1, the by-passing path 107 may be arranged so as to form, as necessary, the path through which the dispersion solution repeatedly passes only the removing unit 120 without going through the disperser 102. Namely, in the present invention, the dispersion process and the removal process are carried out mainly continuously, but it is not necessary to continue this continuous process during the entire period of the reformation process of the fine particle dispersion solution. For example, an embodiment may be adopted wherein in the beginning of the processing, the valve to select the path such as a three-way valve (not illustrated in a drawing) is switched over to the by-passing path 107 so as to send the fine particle dispersion solution through the by-passing path 107 only to the removing unit 120 without going through the disperser 102 so as to carry out the removal process by filtrating the impurities previously present in the solution of the fine particles with the filtration membrane; and when amount of the impurities previously present in the solution is decreased, the valve to select the path is switched over to the disperser 102 so as to carry out the afore-mentioned continuous processing; or alternatively, the processing solution may be made to pass through only the removing unit 120 as the post-process of the afore-mentioned continuous processing.

(Fine Particles)

The present invention deals with the fine particle dispersion solution having the fine particles dispersed in the dispersion solution, wherein kinds of the fine particle and dispersion solution can be variously changed; and thus, the fine particles obtained by any of breaking-down and building up may be used, in addition, there is no particular restriction with regard to the origin of the fine particles or the dispersion solution thereof. The dispersion solution may be prepared with various ways; for example, fine particles previously prepared may be arbitrarily dispersed into the dispersing solution, wherein various stirrers for mixing may be used according to conventional methods. It is preferable to use the dispersion solution of the fine particles separated by mixing a fine particle raw material solution which is prepared by dissolving or dispersing a fine particle raw material into a solvent (this will be described later) with a fine particle separating solvent. Form of the fine particle may comprise a single element or a plurality of elements; and in addition, a core-shell type fine particle or even an aggregate may be used. Meanwhile, the method for producing the fine particle dispersion solution in the present invention is applied preferably to the fine particle having the primary particle diameter of 200 nm or less, while more preferably to the fine particles having the primary particle diameter of 50 nm or less; however, the application is not only limited to the above-mentioned fine particles, so that the method may also be applied to the fine particle having the primary particle diameter of more than 200 nm. Though different depending on the filtration membrane and the disperser to be used as well as the kinds of the fine particle to be processed and of the dispersing medium, the method may also be used for the fine particles having the primary particle diameter of more than 200 nm and 1 μm or less. In addition, the aggregate having a diameter of 1 μm or more may also be suitable as the particle before the processing.

(Kinds of Fluid and Reaction)

The fine particle in the dispersion solution of the present invention may be various fine particles disclosed in Patent Literatures 1 and 2. With regard to the reaction to obtain the fine particle, various reactions described in Patent Literatures 1 and 2 may be used.

For example, in the case where plural fluids are mixed by charging into processing surfaces, the fluids to be mixed are not particularly restricted. For example, fluid capable of separating fine particles of inorganic substances such as oxides, metals, ceramics, semiconductors, and silica, or fine particles of organic substances such as organic pigments and chemicals may be cited. In many instances, these fine particles form aggregates because these particles are so fine; and thus, these are useful in application of the present invention.

(Fine Particle Raw Material)

The fine particle raw material to be used for preparation of the fine particle of the present invention is not particularly restricted. Raw material capable of forming the fine particle by the method such as reaction, crystallization, separation, and co-precipitation may be used. In the present invention, hereunder, this method is described as separation.

Here, taking the oxide fine particle as an example, the oxide raw material to be used for preparation of the fine particle thereof is the substance which is a raw material of the fine particle, wherein the substance is, for example, a single element of a metal or of a nonmetal, or a metal compound or a nonmetal compound. The metal in the present invention is not particularly restricted. All the metal elements in the periodic table can be preferably used. The nonmetal in the present invention is not particularly restricted either, wherein illustrative example of the preferable nonmetal element includes B, Si, Ge, As, Sb, C, N, O, S, Te, Se, F, Cl, Br, I, and At. These metals and nonmetals may be a single element thereof, or a metal alloy comprising plural elements, or a substance of a metal element containing a nonmetal element. In the present invention, a compound of the foregoing metals is referred to as a metal compound. There is no particular restriction in the metal compound or the nonmetal compound, wherein illustrative example thereof includes salts or compounds of a metal or a nonmetal, such as oxides, hydroxides, hydroxy oxides, nitrides, carbides, complexes, organic salts, organic complexes, as well as organic compounds, or hydrates or organic solvates of them. There is no particular restriction with regard to the metal salt or the nonmetal salt, wherein illustrative example thereof includes nitrate salts, nitrous salts, sulfate salts, sulfite salts, formate salts, acetate salts, phosphate salts, phosphite salts, hypophosphite salts, chlorides, oxy salts, acetylacetonato salts, as well as hydrates or solvates of them. Illustrative example of the organic compound includes alkoxides of a metal or a nonmetal. These metal compounds and nonmetal compounds may be used singly or as a mixture of a plurality of them.

For example, in the case where the fine particle has iron oxide or zinc oxide as the core thereof, and iron oxide fine particle or zinc oxide covered with silicon oxide as the shell, oxides or hydroxides of iron or zinc, compounds of zinc salts or alkoxides, as well as hydrates of them may be cited as the raw material of the core oxide. Inorganic compounds of zinc or iron such as chlorides, nitrate salts, and sulfate salts, as well as organic compounds of zinc or iron such as alkoxides and acetylacetonato thereof may be cited, though not limited to them. Specific example thereof includes zinc oxide, zinc chloride, zinc nitrate, iron (III) chloride, iron (II) chloride, iron (III) nitrate, iron (III) sulfate, zinc acetylacetonato, iron acetylacetonato, as well as hydrates of them. As the oxide raw material for the shell, oxides or hydroxides of silicon, silicon compounds such as salts or alkoxides thereof, as well as hydrates of them may be cited. Illustrative example thereof includes phenyl trimethoxy silane, methyl trimethoxy silane, methyl triethoxy silane, 3-glycidoxypropyl trimethoxy silane, 3-trifluoropropyl-trimethoxy silane, methacryloxypropyl triethoxy silane, tetramethyl orthosilicate (TMOS), tetraethyl orthosilicate (TEOS) as well as oligomer condensate of TEOS such as ethyl silicate 40, tetraisopropylsilane, tetrapropoxysilane, tetraisobutoxysilane, tetrabutoxysilane, and the like, though not limited to them. In addition, as the oxide raw material for the shell, other siloxane compounds, bis(triethoxysilyl)methane, 1,9-bis(triethoxysilyl)nonane, diethoxy dichlorosilane, triethoxy chlorosilane, etc., may also be used.

In preparation of the fine particle, the fine particle raw material solution containing at least the fine particle raw material is used. When the fine particle raw material is solid, it is preferable to use the fine particle raw material in the molten state or in the state of being mixed with or dissolved into a later-described solvent (including the state of molecular dispersion thereof). Even if the fine particle raw material is a liquid or a gas, this may be used in the state of being mixed with or dissolved into a later-described solvent (including the state of molecular dispersion thereof). Further, the fine particle raw material solution including in the state of dispersion solution or slurry may be used.

There is no particular restriction in the fine particle separating substance in preparation of the above-mentioned fine particle so far as the substance can separate the fine particle raw material as the fine particle. For example, in the case of the oxide fine particle, an acidic substance or a basic substance may be used. There is no particular restriction in the fine particle separating substance so far as the substance can separate the fine particle raw material as the fine particle. For example, an acidic substance or a basic substance may be used.

(Basic Substance)

Illustrative example of the basic substance as the fine particle separating substance includes: metal hydroxides such as sodium hydroxide and potassium hydroxide; metal alkoxides such as sodium methoxide and sodium isopropoxide; amine compounds such as triethylamine, diethylamino ethanol, and diethylamine; and ammonia.

(Acidic Substance)

Illustrative example of the acidic substance as the fine particle separating substance includes: inorganic acids such as aqua regia, hydrochloric acid, nitric acid, fuming nitric acid, sulfuric acid, and fuming sulfuric acid; and organic acids such as formic acid, acetic acid, citric acid, chloroacetic acid, dichloroacetic acid, oxalic acid, trifluoroacetic acid, and trichloroacetic acid.

(Solvent Used in the Fine Particle Separation/Preparation Solvent)

In preparation of the fine particle, the fine particle separating solvent including at least the fine particle separating substance is used, wherein it is preferable to prepare the fine particle separating solvent by mixing/dissolving/molecular dispersing at least the fine particle separating substance into a solvent. As to the solvent to be used for preparation of the fine particle raw material solution and the fine particle separating solvent, for example, water, an organic solvent, or a mixed solvent comprising plurality of them may be cited. Illustrative example of the water includes tapped water, ion-exchanged water, purified water, ultra-purified water, and RO water. Illustrative example of the organic solvent includes an alcohol compound solvent, an amide compound solvent, a ketone compound solvent, an ether compound solvent, an aromatic compound solvent, a carbon disulfide, an aliphatic compound solvent, a nitrile compound solvent, a sulfoxide compound solvent, a halogenated compound solvent, an ester compound solvent, an ionic liquid, a carboxylic acid compound, and a sulfonic acid compound. These solvents may be used singly or as a mixture of plurality of them. Illustrative example of the alcohol compound solvent includes: monoalcohols such as methanol and ethanol; and polyols such as ethylene glycol and propylene glycol. In addition, as necessary, the afore-mentioned acidic substance may be mixed in the fine particle raw material solution so far as this does not exert an adverse effect in preparation of the fine particle.

(Preparation Equipment)

The fine particle raw material solution or the fine particle separating solvent mentioned above can be applied to the equipment similar to the dispersion processing equipment used to disperse the fine particles.

(Dispersant, Etc.)

In addition, in accordance with the purpose and necessity, various dispersants or surfactants may be used so far as they do not exert an adverse effect in preparation of the fine particles. There is no particular restriction, wherein generally used various dispersants and surfactants which are commercially available goods, products, newly synthesized substances, or the like may be used. Illustrative example thereof includes an anionic surfactant, a cationic surfactant, a nonionic surfactant, and various polymer dispersants. These may be used singly or as a mixture of two or more of them. The surfactant and dispersant may be included in at least any one of the fine particle raw material solution, the fine particle separating solvent, and the raw material solution for a shell; or they may be used as an independent fluid.

(Reaction Method: Separation Processing Equipment)

In the present invention, there is no restriction in the origin of the fine particle, wherein the fine particle dispersion solution can be obtained by a micro reactor illustrated in FIG. 3 as one example of the separation processing equipment.

The separation processing equipment in this embodiment may be realized by the equipment developed by the applicant of the present invention, as disclosed in Patent Literature 1, International Patent Laid-Open Publication No. 2009/008392, and so forth.

This equipment is provided with two processing members, namely, the first processing member 10 and the second processing member 20, wherein the first processing member 10 rotates. The surfaces of both the processing members 10 and 20 which are facing to each other become the respective processing surfaces. The first processing member 10 is provided with the first processing surface 1, and the second processing member 20 is provided with the second processing surface 2. Both the processing surfaces 1 and 2 are connected to the flow paths d1, d2, and d3 of the first, second, and third fluids to be processed, respectively, and they constitute part of the flow path in which the fluids to be processed are sealed. The distance between the processing surfaces 1 and 2 is usually adjusted to a minute distance of 1 mm or less; for example, in the range of about 0.1 µm to 50 µm. By so doing, the fluids to be processed which pass through between the processing surfaces 1 and 2 become a forced thin film fluid forced by both the processing surfaces 1 and 2.

Then, in this separation processing equipment, the first, the second, or the third fluids to be processed are mixed in between the processing surfaces 1 and 2 so as to cause a reaction thereby performing the fluid processing to separate the fine particles.

To more specifically explain, this equipment is equipped with the first holder 11 for holding the first processing member 10, the second holder 21 for holding the second processing member 20, the surface-approaching pressure imparting mechanism 43, the rotation drive mechanism (not shown in the drawing), the first introduction part d10, the second introduction part d20, the third introduction part d30, and the fluid pressure imparting mechanisms p1 p2 and p3.

In the above-mentioned embodiment, the first processing member 10 and the second processing member 20 are disks with ring forms, wherein a space between the first processing member 10 and the second processing member 20 in the upstream side thereof (in this example, the space in the inner circumference side of the ring) constitutes the first introduction part d10, and the fluid to be processed that is introduced from the first introduction part d10 into between the processing surfaces 1 and 2 is discharged outside the processing surfaces 1 and 2 from the downstream side thereof (in this example, the space in the outer circumference side of the ring). The second introduction part d20 and the third introduction part d30 are opened to at least any one of the processing surfaces 1 and 2, whereby the fluids to be processed thereof join to the fluid to be processed that is introduced into between the processing surfaces 1 and 2 from the first introduction part d10 in the midway thereof so that these fluids to be processed are mixed between the processing surfaces 1 and 2. The opening of the third introduction part d30 is located in the downstream side of the opening of the second introduction part d20 (in this example, outside in the radius direction). These fluids to be processed become a forced thin film fluid which tends to move to the downstream side of both the processing surfaces 1 and 2. At this time, by rotating at least any one of the processing members 10 and 20, the mixed fluid to be processed moves spirally from the inside to the outside thereof by a synthetic vector acting on the fluid to be processed, the vector being composed of a moving vector toward the radius direction of the ring and a moving vector toward the circumferential direction.

In the above-mentioned embodiment, the second holder 21 is fixed to the equipment, and the first holder 11 attached to a rotary shaft 50 of the rotation drive mechanism rotates, and thereby the first processing member 10 attached to this first holder 11 rotates relative to the second processing member 20. As a matter of course, the second processing member 20 may be made to rotate, or the both may be made to rotate. In this embodiment, the rotation speed can be set, for example, in the range of 350 to 5000 rpm.

In the above-mentioned embodiment, the second processing member 20 approaches to and separates from the first processing member 10 in the direction of the rotary shaft 50, wherein a side opposite to the second processing surface 2 of the second processing member 20 is accepted in an accepting part 41 arranged in the second holder 21 so as to be able to rise and set. However, in contrast to the above, the first processing member 10 may approach to and separate from the second processing member 20, or both the processing members 10 and 20 may approach to and separate from with each other.

The surface-approaching pressure imparting mechanism is a mechanism to generate a force (hereinafter, surface-approaching pressure) to press the first processing surface 1 of the first processing member 10 and the second processing surface 2 of the second processing member 20 in the direction to make them approach to each other, wherein the mechanism using the spring 43, a fluid pressure, a gravity, or the like may be employed. By the balance (pressure balance) between the surface-approaching pressure and the separating force between the processing surfaces 1 and 2 by the fluid pressure of the first to third fluids to be processed (hereunder, this is referred to as the separating force), the thin film fluid having a minute film thickness ranging from a nanometer order to a micron order is generated with keeping a prescribed minute clearance between the processing surfaces 1 and 2.

Here, as shown in FIG. 1(B), in the first processing surface 1 of the first processing member 10, a groove-like depression 13 extended toward an outer side from the central part of the first processing member 10, namely in a radius direction, may be formed. The depression 13 may be formed in at least any one of the first and second processing surfaces 1 and 2. By forming the depression 13 as mentioned above, the micro-pump effect can be obtained so that the fluid to be processed may be sent into between the first and second processing surfaces 1 and 2.

The introduction parts d20 and d30 are preferably arranged in the position which is opposite to the flat surface 16 without the depression 13. Especially, openings of the introduction parts d20 and d30 are preferably arranged in the position which is opposite to the flat surface 16 and is located in the downstream of the point at which the flow direction of the first fluid to be processed that is introduced by the micro pump effect changes to a spiral and laminar flow direction caused between the processing surfaces. By so doing, mixing of a plurality of fluids to be processed and separation of the fine particles therefrom can be effected under the condition of a laminar flow.

It is preferable that the second introduction part d2 has a direction. For example, introduction directions from the introduction parts d20 and d30 can be slanted with a prescribed elevation angle to the second processing surface 2, so that the second fluid to be processed can be introduced into between the processing surfaces 1 and 2 with suppressing generation of the turbulence to the flow of the first fluid to be processed. Alternatively, introduction from the introduction parts d20 and d30 may have a direction in the plane along the second processing surface 2.

The fluid to be processed that is mixed and then discharged to outside the processing members 10 and 20 is collected as the fine particle dispersion solution into a container (not illustrated in the drawing) via a vessel v, or sent to the dispersion solution reformation equipment 100 illustrated in FIG. 1 without going through the container.

In the separation processing equipment according to the embodiment of FIG. 3(A) with which the core-shell type fine particle is produced, the region between the opening d20 and the opening d30 in the region between the processing surfaces 1 and 2 is the region for separation and formation of the core of the fine particle regarding the core of microparticle. On the other hand, the region in the downstream (outside in the drawing) of the opening d30 in the region between the processing surfaces 1 and 2 is the region for separation of the oxide, i.e., a covering material which becomes the shell. However, separation of the core of the fine particle and separation of the oxide, i.e., a covering material which becomes the shell, take place continuously, so that these two processes may not be completely separated. In other words, even after separation of the covering material which becomes the shell starts, separation or growth of the fine particle which becomes the core may be partially continued.

Although, in the embodiment illustrated in FIG. 3(A), kinds of the fluid to be processed and numbers of the flow path thereof are set to 3 respectively, they may be set to 2; however, in order to separately introduce as other fluid a surfactant, a disperser, or the like, 4 or more of the flow paths may be formed.

In addition, the opening for the introduction part arranged in each processing member is not particularly restricted in its form, size, and number, so that in practice, they may be changed as appropriate. For example, it may be a circular ring form, or plural openings discontinuously arranged in a circular ring, or a single opening.

EXAMPLES

Hereunder, the present invention will be described more specifically by showing Examples. However, the present invention is not limited to Examples described below. As Examples and Comparative Examples, following experiments were carried out. In each Experimental Example, the first fluid to be processed that is introduced from the first introduction part d10 of the separation processing equipment illustrated in FIG. 3(A) is designated as the A-solution; and likewise the second fluid to be processed that is introduced from the second introduction part d20 of the separation processing equipment (B) is designated as the B-solution. In these Examples, the third introduction part d30 was not arranged so that the third fluid to be processed was not used, except for during the time when the fine particle dispersion solutions to perform Experimental Examples C1 to C3 were prepared.

Outline of Experimental Examples

In order to show Examples and Comparative Examples of the present invention, following experiments were carried out for the fine particles roughly classified into 3 groups, Experimental Examples A, B, and C. Experimental Examples A relate to reformation of metal fine particle dispersion solutions, wherein in Figures and Tables with regard to Experimental Examples A, numbers starting from A1 are used. Experimental Examples B relate to reformation of organic substance fine particle dispersion solutions, wherein in Figures and Tables with regard to Experimental Examples B, numbers starting from B1 are used. Experimental Examples C relate to reformation of oxide fine particle dispersion solutions, wherein in Figures and Tables with regard to Experimental Examples C, numbers starting from C1 are used.

Experimental Examples A: Experiments with Regard to Metal Fine Particle Dispersion Solutions Experimental Examples A illustrate reformation of the silver-copper metal alloy fine particle dispersion solution as reformation of the metal fine particle dispersion solution. In these Experimental Examples relating to the metal fine particle dispersion solution, effects to enhance the dispersion property of the fine particle are shown.

Experimental Examples A: Experiments with Regard to Metal Fine Particle (Silver-Copper Metal Alloy Fine Particle) Dispersion Solutions Results of Experimental Examples A1 are summarized in Table A4-1. The assessment standard of precipitation degree, which shows the dispersion stability in Table A4-1, is as follows.
Assessment A: precipitation was not substantially confirmed at the time passage of 2 weeks.
Assessment B: precipitation was confirmed at the time passage of 2 weeks, but very faintly.
Assessment C: precipitation was confirmed at the time passage of 2 weeks, but a few.
Assessment D: precipitation was confirmed at the time passage of 2 weeks.
Assessment E: much precipitation was confirmed at the time passage of 2 weeks.
Assessment F: very much precipitation was confirmed at the time passage of 2 weeks.
Assessment of the precipitation degree was made by confirming the precipitation with visual observation of the dispersion solution filled in the beaker, by viewing from up, side, and bottom thereof. The above assessments were made by comprehensively judging the height of the precipitation, the brightness and darkness of the precipitation (it is presumed that precipitation is more in the dark precipitation than in the bright precipitation), the variance of the precipitation, and the clear separation to two phases. Meanwhile, these assessments are the same in all of Experimental Examples A, B, and C.

Experimental Examples A

As the previous processes before obtaining the dispersion solution, the metal raw material solution and the metal separating solvent each were prepared by using Clearmix (product name: CLM-2.2S, manufactured by M. Technique Co., Ltd.), which is a high speed rotational dispersion emulsifier. Specifically, according to the prescription of the first fluid (A-solution) described in Table A1, each component of the metal raw material solution were uniformly mixed by stirring for 30 minutes at the preparation temperature of 50° C. using Clearmix with the rotation number of the rotor thereof being 20000 rpm to obtain the metal raw material solution. Also, according to the prescription of the second fluid (B-solution) described in Table A1, each component of the metal separating solvent were uniformly mixed by stirring for 30 minutes at the preparation temperature of 45° C. using Clearmix with the rotation number of the rotor thereof being 15000 rpm to obtain the metal separating solvent.

Meanwhile, the substances represented by chemical formula or abbreviation described in Table A1 are $AgNO_3$ for silver nitrate (manufactured by Kanto Chemical Co., Ltd.), $Cu(NO_3)_2 \cdot 3H_2O$ for copper nitrate trihydrate (manufactured by Kanto Chemical Co., Ltd.), EG for ethylene glycol (manufactured by Kishida Chemical Co., Ltd.), HMN for hydrazine monohydrate (manufactured by Kanto Chemical Co., Ltd.), PVP for polyvinyl pyrrolidinone (K=30) (manufactured by Kanto Chemical Co., Ltd.), DMAE for 2-dimethylamino ethanol (manufactured by Kanto Chemical Co., Ltd.), and KOH for potassium hydroxide (product name: Kasei Kari Flake, manufactured by Nippon Soda Co., Ltd.). Pure water with pH of 5.86 (measurement temperature of 18.4° C.) and conductivity of 0.83 μS/cm (measurement temperature of 18.3° C.) was used.

Next, as the process to obtain the dispersion solution, the metal raw material solution and the metal separating solvent, both having been prepared as described above, were mixed by using the separation processing equipment illustrated in FIG. 3(A). In these Experimental Examples, the third introduction part d30 was not arranged, so that the third fluid to be processed was not used (not illustrated in the drawing). Specifically, the metal raw material solution was introduced as the A-solution into between the processing surfaces 1 and 2; and with operating the processing member 10 with the rotation number of 1700 rpm, the metal separating solvent was introduced as the B-solution into the processing surfaces 1 and 2 so as to mix the metal separating solvent and the metal raw material solution in a thin film fluid, whereby the metal fine particles were separated in between the processing surfaces 1 and 2. As a result, the fluid including the metal fine particles (metal fine particle dispersion solution) was ejected from between the processing surfaces 1 and 2 of the separation processing equipment. The ejected metal fine particle dispersion solution was recovered in a beaker via the vessel v.

In Table A2, operation conditions of the separation processing equipment are summarized. The introduction temperatures (supply temperatures) and introduction pressures (supply pressures) of the A-solution and B-solution described in Table A2 were measured by using the thermometers and pressure meters installed in the sealed introduction paths to between the processing surfaces 1 and 2 (first introduction part d1 and second introduction part d2), wherein the introduction temperature of the A-solution in Table A2 is the temperature of the actual A-solution under the introduction pressure in the first introduction part d1, and likewise the introduction temperature of the B-solution in the same table is the temperature of the actual B-solution under the introduction pressure in the second introduction part d2.

Measurement of pH was made by using a pH meter (catalogue No. D-71; manufactured by HORIBA, Ltd.). Before the A-solution and B-solution were introduced into the separation processing equipment, pH of these solutions were measured at the temperatures described in Table A1. Because pH measurement of the mixed fluid immediately after the metal raw material solution was mixed with the metal separating solvent was difficult, the metal fine particle dispersion solution was ejected from the equipment and recovered in the beaker, and then pH thereof was measured at room temperature.

TABLE A1

The prescription of the first fluid (A-solution)

| | | Prescription | | | | | pH | |
|---|---|---|---|---|---|---|---|---|
| Material | [wt %] | Material | [wt %] | Material | [wt %] | Ag:Cu [mol ratio] | pH | ° C. |
| AgNo3 | 0.038 | $Cu(NO_3)_2 \cdot 3H_2O$ | 0.054 | EG | 99.908 | 1:1 | 2.85 | 38.6 |

The prescription of the second fluid (B-solution)

| | | | | Prescription | | | | | | | | pH | |
|---|---|---|---|---|---|---|---|---|---|---|---|---|---|
| Material | [wt %] | Material | [wt %] | Material | [wt %] | Material | [wt %] | Material | [wt %] | Material | [wt %] | pH | ° C. |
| HMH | 20.00 | PVP | 9.75 | DMAE | 5.00 | KOH | 2.55 | Pure water | 7.45 | EG | 55.25 | >14 | — |

TABLE A2

| | Introduction flow amount ml/min | | Introduction temperatures (supply temperatures) [° C.] | | Introduction pressures (supply pressures) [MPaG] | | Discharged solution | |
|---|---|---|---|---|---|---|---|---|
| Experimental Examples | A solution | B solution | A solution | B solution | A solution | B solution | pH | Temperature |
| A | 1000 | 100 | 148 | 50 | 0.231 | 0.10 | 11.42 | 54.1 |

Experimental Examples A1

The reformation experiments of the dispersion solution relating to Experimental Examples A1 correspond to Examples of the present invention.

In the process of reforming the dispersion solution, from the metal fine particle dispersion solution which was ejected from the separation processing equipment and then recovered in the beaker, impurities were removed and pH thereof was controlled by using the dispersion solution reformation equipment 100 illustrated in FIG. 1(A). In Table A3 to be described later, the methods and conditions of the reformation process of respective Experimental Examples A1 to A4 of the present invention are summarized. Specifically, first, 5 kg of pure water ((1) in Table A3; pH; 5.86 (measurement temperature of 23.2° C.), conductivity: 0.83 µS/cm (measurement temperature of 23.1° C.)) was charged into the storing vessel 130 illustrated in FIG. 1(A); and then, operation of the pump 104 was started so as to supply the pure water into the dispersing vessel 101 equipped with the disperser 102 ((3) in Table A3, Clearmix (product name: CLM-2.2S, rotor: R1, screen: S0.8-48, manufactured by M. Technique Co., Ltd.)), which is the high speed rotational dispersion emulsifier. The pure water sent by the pump 104 filled the dispersing vessel 101 and overflowed therefrom so as to be sent to the removing unit 120, wherein part thereof, together with the cross-flow washing solution, was discharged as the filtrate L3, and the rest thereof was returned to the storing vessel 130. The removing unit 120 equipped with the filtration membrane (hollow fiber type dialyzer; (4) in Table A3, product name; APS-21MD New, membrane area; 2.1 m², material; polysulfone, manufactured by Asahi Kasei Medical Co., Ltd.) was used, into which the pure water ((2) in Table A3; pH; 5.86 (measurement temperature of 23.2° C.), conductivity: 0.83 µS/cm (measurement temperature of 23.1° C.)) was supplied as the cross-flow washing solution at the flow rate of 1.5 L/minute and the temperature of 21° C.

Next, operation of the disperser 102 was started with setting the rotation number of the rotor thereof to 20000 rpm ((5) in Table A3, circumferential velocity of 31.4 m/sec). When the pure water in the storing vessel 130 was discharged until 1 L (about 1 kg), 3 L (about 3 kg) of the metal fine particle dispersion solution, which was ejected from the separation processing equipment and then recovered in the beaker (hereinafter, this solution is referred to as the metal fine particle dispersion solution), was charged into the storing vessel 130 ((6) and (7) in Table A3). The metal fine particle dispersion solution was mixed with the pure water being circulated in the equipment; and similarly to the pure water mentioned above, this solution was circulated from the vessel to the dispersion processing equipment and to the vessel via the filtration membrane. At this time, in the storing vessel 130, pH of the metal fine dispersion solution was 11.39 (measurement temperature of 25.4° C.) ((8) in Table A3), and the conductivity thereof was 645 µS/cm (measurement temperature of 25.1° C.) ((9) in Table A3) (shown in Experimental Example A1-1 in Table A4-1).

The metal fine particle dispersion solution was dispersed in the dispersing vessel 101, and sent to the removing unit 120, and then filtrated, whereby the filtrate L3 including the impurities was discharged together with the cross-flow washing solution. The metal fine particle dispersion solution sent at the flow rate of 6.4 L/minute by means of the pump 104 ((10) in Table A3) was returned again to the storing vessel 130 at the flow rate of 5.4 L/minute ((11) in Table A3), indicating that the filtrate L3 including the impurities was discharged at the flow rate of 1.0 L/minute through the filtration membrane of the removing unit 120 ((12) in Table A3).

When the metal fine particle dispersion solution in the storing vessel 130 was concentrated to 2.0 L (about 2.0 kg), 3 L (about 3.0 kg) of pure water (pH; 5.86 (measurement temperature of 23.2° C.), conductivity: 0.83 µS/cm (measurement temperature of 23.1° C.)) was charged into the storing vessel 130 ((13) and (14) in Table A3). The operation was continued without changing the condition before, during, and after the charge thereof so as to remove the impurities in the metal fine particle dispersion solution. Between during concentration (2.0 L of the dispersion solution) and during dilution (5 L of the dispersion solution), concentration of the metal fine particles in the metal fine particle dissolution solution fluctuated between 0.1% by weight and 0.2% by weight ((15) in Table A3). With regard to the pressure meters in FIG. 1, both two Pa indicated 0.10 MPaG, Pb indicated 0.15 MPaG, and Pc indicated 0.02 MPaG ((16), (17), and (18) in Table A3). With regard to the just-before transporting path from the dispersing vessel 101 to the removing unit 120, the path length (Lea) was 0.3 m ((19) in Table A3) and the pipe's inner diameter (Leb) was 0.0105 m ((20) in Table A3). The flow rate of the fine particle dispersion solution in the just-before transporting path was 1.2 m/sec ((21) in Table A3), and the time T1 from the dispersing vessel 101 to start of removal of the impurity by the removing unit 120 was 0.24 sec (0.24 seconds) ((22) in Table A3), that is, the removal process to remove the impurities from the dispersion solution started within 3 seconds after the impurities were discharged into the dispersion solution. From the thermometer (not illustrated in the drawing) installed in the dispersing vessel 101, the temperature was in the range of 25 to 29° C. ((23) in Table A3), and the temperature of the metal fine particle dispersion solution in the storing vessel 130 was in the range of 24 to 29° C. ((24) in Table A3) during this processing. Meanwhile, for measurement of conductivity, the conductivity meter (catalogue number; ES-51, manufactured by HORIBA, Ltd.) was used ((25) in Table A3).

TABLE A3

|  |  | Experimental example A1 | Experimental example A2 | Experimental example A3 | Experimental example A4 |
|---|---|---|---|---|---|
|  | Processed liquid | Metal fine dispersion solution: Silver copper alloy nano particle dispersion solution | Same as on the left | Same as on the left | Same as on the left |
| (1) | First solution charged into the storing vessel 130 | Type: Pure Water, pH 5.86 (measurement temperature of 23.2° C.), Conductivity 0.83 µS/cm (measurement temperature of 23.1° C.), Charged amount 5 kg | Same as on the left | Same as on the left | Same as on the left |

TABLE A3-continued

|   | | Experimental example A1 | Experimental example A2 | Experimental example A3 | Experimental example A4 |
|---|---|---|---|---|---|
| (2) | Type, flow amount, and temperature of the cross-flow washing solution | Type: Pure Water, pH 5.86 (measurement temperature of 23.2° C.), Conductivity 0.83 μS/cm (measurement temperature of 23.1° C.), Flow amount 1.5 L/min, 15° C. | Same as on the left | Same as on the left | Same as on the left |
| (3) | Disperser 102 | Clearmix (product name: CLM-2.2S, rotor: R1, screen: S0.8-48, manufactured by M. Technique Co., Ltd.) | Same as on the left | Same as on the left | Not installed |
| (4) | Removing unit 120 | hollow fiber type dialyzer (product name; APS-21MD New, membrane area; 2.1 m², material; polysulfone, manufactured by Asahi Kasei Medical Co., Ltd.) | Same as on the left | Same as on the left | Same as on the left |
| (5) | Rotation number of the rotor | 20000 rpm (circumferential velocity of 31.4 m/sec) | 15000 rpm (circumferential velocity of 23.6 m/sec) | 6000 rpm (circumferential velocity of 7.9 m/sec) | — |
| (6) | Starting to charge the metal fine particle dispersion solution | When the pure water in the storing vessel 130 was discharged until 1 L. | Same as on the left | Same as on the left | Same as on the left |
| (7) | Amount of the metal fine particle dispersion solution charged into the storing vessel 130 | 3 L (≈3 kg) | Same as on the left | Same as on the left | Same as on the left |
| (8) | pH of the metal fine dispersion solution in the storing vessel 130 | 11.39 (measurement temperature of 25.4° C.) | Same as on the left | Same as on the left | Same as on the left |
| (9) | Conductivity of the metal fine dispersion solution in the storing vessel 130 | 645 μS/cm (measurement temperature of 25.1° C.) | Same as on the left | Same as on the left | Same as on the left |
| (10) | Flow amount of the pump 104 | 6.4 L/min | Same as on the left | Same as on the left | Same as on the left |
| (11) | Flow amount of the metal fine dispersion solution returned to the storing vessel 130 | 5.4 L/min | Same as on the left | Same as on the left | Same as on the left |
| (12) | Amount of the filtrate L3 discharged by the removing unit 120 (Calculated value) | 1.0 L/min | Same as on the left | Same as on the left | Same as on the left |
| (13) | Timing of charging the dilution into the storing vessel 130 | When the metal fine particle dispersion solution in the storing vessel 130 was concentrated to 2.0 L (about 2.0 kg). | Same as on the left | Same as on the left | Same as on the left |
| (14) | Type and amount of the second dilution charged into the storing vessel 130 | Type: pure water, 3 L (≈3.0 kg), (pH: 5.86 (measurement temperature of 23.2° C.), conductivity: 0.83 μS/cm (measurement temperature of 23.1° C.)) | Same as on the left | Same as on the left | Same as on the left |
| (15) | Concentration of the metal fine particles in the metal fine particle dissolution solution | Between 0.1 wt % to 0.2 wt % | Same as on the left | Same as on the left | Same as on the left |
| (16) | Pressure meters | Pa: Both two 0.10 MPaG | Same as on the left | Same as on the left | Same as on the left |
| (17) | Pressure meters | Pb: 0.15 MPaG | Same as on the left | Same as on the left | Same as on the left |
| (18) | Pressure meters | Pc: 0.02 MPaG | Same as on the left | Same as on the left | Same as on the left |
| (19) | Path length (Lea) | 0.3 m | Same as on the left | Same as on the left | — |
| (20) | Pipe's inner diameter (Leb) | 0.0105 m | Same as on the left | Same as on the left | — |
| (21) | Flow rate of the fine particle dispersion solution in the just-before transporting path | 1.2 m/sec | Same as on the left | Same as on the left | — |
| (22) | Time T1 from the dispersing vessel 101 to start of removal of the impurity by the removing unit 120 | 0.24 sec | Same as on the left | Same as on the left | — |
| (23) | thermometer installed in the dispersing vessel 101 | From 25° C. to 29° C. | Same as on the left | Same as on the left | Same as on the left |
| (24) | temperature of the metal fine particle dispersion solution | From 24° C. to 29° C. | Same as on the left | Same as on the left | Same as on the left |

TABLE A3-continued

|  | Experimental example A1 | Experimental example A2 | Experimental example A3 | Experimental example A4 |
|---|---|---|---|---|
| (25) Conductivity meter | Conductivity meter (catalogue number; ES-51, manufactured by HORIBA, Ltd.) | Same as on the left | Same as on the left | Same as on the left |

During the time of continuing the above process, part of the metal fine particle dispersion solution was withdrawn from the storing vessel 130 at an interval; and these are designated as Experimental Examples A1-1 to A1-6, and the dispersion solutions obtained by adding a pH adjusting agent to the metal fine particle dispersion solution of Experimental Example A1-6 are designated as Experimental Examples A1-7 and A1-8. Concentration of the metal fine particles in all the metal fine particle dispersion solutions of Experimental Examples A1-1 to A1-8 was 0.2% by weight as the silver-copper metal alloy. In Table A4-1, pH, conductivity, and residual rate of PVP in the metal fine particle dispersion solution during reformation process of the metal fine particle dispersion solution are summarized.

As can be seen in Table A4-1, by carrying out the reformation process, pH and conductivity of the metal fine particle dispersion solution approached almost the same values as those of the cross-flow washing solution and the pure water charged into the storing vessel 130. In each of Experimental Examples A1-1 to A1-8, part of the withdrawn metal fine particle dispersion solution was diluted, and this diluted solution was dropped onto a collodion film and dried in an atmosphere for 4 hours to obtain the sample for TEM observation. Meanwhile, the PVP residual rate described above was obtained as follows. Namely, with regard to the metal fine particle dispersion solution obtained during the reformation process of each of the dispersion solutions of Experimental Examples A1-1 to A1-8, concentration of the silver-copper meal alloy, i.e., the metal fine particle in the solution, was calculated by the ICP analysis; and the value obtained by subtracting this concentration of the silver-copper metal alloy from the solid concentration obtained by drying a part of the dispersion solution under vacuum was taken as the PVP concentration; and the ratio of this PVP concentration to the concentration of the silver-copper metal alloy was calculated with assuming the residual rate at the starting time of the reformation process of the dispersion solution as 100%.

(Dispersion Stability and Self-Dispersion Property)

In the metal fine particle dispersion solutions of Experimental Examples A1-1 and A1-2, precipitation was confirmed at the time described in the initial precipitation confirmation time in Table A4-1, wherein it was confirmed that the dispersion solution was separated into the phase including the metal fine particles and the phase not substantially including the metal fine particles. Meanwhile, the initial deposition confirmation time is the time when precipitation of the fine particles was confirmed for the first time after the pH control was started with addition of the pH adjusting agent to the dispersion solution withdrawn during the reformation process. This assessment method is all the same in Experimental Examples A, B, and C to be described later. In Experimental Examples A1-3 and A1-4, precipitation of the metal fine particles was faintly observed at 1 week of the static state after the withdrawal. In the metal fine particle dispersion solution of Experimental Example A1-5, precipitation of an extremely minute amount of the metal fine particles was observed at 1 week of the static state after the withdrawal, but the precipitation amount thereof was about 0.1% by weight relative to the metal fine particles included in the dispersion solution. However, with regard to the metal fine particle dispersion solution of Experimental Example A1-6 prepared with the prolonged processing time from Experimental Example A1-5, precipitation of the metal fine particles was clearly observed at 0.5 hours of the static state after the withdrawal, wherein it was confirmed that the phase including the metal fine particles and the phase not substantially including the metal fine particles were separated. It became clear that the dispersion property of the metal fine particles in the metal fine particle dispersion solution can be controlled by controlling pH or conductivity thereof on the basis of the processing time of the metal fine particle dispersion solution using the dispersion solution reformation equipment of the present invention. Furthermore, with regard to Experimental Example A1-5, it was confirmed that the precipitation of the metal fine particles at

TABLE A4-1

| Experimental Example | Processing duration [h] | pH pH | pH [° C.] | Conductivity [μS/cm] | Conductivity [° C.] | pH after preparation pH | pH after preparation [° C.] | Conductivity after preparation [μS · cm] | Conductivity after preparation [° C.] | Dispersion Stability initial precipitation confirmation time | Dispersion Stability Precipitation degree | PVP residual rate [%] |
|---|---|---|---|---|---|---|---|---|---|---|---|---|
| A1-1 | 0.00 | 11.39 | 25.4 | 645 | 25.1 | — | — | — | — | 0.5 hour | F | 100 |
| A1-2 | 0.25 | 10.21 | 25.4 | 216 | 25.4 | — | — | — | — | 1 hour | F | 85.6 |
| A1-3 | 0.50 | 8.14 | 25.8 | 9.46 | 25.9 | — | — | — | — | 1 week | B | 74.1 |
| A1-4 | 1.00 | 7.77 | 26.1 | 6.54 | 26.4 | — | — | — | — | 1 week | B | 48.6 |
| A1-5 | 1.50 | 6.98 | 27.4 | 5.15 | 26.9 | — | — | — | — | 1 week | A | 32.4 |
| A1-6 | 2.00 | 5.97 | 28.1 | 1.16 | 28.2 | — | — | — | — | 0.5 hour | F | 28.4 |
| A1-7 | Adjusting pH of dispersion solution of Experimental Example A1-6 by using pH adjusting agent | | | | | 6.73 | 25.1 | 4.16 | 25.3 | 1 week | A | 28.4 |
| A1-8 | Adjusting pH of dispersion solution of Experimental Example A1-6 by using pH adjusting agent | | | | | 7.74 | 25.6 | 5.94 | 25.6 | 1 week | B | 28.4 |

2 weeks of the static state after the withdrawal decreased, whereby the precipitation could not be substantially confirmed, from the precipitation thereof at 1 week of the static state after the withdrawal. When pH of the metal fine particle dispersion solution was controlled in the range of 6.5 to 8.5, the dispersion property of the metal fine particles included in the metal fine particle dispersion solution could be enhanced; and when pH of the metal fine particle dispersion solution was controlled in the range of 6.5 to 7.5, in the metal fine particles of the metal fine particle dispersion solution, the precipitation once generated at 1 week of the static state was re-dispersed without carrying out any dispersion process, so that it was presumed that the dispersion solution included the metal fine particles having self-dispersion property.

(Adjustment of pH after Completion of Dispersion Process and Removal Process)

An aqueous 0.05% by weight of ammonia solution was added as the pH adjusting agent into the metal fine particle dispersion solution of Experimental Example A1-6, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples A1-7 and A1-8. The results of Experimental Examples A1-7 and A1-8 are summarized in Table A4-1. Experimental Example A1-7 in which pH was adjusted at 6.73 (measurement temperature of 25.1° C.) and conductivity at 4.16 µS/cm (measurement temperature of 25.3° C.) exhibited similar dispersion stability and self-dispersion property to those of the metal fine particle dispersion solution of Experimental Example A1-5.

Experimental Example A1-8 in which pH was adjusted at 7.74 (measurement temperature of 25.6° C.) and conductivity at 5.94 µS/cm (measurement temperature of 25.6° C.) exhibited similar dispersion stability and self-dispersion property to those of the metal fine particle dispersion solutions obtained under the conditions of Experimental Examples A1-3 and A1-4.

(Assessment of Dispersion Property: TEM Observation)

Figure 4:
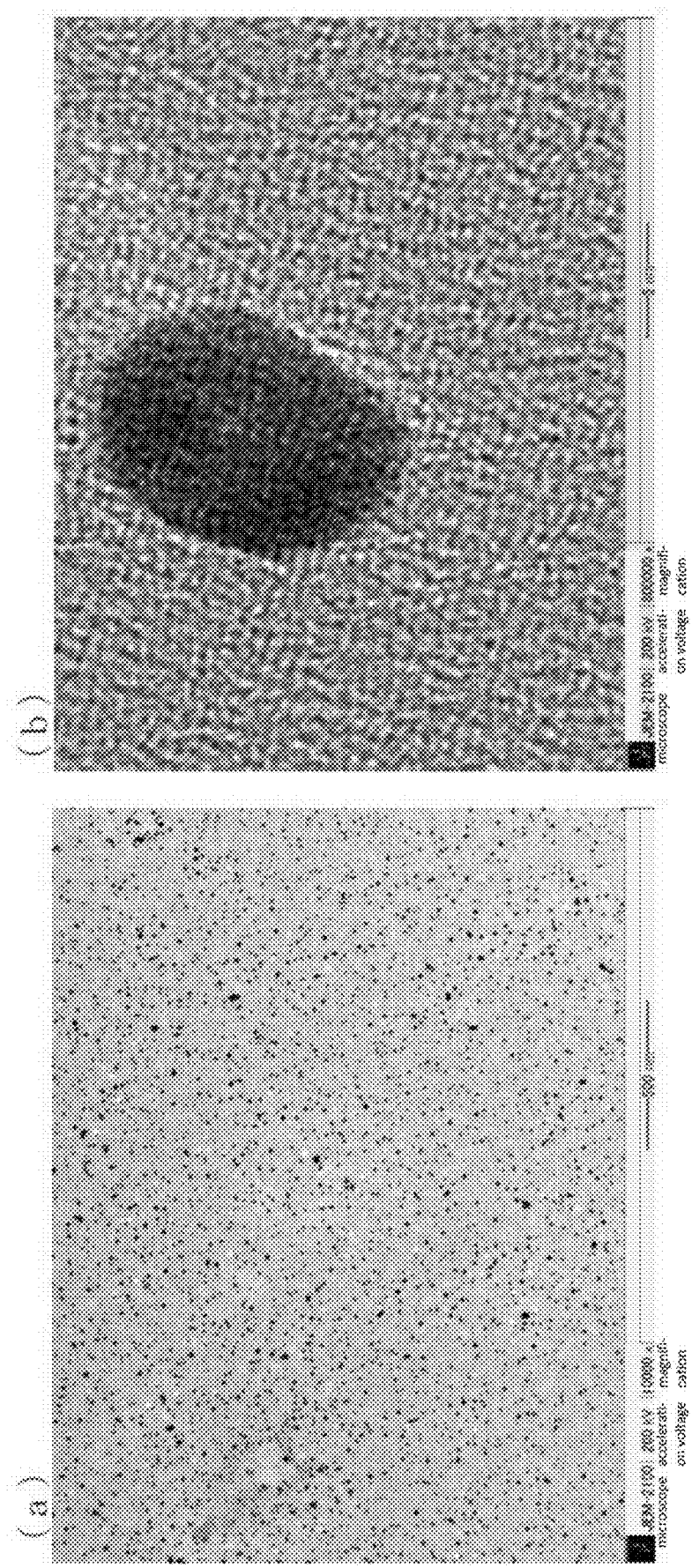
FIG. 4
These are the TEM pictures of the fine particles in the fine particle dispersion solution obtained in Experimental Example A1-5 of the present invention. Meanwhile, (a) and (b) are the observation results with the magnification of 10000 and 800000, respectively.

The TEM pictures of the metal fine particles in the metal fine particle dispersion solution of Experimental Example A1-5 are shown in FIG. 4. From the TEM picture with the magnification of 10000 in FIG. 4(a), it was confirmed that the metal fine particles were uniformly dispersed. From the TEM picture with the magnification of 800000 in FIG. 4(b), it was confirmed that the primary particle's diameter thereof was about 10 nm. Similar results were obtained in the metal fine particles obtained under the condition of Experimental Example A1-7 (not shown by the drawing). Meanwhile, the TEM observation in Experimental Examples A was made by using the transmission electron microscope (JEM-2100, manufactured by JEOL Ltd.), wherein dispersion property of the metal fine particle dispersion solution was assessed under the observation conditions with the acceleration voltage of 200 kV and the observation magnification of 10000 or more.

Figure 5:
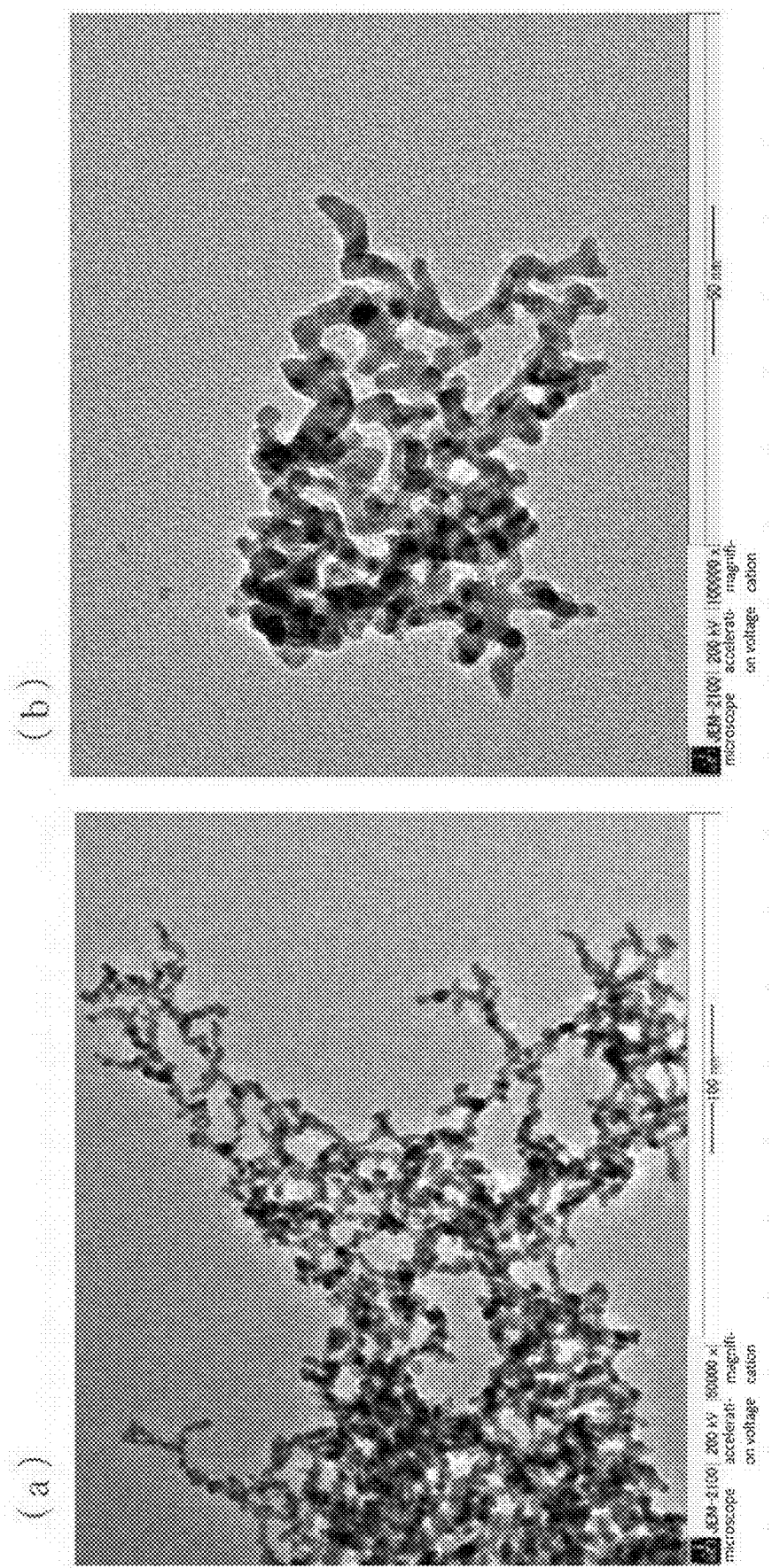
FIG. 5
These are the TEM pictures of the fine particles in the fine particle dispersion solution obtained in Experimental Example A1-6 of the present invention. Meanwhile, (a) and (b) are the observation results with the magnification of 50000 and 100000, respectively.

The TEM pictures of the metal fine particles obtained under the condition of Experimental Example A1-6 are shown in FIG. 5. From the TEM pictures with the magnification of 50000 shown in FIG. 5(a) and with the magnification of 100000 shown in FIG. 5(b), it was observed that as compared with Experimental Example A1-5, the metal fine particles aggregated with more number of the aggregates.

Figure 6:
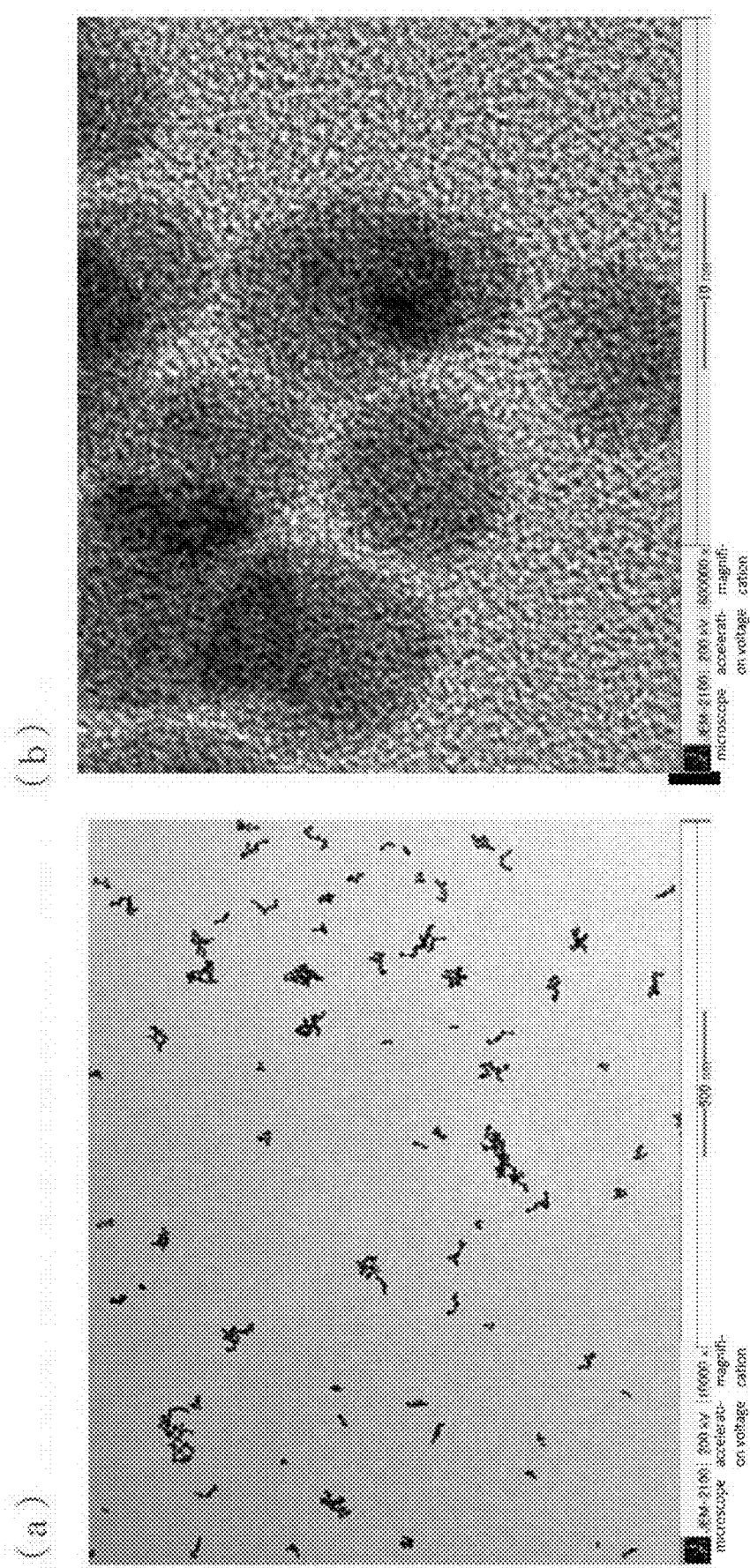
FIG. 6
These are the TEM pictures of the fine particles in the fine particle dispersion solution obtained in Experimental Example A1-4 of the present invention. Meanwhile, (a) and (b) are the observation results with the magnification of 10000 and 600000, respectively.

The TEM pictures of the metal fine particles obtained under the condition of Experimental Example A1-4 are shown in FIG. 6. From the TEM pictures with the magnification of 10000 shown in FIG. 6(a) and with the magnification of 600000 shown in FIG. 6(b), it was observed that the metal fine particles aggregated more as compared with Experimental Example A1-5; however, number of the aggregates thereof was less as compared with the metal fine particles obtained under the condition of Experimental Example A1-6, and the metal fine particles were dispersed uniformly. Similar results were obtained in the metal fine particles of Experimental Examples A1-3 and A1-8 (not shown by the drawing).

The TEM pictures of Experimental Examples A1-1 and A1-2 were taken immediately after start of the washing process of the metal fine particle dispersion solution; therefore, not only aggregates of the metal fine particles similar to those of Experimental Example A1-6 but also impurities (KOH, $KNO_3$, etc.) were observed (not shown by the drawing).

As can be seen in the foregoing results, the dispersion property of the metal fine particles included in the metal fine particle dispersion solution could be controlled by preparing the metal fine particle dispersion solution by using the equipment comprising the disperser and the equipment with which impurities were removed from the metal fine particle dispersion solution by the cross-flow method using the filtration membrane. In addition, it was found that the dispersion stability could be enhanced by controlling pH of the metal fine particle dispersion solution in the range of 6.5 to 8.5. Furthermore, even if the dispersion property of the metal fine particles in the metal fine particle dispersion solution was decreased, for example, by bringing pH of the metal fine particle dispersion solution at 5.97, it was found that when pH of this metal fine particle dispersion solution was re-adjusted to the range of 6.5 to 8.5, the dispersion stability could be enhanced. Namely, it was found that dispersion property of the metal fine particles in the metal fine particle dispersion solution could be controlled also by controlling pH or conductivity after the removal process of the impurities in the reformation method of the dispersion solution of the present invention. In addition, it was found that PVP in the metal fine particle dispersion solution could also be reduced by carrying out the foregoing processes.

Experimental Examples A2, A3, and A4

In Experimental Examples A2 and A3, the reformation process was carried out by the same method as that of Experimental Examples A1, except that the rotation number of the disperser 102 (Clearmix) in Experimental Examples A1 was changed. Experimental Examples A4 were carried out by the same method as that of Experimental Examples A1, except that the disperser 102 and the dispersing vessel 101 in the equipment illustrated in FIG. 1(A) were removed, thereby the filtration was carried out by directly sending the metal fine particle dispersion solution filled in the storing vessel 130 to the removing unit 120 by using the pump 104. The rotation number of the disperser in Experimental Examples A2 was changed to 15000 rpm (circumferential velocity of 23.6 m/sec), and that of Experimental Examples A3 was changed to 6000 rpm (circumferential velocity of 7.9 m/sec, Experimental Examples A3), but the path length (Lea), the pipe's inner diameter (Leb), and the flow rate of the fine particle dispersion solution in the just-before transporting path from the dispersing vessel 101 to the removing unit 120, as well as the time T1 from the dispersing vessel 101 to start of removal of the impurity with the removing unit 120 were set to the same as those of Experimental Examples A1. The conditions of Experimental Examples A2, A3, and A4 are summarized in Table A3; the results of Experimental Examples A2 are summarized in Table A4-2, the results of Experimental Examples A3 are summarized in Table A4-3, and the results of Experimental Examples A4 are summarized in Table A4-4. Meanwhile, the reformation experiments of Experimental Examples A2 correspond to Examples of the present invention; and the reformation experiments of Experimental Examples A3 and A4 correspond to Comparative Examples of the present invention.

TABLE A4-2

| Experimental Example | Processing duration [h] | pH | pH [°C.] | Conductivity [μS/cm] | Conductivity [°C.] | pH after preparation pH | pH after preparation [°C.] | Conductivity after preparation [μS·cm] | Conductivity after preparation [°C.] | Dispersion Stability initial precipitation confirmation time | Precipitation degree |
|---|---|---|---|---|---|---|---|---|---|---|---|
| A2-1 | 0.00 | 11.39 | 25.4 | 645 | 25.1 | — | — | — | — | 0.5 hour | F |
| A2-2 | 0.45 | 10.19 | 25.4 | 346 | 25.4 | — | — | — | — | 1 hour | F |
| A2-3 | 1.00 | 8.12 | 25.8 | 9.58 | 25.9 | — | — | — | — | 1 week | B |
| A2-4 | 1.50 | 7.76 | 26.1 | 6.66 | 26.4 | — | — | — | — | 1 week | B |
| A2-5 | 2.00 | 6.89 | 27.4 | 5.38 | 26.9 | — | — | — | — | 1 week | A |
| A2-6 | 3.00 | 5.98 | 28.1 | 2.69 | 28.2 | — | — | — | — | 1 hour | F |
| A2-7 | Adjusting pH of dispersion solution of Experimental Example A2-6 by using pH adjusting agent | | | | | 6.74 | 25.1 | 4.26 | 25.3 | 1 week | A |
| A2-8 | Adjusting pH of dispersion solution of Experimental Example A2-6 by using pH adjusting agent | | | | | 7.68 | 25.6 | 6.12 | 25.6 | 1 week | B |

TABLE A4-3

| Experimental Example | Processing duration [h] | pH | pH [°C.] | Conductivity [μS/cm] | Conductivity [°C.] | pH after preparation pH | pH after preparation [°C.] | Conductivity after preparation [μS·cm] | Conductivity after preparation [°C.] | Dispersion Stability initial precipitation confirmation time | Precipitation degree |
|---|---|---|---|---|---|---|---|---|---|---|---|
| A3-1 | 0.00 | 11.39 | 25.4 | 645 | 25.1 | — | — | — | — | 0.5 hour | F |
| A3-2 | 0.50 | 10.22 | 25.4 | 355 | 25.4 | — | — | — | — | 1 hour | F |
| A3-3 | 1.25 | 8.26 | 25.8 | 10.14 | 25.9 | — | — | — | — | 8 hours | E |
| A3-4 | 1.80 | 7.65 | 26.1 | 6.89 | 26.4 | — | — | — | — | 18 hours | D |
| A3-5 | 2.35 | 6.99 | 27.4 | 5.99 | 26.9 | — | — | — | — | 2 days later | D |
| A3-6 | 4.00 | 6.34 | 28.1 | 3.16 | 28.2 | — | — | — | — | 0.5 hour | F |
| A3-7 | Adjusting pH of dispersion solution of Experimental Example A3-6 by using pH adjusting agent | | | | | 6.73 | 25.1 | 4.16 | 25.3 | 18 hours | D |
| A3-8 | Adjusting pH of dispersion solution of Experimental Example A3-6 by using pH adjusting agent | | | | | 7.74 | 25.6 | 5.94 | 25.6 | 2 days later | D |

TABLE A4-4

| Experimental Example | Processing duration [h] | pH | pH [°C.] | Conductivity [μS/cm] | Conductivity [°C.] | Dispersion Stability initial precipitation confirmation time | Precipitation degree | PVP residual rate [%] |
|---|---|---|---|---|---|---|---|---|
| A4-1 | 0.00 | 11.39 | 25.4 | 645 | 25.1 | 0.1 hour | F | 100 |
| A4-2 | 1.00 | 10.25 | 25.4 | 412 | 25.4 | 0.5 hour | F | 100 |
| A4-3 | 1.75 | 8.31 | 25.8 | 54.2 | 25.9 | 1 hour | F | 100 |
| A4-4 | 2.65 | 7.69 | 26.1 | 13.4 | 26.4 | 7 hours | E | 100 |
| A4-5 | 3.35 | 7.14 | 27.4 | 8.46 | 26.9 | 1 day later | D | 100 |
| A4-6 | 4.56 | 6.82 | 28.1 | 6.69 | 28.2 | 0.5 hour | F | 100 |

As can be seen in the results of Experimental Examples A2 of Table A4-2, when the rotation number of the disperser was decreased as compared with Experimental Examples A1, the time necessary for pH and conductivity of the metal fine particle dispersion solution to reach those of Experimental Examples A1 became longer; however, by adjusting pH and conductivity of the metal fine particle dispersion solution thereof to those of Experimental Examples A1, the dispersion solution showing similar dispersion stability to that of the metal fine particle dispersion solution obtained in Experimental Examples A1 could be prepared. Experimental Example A2-7, in which pH was adjusted by adding a 0.05% by weight of aqueous ammonia solution as the pH adjusting agent into the metal fine particle dispersion solution of Experimental Example A2-6 in the same way as Experimental Examples A1, showed similar dispersion stability and self-dispersion property to those of the metal fine particle dispersion solution of Experimental Example A2-5; and Experimental Example A2-8 showed similar dispersion stability to that of the metal fine particle dispersion solutions of Experimental Examples A2-3 and A2-4. Namely, it was found that by controlling pH or conductivity after carrying out the removal process in the reformation method of the dispersion solution of the present invention in the same way as Experimental Examples A1, the dispersion property of the metal fine particles in the metal fine particle dispersion solution can also be controlled.

As can be seen in the results of Experimental Examples A3 in Table A4-3, under the condition that the rotation number of the disperser is 10 m/sec or lower as the circumferential velocity, even when pH of the metal fine particle dispersion solution was adjusted in the range of 6.5 to 8.5 in which the dispersion stability of the metal fine particle dispersion solution was enhanced, for example, in Experimental Examples A1, the dispersion stability of the metal fine particle dispersion solution was poorer than that of the metal fine particles obtained in Experimental Examples A1, whereby it was confirmed that the metal fine particles precipitated within 3 days in all the conditions. This is caused presumably because the physical energy E from the disperser 102 to the aggregate b was insufficient; and thus, dispersion of the aggregate b became insufficient somewhere in the processing, or the particles which were partially dispersed during being transported from the disperser 102 to the removing unit 120 returned to the aggregate b entirely, thereby resulting in the state as shown in FIG. 2(C).

As can be seen in the results of Experimental Examples A4 in Table A4-4, when the reformation process of the metal fine particle dispersion solution was carried out with the membrane filtration equipment not equipped with the disperser, it was difficult to carry out the process so as to bring pH to a value lower than 6.82, even with repeating the process. In addition, even when the process was carried out until pH reached that of Experimental Examples A1, similar dispersion property and dispersion stability to those of Experimental Examples A1 could not be confirmed, whereby deposition of the metal fine particles was confirmed within 3 days under all the conditions. On top of it, the residual rate of PVP was 100% until termination of the process, so that PVP used for preparation of the silver-copper metal alloy particles could not be reduced under the membrane filtration conditions used in Experimental Examples A4.

Experimental Examples A5

In Experimental Examples A5, the metal fine particle dispersion solution that was ejected from the separation processing equipment and recovered in the beaker in Experimental Examples A was subjected to the dispersion process with a batch system and then to the reformation process by the membrane filtration, wherein the both processes were carried out separately. Meanwhile, Experimental Examples A5 correspond Comparative Examples of the present invention. Specifically, 5 kg (about 5 L) of the metal fine particle dispersion solution that was ejected from the separation processing equipment and recovered in the beaker was charged into the storing vessel 130, and then it was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 20 minutes. The temperature of the metal fine particle dispersion solution during the dispersion process was in the range of 24 to 29° C. After completion of the dispersion process, in the same way as Experimental Examples A4, by using the equipment not having the disperser 102 and the dispersing vessel 101 in the equipment described in FIG. 1(A), namely not having the dispersion processing equipment 110, the filtration was carried out by directly sending the metal fine particle dispersion solution filled in the storing vessel 130 to the removing unit 120 by using the pump 104. The filtration membrane, washing solution, pump, and so forth that were used in this process were the same as those used in Experimental Examples A1 to A4. Meanwhile, the time from completion of the dispersion process to start of the filtration took 20 minutes; and at the time when the filtration was started, the aggregate of the metal fine particles and the precipitation thereof had already been clearly seen. In the membrane filtration process, the metal fine particle dispersion solution was withdrawn from the process equipment at the time when the metal fine particle dispersion solution in the storing vessel became 2 L (about 2.0 kg); and then, pH, conductivity, dispersion property, and dispersion stability of the metal fine particle dispersion solution were confirmed. By adding 3.0 L of pure water into the storing vessel 130, this procedure was repeated to carry out the reformation process of the metal fine particle dispersion solution. The results thereof are summarized in Table A4-5.

TABLE A4-5

| Experimental Example | Processing times [times] | pH | pH [° C.] | Conductivity [µS/cm] | Conductivity [° C.] | Dispersion Stability initial precipitation confirmation time | Precipitation degree |
|---|---|---|---|---|---|---|---|
| A5-1 | 0 | 11.39 | 26.4 | 645 | 25.1 | 0.1 hour | F |
| A5-2 | 1 | 10.21 | 26.9 | 409 | 25.4 | 0.5 hour | F |
| A5-3 | 3 | 8.16 | 28.2 | 53.2 | 25.9 | 1 hour | F |
| A5-4 | 5 | 7.54 | 26.1 | 13.1 | 26.4 | 7 hours | E |

TABLE A4-5-continued

| Experimental Example | Processing times [times] | pH pH | pH [° C.] | Conductivity [μS/cm] | Conductivity [° C.] | Dispersion Stability initial precipitation confirmation time | Precipitation degree |
|---|---|---|---|---|---|---|---|
| A5-5 | 10 | 7.09 | 27.4 | 8.36 | 26.9 | 1 day later | D |
| A5-6 | 15 | 6.79 | 28.1 | 6.59 | 28.2 | 0.5 hour | F |

As can be seen in Table A4-5, the reformation process was carried out until pH of the metal fine particle dispersion solution reached 6.79. However, even if this process was repeated, it was difficult to lower the pH to the value less than 6.79. In addition, even when this process was carried out to bring its pH to that of Experimental Examples A1, similar dispersion property and dispersion stability to those of Experimental Examples A1 could not be confirmed, whereby precipitation of the metal fine particles was confirmed within 3 days under all the conditions. This is because in Experimental Examples A5, the dispersion process with the batch system and the removal process with the membrane filtration were separately carried out, the removal process to remove the impurities from the dispersion solution with the removing unit could not be carried out before the fine particles were re-aggregated entirely by the impurities.

Experimental Examples A6 to A9

Experimental Examples A6 to A9 were carried out by changing the condition of the reformation process of Experimental Examples A1. Meanwhile, the experiments of Experimental Examples A6 to A9 correspond to Examples of the present invention. The changed conditions are summarized in Table A4-6. Meanwhile, both the pressures Pa of the pressure gauges described in Table A4-6 are obtained from the two pressure gauges Pa shown in FIG. 1(A).

TABLE A4-6

| | | Experimental Example A1 | Experimental Example A6 | Experimental Example A7 | Experimental Example A8 | Experimental Example A9 |
|---|---|---|---|---|---|---|
| (10) | Flow amount of the pump 104 | 6.4 L/min | 8.8 L/min | 6.4 L/min | 5.4 L/min | 6.4 L/min |
| (11) | Flow amount of the metal fine dispersion solution returned to the storing vessel 130 | 5.4 L/min | 7.2 L/min | 5.0 L/min | 4.8 L/min | 4.8 L/min |
| (12) | Amount of the filtrate L3 discharged by the removing unit 120 (Calculated value) | 1.0 L/min | 1.6 L/min | 1.4 L/min | 0.6 L/min | 1.6 L/min |
| (16) | Pressure meters | Pa: Both two 0.10 MPaG | Same as on the left | Same as on the left | Same as on the left | Pa: Both two 0.04 MPaG |
| (19) | Path length (Lea) | 0.3 m | Same as on the left | Same as on the left | 0.5 m | 1.5 m |
| (20) | Pipe's inner diameter (Leb) | 0.0105 m | Same as on the left | Same as on the left | Same as on the left | 0.0230 m |
| (21) | Flow rate of the fine particle dispersion solution in the just-before transporting path | 1.2 m/sec | 1.7 m/sec | 1.2 m/sec | 1.0 m/sec | 0.3 m/sec |
| (22) | Time T1 from the dispersing vessel 101 to start of removal of the impurity by the removing unit 120 | 0.24 sec | 0.18 sec | 0.24 sec | 0.48 sec | 5.84 sec |
| (23) | Thermometer installed in the dispersing vessel 101 | From 25° C. to 29° C. | From 25° C. to 29° C. | From 35° C. to 40° C. | From 25° C. to 29° C. | From 25 to 29° C. |

In Experimental Examples A6, the experimental condition was changed such that the flow rate of the pump 104 was increased from Experimental Examples A1, namely the flow rate of the metal fine particle dispersion solution from the storing vessel 130 to the dispersion processing equipment 110 and the removing unit 120 was increased, while both Lea and Leb were set to the same as those of Experimental Examples A1. Therefore, the flow rate (FL) of the dispersion solution in the just-before transporting path becomes faster, so that T1 becomes shorter. Under the conditions of Experimental Examples A6, by carrying out the reformation process so as to reach pH or conductivity of Experimental Examples A1, the metal fine particle dispersion solution having the dispersion property or the dispersion stability which are better than those of Experimental Examples A1 could be obtained. As can be seen in Table A4-6, in Experimental Examples A6, the experimental condition was changed such that the flow rate of the pump 104 was made faster than that of A1, thereby enabling to increase the discharge amount of the filtrate L3; and thus, the processing time could be shortened. In Experimental Examples A7, the experimental condition was changed such that the temperature of the metal fine particle dispersion solution was made higher than that of Experimental Examples A1. By raising the temperature of the metal fine particle dispersion solution, the discharge amount of the filtrate L3 could be increased, so that the processing time could be shortened; and by carrying out the reformation process so as to reach pH or conductivity of Experimental Examples A1, the metal fine particle dispersion solution having similar dispersion property or dispersion stability to those of Experimental Examples A1 could be obtained.

In the metal fine particles obtained in Experimental Examples A6, the metal fine particle dispersion solution having the dispersion property or the dispersion stability which are better than those of Experimental Examples A1 means, as compared with the metal fine particle dispersion solution of, for example, Experimental Example A1-4 whose pH is adjusted to 7.77, the metal fine particle dispersion solution in which by adjusting the pH thereof to that of Experimental Example A1-4 the initial precipitation confirmation time becomes longer and also the metal fine particles are confirmed to be in the state of more dispersed than Experimental Example A1-4 in the TEM observation.

In Experimental Examples A8, the experimental condition was changed such that the flow rate of the pump 104 was decreased and Lea was increased as compared with those of Experimental Examples A1. Under these conditions, the discharge amount of the filtrate L3 was decreased and T1 became longer; but the metal fine particle dispersion solution having similar dispersion property or dispersion stability to those of Experimental Examples A1 could be obtained by carrying out the reformation process until pH or conductivity thereof reached those of Experimental Examples A1.

In Experimental Examples A9, the experimental conditions of Lea and Leb were changed from those of Experimental Examples A1 so that T1 became 3 seconds or more. Although the reformation process could be carried out until pH or conductivity thereof reached those of Experimental Examples A1, the fine particle dispersion solution having the dispersion property and dispersion stability similar to those obtained in Experimental Example A1-5 could not be obtained even when the reformation process was carried out until the pH thereof reached pH of Experimental Examples A1-5.

Consequently, the dispersion property of the metal fine particles included in the metal fine particle dispersion solution could be controlled by changing the flow rate, the flow amount, the fluidity pressure, or the temperature in the just-before transporting path; and also, by changing these conditions, the dispersion property of the metal fine particles could be enhanced.

Experimental Examples B: Experiments on the Dispersion Solution of Organic Substance Fine Particles (Curcumin Fine Particles)

In Experimental Examples B, experiments were carried out with regard to curcumin as the organic substance. As the previous processes before obtaining the dispersion solution, the organic substance raw material solution and the organic substance separating solvent each were prepared by using Clearmix (product name: CLM-2.2S, manufactured by M. Technique Co., Ltd.), which is the high speed rotational dispersion emulsifier. Specifically, according to the prescription of the second fluid (B-solution) described in Table B1, each component of the organic substance raw material solution were uniformly mixed by stirring for 30 minutes by using Clearmix with the rotation number of the rotor thereof being 20000 rpm at the preparation temperature of 25° C. to obtain the organic substance raw material solution. Also, according to the prescription of the first fluid (A-solution) described in Table B1, each component of the organic substance separating solvent were uniformly mixed by stirring for 30 minutes by using Clearmix with the rotation number of the rotor thereof being 15000 rpm at the preparation temperature of 35° C. to obtain the organic substance separating solvent.

Meanwhile, the substances represented by chemical formula or abbreviation described in Table B1are HPMC for hydroxymethyl cellulose (Metolose SE-03, manufactured by Shin-Etsu Chemical Co., Ltd.), citric acid (manufactured by Kanto Chemical Co., Ltd.), and EtOH for ethanol (purity of 99.5%, manufactured by Kanto Chemical Co., Ltd.). Pure water with pH of 5.86 (measurement temperature of 18.4° C.) and conductivity of 0.83 μS/cm (measurement temperature of 18.3° C.) was used.

Next, as the process to obtain the dispersion solution, the organic substance raw material solution and the organic substance separating solvent, both having been prepared as described above, were mixed by using the separation processing equipment illustrated in FIG. 3(A). In these Experimental Examples, the third introduction part d30 was not arranged, so that the third fluid to be processed was not used (not illustrated in the drawing). Specifically, the organic substance separating solvent was introduced as the A-solution into between the processing surfaces 1 and 2; and with operating the processing member 10 with the rotation number of 500 rpm, the organic substance raw material solution was introduced as the B-solution into the processing surfaces 1 and 2 so as to mix the organic substance separating solvent and the organic substance raw material solution in a thin film fluid, whereby the organic substance fine particles were separated in between the processing surfaces 1 and 2. As a result, the fluid including the organic substance fine particles (organic substance fine particle dispersion solution) was ejected from between the processing surfaces 1 and 2 of the separation processing equipment. The ejected organic substance fine particle dispersion solution was recovered in a beaker via the vessel v.

In Table B2, operation conditions of the separation processing equipment are summarized. The introduction temperatures (supply temperatures) and introduction pressures (supply pressures) of the A-solution and B-solution described in Table B2 were measured by using the thermometers and pressure meters installed in the sealed introduction paths to between the processing surfaces 1 and 2 (first introduction part d1 and second introduction part d2), wherein the introduction temperature of the A-solution in Table B2 is the temperature of the actual A-solution under the introduction pressure in the first introduction part d1, and the introduction temperature of the B-solution in the same table is the temperature of the actual B-solution under the introduction pressure in the second introduction part d2.

Measurement of pH was made by using a pH meter (catalogue No. D-71; manufactured by HORIBA, Ltd.). Before the A-solution was introduced into the separation processing equipment, pH of this solution was measured at the temperatures described in Table B1. Because pH measurement of the mixed fluid immediately after the organic substance raw material solution was mixed with the organic substance separating solvent was difficult, pH of the organic substance fine particle dispersion solution that was ejected from the equipment and recovered in the beaker was measured at room temperature.

TABLE B1

The prescription of the first fluid (A-solution)

| Prescription | | | | | | pH | |
|---|---|---|---|---|---|---|---|
| Material | [wt %] | Material | [wt %] | Material | [wt %] | pH | °C. |
| HPMC | 0.80 | citric acid | 0.005 | Pure water | 99.195 | 3.81 | 26.7 |

The prescription of the second fluid (B-solution)

| Prescription | | | | pH | |
|---|---|---|---|---|---|
| Material | [wt %] | Material | [wt %] | pH | °C. |
| Curcumin | 0.50 | EtOH | 99.50 | — | — |

TABLE B2

| | Introduction flow Amount ml/min | | Introduction temperatures (supply temperatures) [°C.] | | Introduction pressures (supply pressures) [MPaG] | | Discharged solution | |
|---|---|---|---|---|---|---|---|---|
| Experimental Examples | A solution | B solution | A solution | B solution | A solution | B solution | pH | Temperature |
| B | 450 | 150 | 29 | 30 | 0.07 | 0.10 | 4.14 | 24.1 |

Experimental Examples B1

The reformation experiments of the dispersion solution relating to Experimental Examples B1 correspond to Example of the present invention.

In the process of reforming the dispersion solution, from the organic substance fine particle dispersion solution which was ejected from the separation processing equipment and then recovered in the beaker, impurities were removed and pH thereof was controlled by using the dispersion solution reformation equipment 100 illustrated in FIG. 1(A). In Table B3 to be described later, the methods and conditions of the reformation process of each Experimental Examples B1 to B4 of the present invention are summarized. The process was carried out with the same procedure as that of Experimental Examples A except for the conditions described in Table B3.

TABLE B3

| | | Experimental Example B1 | Experimental Example B2 | Experimental Example B3 | Experimental Example B4 |
|---|---|---|---|---|---|
| | Processed liquid | Organic fine particle dispersion solution: Curcumin fine particle dispersion solution | Same as on the left | Same as on the left | Same as on the left |
| (1) | Amount of the first solution charged into the storing vessel 130 | Type: Pure Water, pH 5.91 (measurement temperature of 21.2° C.), Conductivity 0.89 μS/cm (measurement temperature of 22.0° C.), Charged amount 5 kg | Same as on the left | Same as on the left | Same as on the left |
| (2) | Type, flow amount, and temperature of the cross-flow washing solution | Type: Pure Water, pH 5.91 (measurement temperature of 21.2° C.), Conductivity 0.89 μS/cm (measurement temperature of 22.0° C.), Flow amount 1.5 L/min, 21° C. | Same as on the left | Same as on the left | Same as on the left |
| (3) | Disperser 102 | Clearmix (product name: CLM-2.2S, rotor: R1, screen: S0.8-48, manufactured by M. Technique Co., Ltd.) | Same as on the left | Same as on the left | Not installed |

TABLE B3-continued

|  |  | Experimental Example B1 | Experimental Example B2 | Experimental Example B3 | Experimental Example B4 |
|---|---|---|---|---|---|
| (4) | Removing unit 120 | hollow fiber type dialyzer (product name; APS-21MD New, membrane area; 2.1 m², material; polysulfone, manufactured by Asahi Kasei Medical Co., Ltd.) | Same as on the left | Same as on the left | Same as on the left |
| (5) | Rotation number of the rotor | 20000 rpm (circumferential velocity of 31.4 m/sec) | 15000 rpm (circumferential velocity of 23.6 m/sec) | 6000 rpm (circumferential velocity of 7.9 m/sec) | — |
| (6) | Starting to charge the organic fine particle dispersion solution | When the pure water in the storing vessel 130 was discharged until 1 L. | Same as on the left | Same as on the left | Same as on the left |
| (7) | Amount of the organic fine particle dispersion solution charged into the storing vessel 130 | 4 L (≈4 kg) | Same as on the left | Same as on the left | Same as on the left |
| (8) | pH of the metal fine dispersion solution in the storing vessel 130 | 4.23 (measurement temperature of 23.2° C.) | Same as on the left | Same as on the left | Same as on the left |
| (9) | Conductivity of the metal fine dispersion solution in the storing vessel 130 | 339 μS/cm (measurement temperature of 23.4° C.) | Same as on the left | Same as on the left | Same as on the left |
| (10) | Flow amount of the pump 104 | 6.4 L/min | Same as on the left | Same as on the left | Same as on the left |
| (11) | Flow amount of the metal fine dispersion solution returned to the storing vessel 130 | 5.4 L/min | Same as on the left | Same as on the left | Same as on the left |
| (12) | Amount of the filtrate L3 discharged by the removing unit 120 (Calculated value) | 1.0 L/min | Same as on the left | Same as on the left | Same as on the left |
| (13) | Timing of charging the dilution into the storing vessel 130 | When the dispersion solution in the storing vessel 130 was concentrated to 2.0 L. | Same as on the left | Same as on the left | Same as on the left |
| (14) | Type and amount of the second dilution charged into the storing vessel 130 | Type: pure water, (pH: 5.86 (measurement temperature of 23.2° C.), conductivity: 0.83 μS/cm (measurement temperature of 23.1° C.)), 3 L (≈3.0 kg) | Same as on the left | Same as on the left | Same as on the left |
| (15) | Concentration of the metal fine particles in the metal fine particle dissolution solution | Between 0.1 wt % to 0.2 wt % | Same as on the left | Same as on the left | Same as on the left |
| (16) | Pressure meters | Pa: Both two 0.10 MPaG | Same as on the left | Same as on the left | Same as on the left |
| (17) | Pressure meters | Pb: 0.15 MPaG | Same as on the left | Same as on the left | Same as on the left |
| (18) | Pressure meters | Pc: 0.02 MPaG | Same as on the left | Same as on the left | Same as on the left |
| (19) | Path length (Lea) | 0.3 m | Same as on the left | Same as on the left | — |
| (20) | Pipe's inner diameter (Leb) | 0.0105 m | Same as on the left | Same as on the left | — |
| (21) | Flow rate of the fine particle dispersion solution in the just-before transporting path | 1.2 m/sec | Same as on the left | Same as on the left | — |
| (22) | Time T1 from the dispersing vessel 101 to start of removal of the impurity by the removing unit 120 | 0.24 sec | Same as on the left | Same as on the left | — |
| (23) | thermometer installed in the dispersing vessel 101 | From 24° C. to 28° C. | Same as on the left | Same as on the left | Same as on the left |
| (24) | temperature of the metal fine particle dispersion solution | From 23° C. to 25° C. | Same as on the left | Same as on the left | Same as on the left |
| (25) | Conductivity meter | Conductivity meter (catalogue number; ES-51, manufactured by HORIBA, Ltd.) | Same as on the left | Same as on the left | Same as on the left |

During the time of continuing the reformation process under the conditions of Experimental Examples B1 as described in Table B3, part of the organic substance fine particle dispersion solution was withdrawn from the storing vessel 130 at an interval; and these were designated as Experimental Examples B1-1 to B1-5, and the dispersion solutions obtained by adding a pH adjusting agent to the organic substance fine particle dispersion solution of Experimental Example B1-5 were designated as Experimental Examples B1-6 and B1-7, and the dispersion solution obtained by adding a pH adjusting agent to Experimental Example B1-6 was designated as Experimental Example B1-8. Concentration of the organic substance fine particles in all the organic substance fine particle dispersion solutions obtained under the conditions of Experimental Examples B1-1 to B1-8 was 0.2% by weight as curcumin. In Table B4-1, pH, conductivity, and residual rate of ethanol (EtOH residual rate) in the organic substance fine particle dispersion solution during the reformation process of the organic substance fine particle dispersion solution are summarized.

As can be seen in Table B4-1, by carrying out the reformation process, pH and conductivity of the organic substance fine particle dispersion solution approached almost the same as those of the cross-flow washing solution and the pure water charged into the storing vessel 130. In each of Experimental Examples B1-1 to B1-8, part of the withdrawn organic substance fine particle dispersion solution was diluted, and this diluted solution was dropped onto a collodion film and dried in an atmosphere for 4 hours to obtain the sample for TEM observation. Meanwhile, the EtOH residual rate described above is the ethanol concentration included in the curcumin powder which was obtained by freeze drying of the partly withdrawn organic substance fine particle dispersion solution in each condition of Experimental Examples B1-1 to B1-8; and this was obtained by the gas chromatography measurement of the thus obtained curcumin powder dissolved in dimethyl sulfoxide (DMSO). In the Table, the description that the EtOH residual rate is zero means the result that the content of EtOH therein was below the detection limit (EtOH residual rate in the curcumin powder: 0.01%) in the gas chromatography measurement.

(Dispersion Stability and Self-Dispersion Property)

In the organic substance fine particle dispersion solutions of Experimental Examples B1-1 and B1-2, precipitation was found at the time described in the initial precipitation confirmation time in Table B4-1, wherein it was confirmed that the phase including the organic substance fine particles and the phase not substantially including the organic substance fine particles were separated. In Experimental Examples B1-3 and B1-4, precipitation of the organic substance fine particles was faintly observed at 1 week of the static state after the withdrawal. In the organic substance fine particle dispersion solution of Experimental Example B1-5, precipitation of an extremely minute amount of the organic substance fine particles was observed at 1 week of the static state after the withdrawal, but the precipitation amount thereof was about 0.1% by weight relative to the organic substance fine particles included in the dispersion solution. It became clear that the dispersion property of the organic substance fine particles in the organic substance fine particle dispersion solution could be enhanced by controlling pH or conductivity thereof on the basis of the processing time of the organic substance fine particle dispersion solution using the dispersion solution reformation equipment of the present invention. Furthermore, with regard to Experimental Example B1-5, it was confirmed that the precipitation amount of the organic substance fine particles at 2 weeks of the static state after the withdrawal decreased, whereby the precipitation could not substantially be confirmed, from the precipitation amount thereof at 1 week of the static state after the withdrawal, and this solution was re-dispersed without carrying out any dispersion process, so that it was presumed that the dispersion solution included the organic substance fine particles having self-dispersion property.

(Adjustment of pH after Completion of Removal Process)

An aqueous 0.05% by weight of sodium bicarbonate solution was added as the pH adjusting agent into the organic substance fine particle dispersion solution of Experimental Example B1-5, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples B1-6 and B1-7. Also, an aqueous 0.02% by weight of an aqueous citric acid solution was added as the pH adjusting agent into Experimental Example B1-6, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain the organic substance fine particle dispersion solution of Experimental Example B1-8. The results of Experimental Examples B1-6 to B1-8 are summarized in Table B4-1. Experimental Example B1-6 in which pH was adjusted at 6.51 (measurement temperature of 25.1° C.) and conductivity at 6.29 µS/cm (measurement

TABLE B4-1

| Experimental Example | Processing duration [h] | pH | pH [° C.] | Conductivity [µS/cm] | Conductivity [° C.] | pH after preparation pH | pH after preparation [° C.] | Conductivity after preparation [µS·cm] | Conductivity after preparation [° C.] | Dispersion Stability initial precipitation confirmation time | Dispersion Stability Precipitation degree | EtOH residual rate [%] |
|---|---|---|---|---|---|---|---|---|---|---|---|---|
| B1-1 | 0.00 | 4.23 | 25.4 | 339 | 25.1 | — | — | — | — | 0.5 hour | F | 3.52 |
| B1-2 | 0.10 | 4.95 | 25.4 | 115.2 | 25.4 | — | — | — | — | 1 hour | F | 0.22 |
| B1-3 | 0.23 | 5.46 | 25.8 | 36.5 | 25.9 | — | — | — | — | 1 week | B | 0.05 |
| B1-4 | 0.35 | 5.52 | 26.1 | 11.2 | 26.4 | — | — | — | — | 1 week | B | 0 |
| B1-5 | 0.50 | 5.82 | 27.4 | 5.15 | 26.9 | — | — | — | — | 1 week | A | 0 |
| B1-6 | Adjusting pH of dispersion solution of Experimental Example C1-5 by using pH adjusting agent | | | | | 6.51 | 25.1 | 6.29 | 25.3 | 1 week | B | 0 |
| B1-7 | Adjusting pH of dispersion solution of Experimental Example C1-5 by using pH adjusting agent | | | | | 7.68 | 25.1 | 20.1 | 25.1 | 4 days later | C | 0 |
| B1-8 | Adjusting pH of dispersion solution of Experimental Example C1-6 by using pH adjusting agent | | | | | 5.81 | 25.4 | 5.94 | 25.1 | 1 week | A | 0 | temperature of 25.3° C.) exhibited similar dispersion stability to that of the organic substance fine particle dispersion solution of Experimental Example B1-3 or B1-4. In Experimental Example B1-7 in which pH was adjusted at 7.68 (measurement temperature of 25.1° C.) and conductivity at 20.1 µS/cm (measurement temperature of 25.1° C.), the dispersion stability thereof was decreased as compared with Experimental Example B1-5. Experimental Example B1-8 in which pH was adjusted at 5.81 (measurement temperature of 25.4° C.) and conductivity at 18.6 µS/cm (measurement temperature of 25.1° C.) exhibited similar dispersion stability and self-dispersion property to those of the organic substance fine particle dispersion solutions obtained under the condition of Experimental Example B1-5.

(Assessment of Dispersion Property: TEM Observation)

Figure 7:
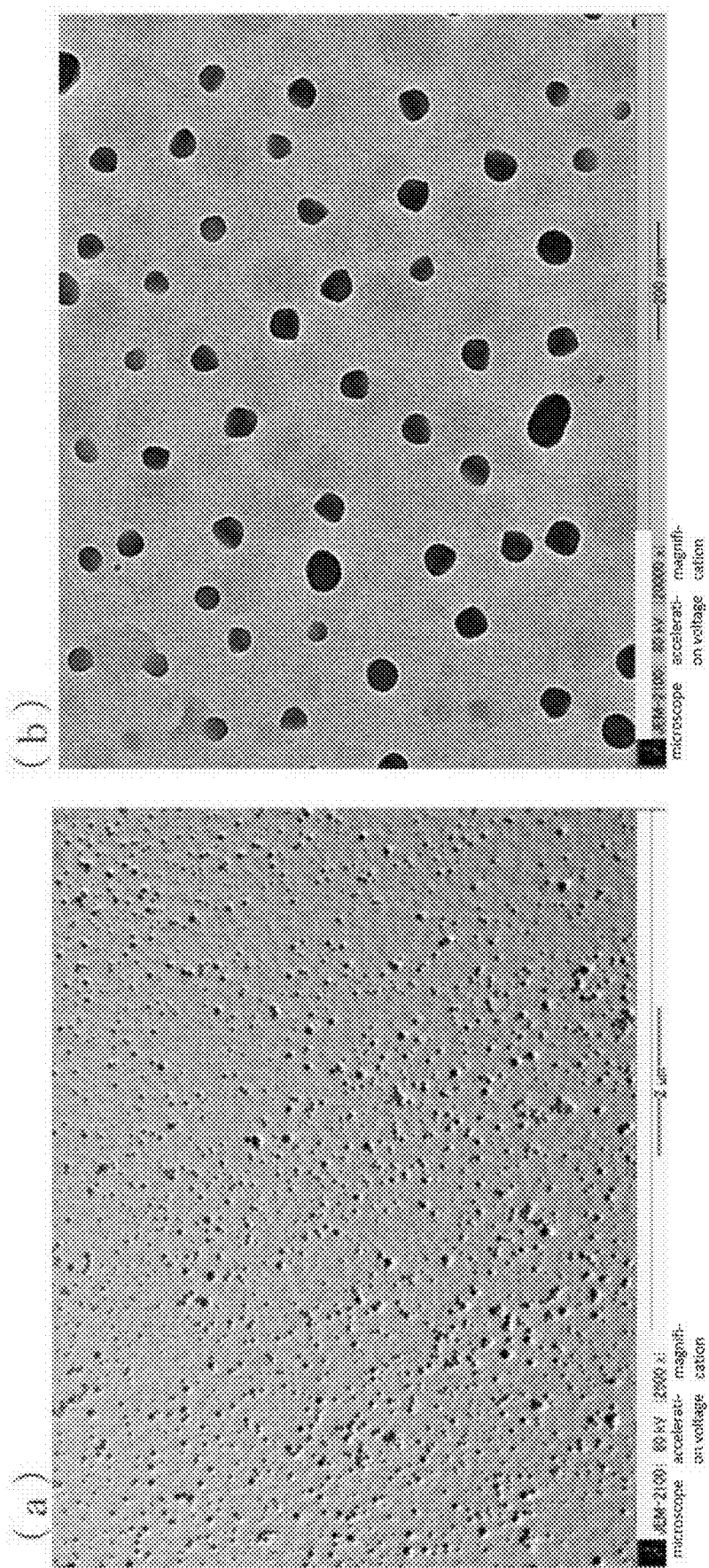
FIG. 7
These are the TEM pictures of the fine particles in the fine particle dispersion solution obtained in Experimental Example B1-5 of the present invention. Meanwhile, (a) and (b) are the observation results with the magnification of 2500 and 20000, respectively.

The TEM pictures of the organic substance fine particles obtained under the condition of Experimental Example B1-5 are shown in FIG. 7. From the TEM picture with the magnification of 2500 in FIG. 7(a), it was confirmed that the organic substance fine particles were uniformly dispersed. From the TEM picture with the magnification of 20000 in FIG. 7(b), it was confirmed that the primary particle's diameter thereof was in the range of about 50 nm to 100 nm. Similar results were obtained in the organic substance fine particles obtained under the condition of Experimental Example B1-8 (not shown by the drawing). Meanwhile, the TEM observation in Experimental Examples B was made by using the transmission electron microscope (JEM-2100, manufactured by JEOL Ltd.), wherein the dispersion property of the organic substance fine particle dispersion solution was assessed under the observation condition with the acceleration voltage of 80 kV and the observation magnification of 2500 or more.

Figure 8:
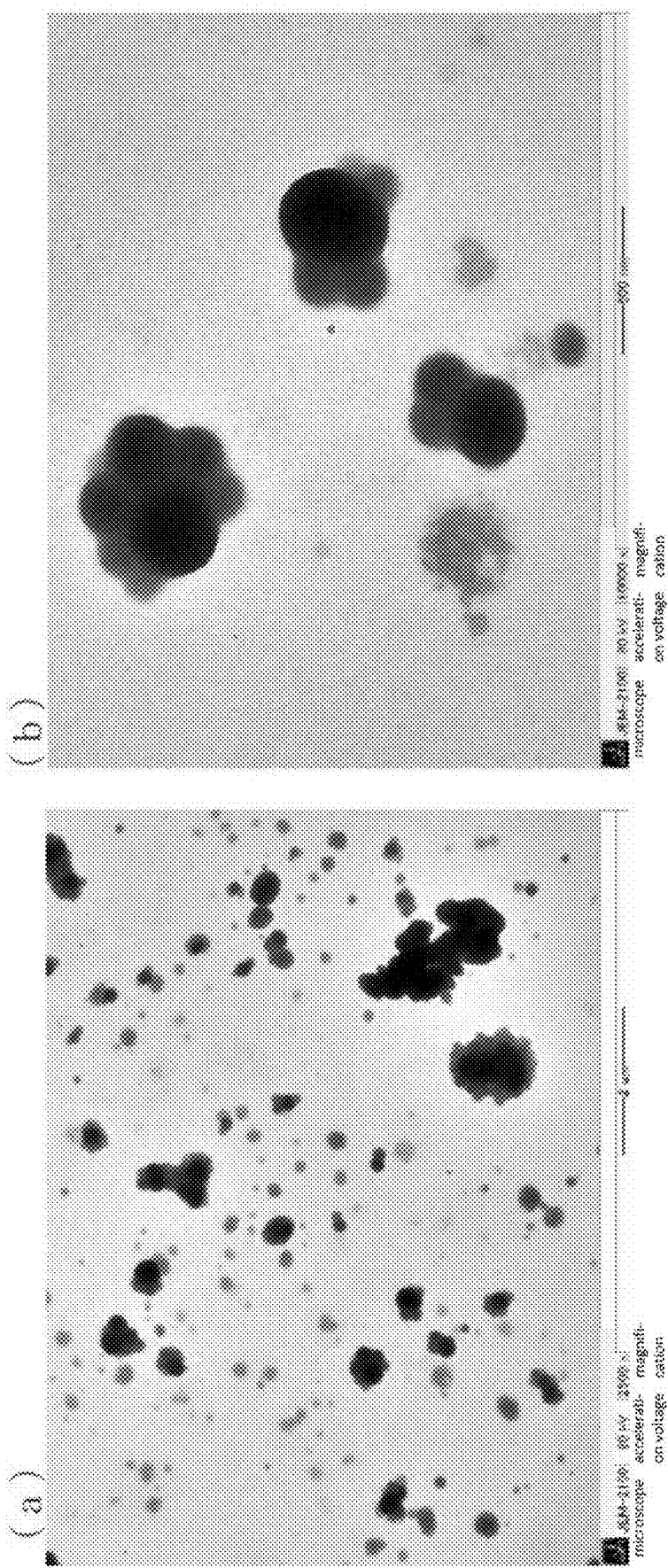
FIG. 8
These are the TEM pictures of the fine particles in the fine particle dispersion solution obtained in Experimental Example B1-7 of the present invention. Meanwhile, (a) and (b) are the observation results with the magnification of 2500 and 10000, respectively.

The TEM pictures of the organic substance fine particles obtained under the condition of Experimental Example B1-7 are shown in FIG. 8. From the TEM pictures with the magnification of 2500 shown in FIG. 8(a) and with the magnification of 10000 shown in FIG. 8(b), it was observed that as compared with Experimental Example B1-5, the organic substance fine particles aggregated more; and in addition, the particles seemingly dissolved were observed.

Figure 9:
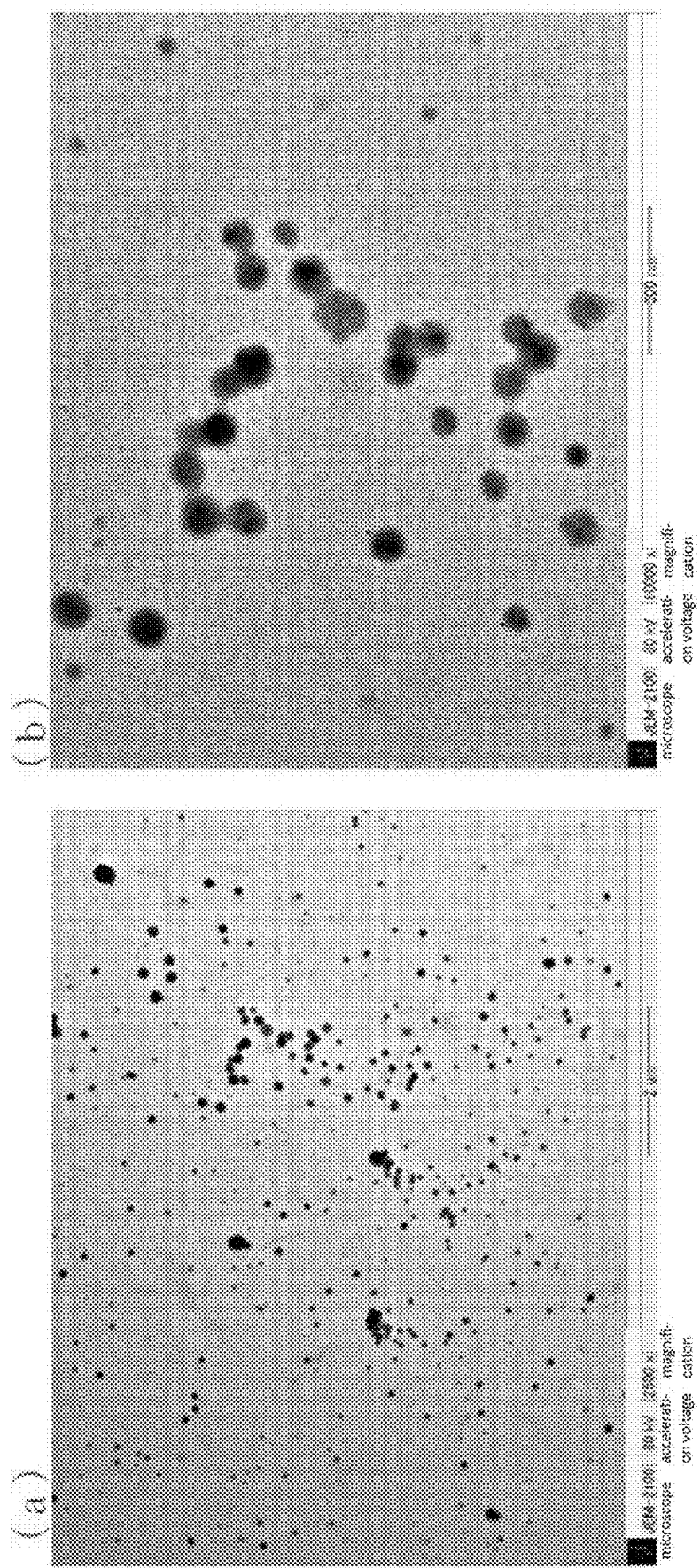
FIG. 9
These are the TEM pictures of the fine particles in the fine particle dispersion solution obtained in Experimental Example B1-4 of the present invention. Meanwhile, (a) and (b) are the observation results with the magnification of 2500 and 10000, respectively.

The TEM pictures of the organic substance fine particles obtained under the conditions of Experimental Example B1-4 are shown in FIG. 9. From the TEM pictures with the magnification of 2500 shown in FIG. 9(a) and with the magnification of 10000 shown in FIG. B3(b), it was observed that the organic substance fine particles aggregated more as compared with Experimental Example B1-5; however, as compared with the organic substance fine particles obtained under the condition of Experimental Example B1-7, number of the aggregates thereof was less, and the organic substance fine particles were dispersed uniformly. Similar results were obtained in the organic substance fine particles obtained under the condition of Experimental Examples B1-3 and B1-6 (not shown by the drawing).

The TEM pictures of Experimental Examples B1-1 and B1-2 were taken immediately after start of the washing process of the organic substance fine particle dispersion solution; therefore, not only aggregates of the organic substance fine particles but also impurities (citric acid, etc.) were observed (not shown by the drawing).

As can be seen in the foregoing results, it was found that the dispersion property of the organic substance fine particles included in the organic substance fine particle dispersion solution could be controlled by preparing the organic substance fine particle dispersion solution by using the equipment comprising the disperser and the equipment with which impurities were removed from the organic substance fine particle dispersion solution by the cross-flow method using the filtration membrane; and it was also found that the dispersion stability could be enhanced by controlling pH or conductivity on the basis of the processing time of the organic substance fine particle dispersion solution. In addition, it was found that the dispersion property of the organic substance fine particles in the organic substance fine particle dispersion solution could be controlled also by controlling pH or conductivity after the removal process of the impurities in the reformation method of the dispersion solution of the present invention.

Experimental Examples B2, B3, and B4

In Experimental Examples B2 and B3, the reformation process was carried out by the same method as that of Experimental Examples B1, except that the rotation number of the disperser in Experimental Examples B1 was changed. Experimental Examples B4 were carried out by the same method as that of Experimental Examples B1, except that the disperser 102 and the dispersing vessel 101 in the equipment illustrated in FIG. 1(A) were removed, thereby the filtration was carried out by directly sending the organic substance fine particle dispersion solution filled in the storing vessel 130 to the removing unit 120 by using the pump 104. The processing conditions thereof are summarized in Table B3; the results of Experimental Examples B2 are summarized in Table B4-2, the results of Experimental Examples B3 are summarized in Table B4-3, and the results of Experimental Examples B4 are summarized in Table B4-4. Meanwhile, the reformation experiments of Experimental Examples B2 correspond to Examples of the present invention; and the reformation experiments of Experimental Examples B3 and B4 correspond to Comparative Examples of the present invention.

TABLE B4-2

| Experimental Example | Processing duration [h] | pH | | Conductivity | | pH after preparation | | Conductivity after preparation | | Dispersion Stability | | EtOH residual rate [%] |
|---|---|---|---|---|---|---|---|---|---|---|---|---|
| | | | | | | | | | | initial precipitation confirmation time | Precipitation degree | |
| | | pH | [° C.] | [µS/cm] | [° C.] | pH | [° C.] | [µS · cm] | [° C.] | | | |
| B2-1 | 0.00 | 4.23 | 25.4 | 339 | 25.1 | — | — | — | — | 0.5 hour | F | 3.52 |
| B2-2 | 0.25 | 4.85 | 25.3 | 123.4 | 25.3 | — | — | — | — | 1 hour | F | 0.42 |
| B2-3 | 0.40 | 5.46 | 25.7 | 36.5 | 25.6 | — | — | — | — | 1 week | B | 0.12 |
| B2-4 | 0.55 | 5.52 | 25.6 | 11.2 | 25.6 | — | — | — | — | 1 week | B | 0.05 |
| B2-5 | 1.25 | 5.85 | 25.9 | 5.35 | 25.9 | — | — | — | — | 1 week | A | 0 |

TABLE B4-2-continued

| Experimental Example | Processing duration [h] | pH | pH [° C.] | Conductivity [μS/cm] | Conductivity [° C.] | pH after preparation pH | pH after preparation [° C.] | Conductivity after preparation [μS · cm] | Conductivity after preparation [° C.] | Dispersion Stability initial precipitation confirmation time | Precipitation degree | EtOH residual rate [%] |
|---|---|---|---|---|---|---|---|---|---|---|---|---|
| B2-6 | Adjusting pH of dispersion solution of Experimental Example B2-5 by using pH adjusting agent | | | | | 6.56 | 25.3 | 7.04 | 25.2 | 1 week | B | 0 |
| B2-7 | Adjusting pH of dispersion solution of Experimental Example B2-5 by using pH adjusting agent | | | | | 5.84 | 25.1 | 16.4 | 25.1 | 1 week | A | 0 |

TABLE B4-3

| Experimental Example | Processing duration [h] | pH | pH [° C.] | Conductivity [μS/cm] | Conductivity [° C.] | pH after preparation pH | pH after preparation [° C.] | Conductivity after preparation [μS · cm] | Conductivity after preparation [° C.] | Dispersion Stability initial precipitation confirmation time | Precipitation degree | EtOH residual rate [%] |
|---|---|---|---|---|---|---|---|---|---|---|---|---|
| B3-1 | 0.00 | 4.23 | 25.4 | 339 | 25.1 | — | — | — | — | 0.5 hour | F | 3.52 |
| B3-2 | 0.50 | 4.75 | 25.2 | 132.1 | 25.2 | — | — | — | — | 1 hour | F | 0.62 |
| B3-3 | 0.95 | 5.15 | 25.6 | 40.2 | 25.7 | — | — | — | — | 5 hours | F | 0.20 |
| B3-4 | 1.50 | 5.35 | 25.7 | 25.6 | 25.8 | — | — | — | — | 1 day later | D | 0.08 |
| B3-5 | 2.15 | 5.41 | 26.0 | 19.6 | 26.0 | — | — | — | — | 2 days later | D | 0.02 |
| B3-6 | Adjusting pH of dispersion solution of Experimental Example B3-5 by using pH adjusting agent | | | | | 6.54 | 25.4 | 9.12 | 25.4 | 1 day later | D | 0.02 |
| B3-7 | Adjusting pH of dispersion solution of Experimental Example B3-5 by using pH adjusting agent | | | | | 5.52 | 25.1 | 21.6 | 25.3 | 2 days later | D | 0.02 |

TABLE B4-4

| Experimental Example | Processing duration [h] | pH | pH [° C.] | Conductivity [μS/cm] | Conductivity [° C.] | Dispersion Stability initial precipitation confirmation time | Precipitation degree | EtOH residual rate [%] |
|---|---|---|---|---|---|---|---|---|
| B4-1 | 0.00 | 4.23 | 25.4 | 339 | 25.1 | 0.5 hour | F | 3.52 |
| B4-2 | 0.75 | 4.65 | 25.2 | 129.1 | 25.2 | 1 hour | F | 0.89 |
| B4-3 | 1.50 | 5.05 | 25.6 | 42.1 | 25.5 | 5 hours | F | 0.31 |
| B4-4 | 2.00 | 5.25 | 25.9 | 31.6 | 25.7 | 8 hours | F | 0.20 |
| B4-5 | 3.35 | 5.29 | 25.8 | 25.1 | 25.8 | 16 hours | F | 0.10 |

As can be seen in the results of Experimental Examples B2 of Table B4-2, when the rotation number of the disperser was decreased as compared with Experimental Examples B1, the time necessary for pH and conductivity of the organic substance fine particle dispersion solution to reach those of Experimental Examples B1 became longer; however, by adjusting pH and conductivity of the organic substance fine particle dispersion solution to those of Experimental Examples B1, the dispersion solution showing similar dispersion stability to that of the organic substance fine particle dispersion solution obtained in Experimental Examples B1 could be prepared. Experimental Example B2-6, in which pH was adjusted by adding a 0.05% by weight of aqueous sodium bicarbonate solution as the pH adjusting agent into the organic substance fine particle dispersion solution of Experimental Example B2-5 in the same way as Experimental Examples B1, showed a decrease in the dispersion property as compared with that of Experimental Example B2-5, but similar dispersion stability to that of Experimental Examples B2-3 and B2-4; and Experimental Example B2-7, in which a 0.02% by weight of aqueous citric acid solution was added to Experimental Example B2-6, exhibited similar dispersion stability to that of Experimental Example B2-5. Namely, it was found that by controlling pH or conductivity after carrying out the removal process in the reformation method of the dispersion solution of the present invention in the same way as Experimental Examples B1, the dispersion property of the organic substance fine particles in the organic substance fine particle dispersion solution could be controlled as well.

As can be seen in the results of Experimental Examples B3 in Table B4-3, under the condition that the rotation number of the disperser was 10 m/sec or lower as the circumferential velocity, even when pH of the organic substance fine particle dispersion solution was adjusted in the range of 5.4 to 6.5 in which the dispersion stability of the organic substance fine particle dispersion solution was enhanced, for example, in Experimental Examples B1, the dispersion stability of the organic substance fine particle dispersion solution was poorer than that of the organic substance fine particles obtained in Experimental Examples B1, whereby it was confirmed that the organic substance fine particles precipitated within 3 days in all the conditions. This is caused presumably because the physical energy E from the disperser 102 to the aggregate b was insufficient; and thus, dispersion of the aggregate b became insufficient somewhere in the processing, or the particles which were partially dispersed during being transported from the disperser 102 to the removing unit 120 returned to the aggregate b entirely, thereby resulting in the state as shown in FIG. 2(C).

As can be seen in the results of Experimental Examples B4 in Table B4-4, when the reformation process of the organic substance fine particle dispersion solution was carried out with the membrane filtration equipment not equipped with the disperser, it was difficult to carry out the process so as to bring pH to a value higher than 5.29, even with repeating the process. In addition, similar dispersion property and dispersion stability to those of Experimental Examples B1 could not be confirmed, whereby precipitation of the organic substance fine particles was confirmed within 1 day under all the conditions.

Experimental Examples B5

In Experimental Examples B5, the organic substance fine particle dispersion solution that was ejected from the separation processing equipment and recovered in the beaker in Experimental Examples B was subjected to the dispersion process with a batch system and then to the reformation process by the membrane filtration, wherein the both processes were carried out separately. Meanwhile, Experimental Examples B5 correspond to Comparative Examples of the present invention. Specifically, 5 kg (about 5 L) of the organic substance fine particle dispersion solution that was ejected from the separation processing equipment and recovered in the beaker was charged into the storing vessel 130, and then it was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 20 minutes. The temperature of the organic substance fine particle dispersion solution during the dispersion process was in the range of 24 to 28° C. After completion of the dispersion process, in the same way as Experimental Examples B4, by using the equipment not having the disperser 102 and the dispersing vessel 101 in the equipment described in FIG. 1(A), namely not having the dispersion processing equipment 110, the filtration was carried out by directly sending the organic substance fine particle dispersion solution filled in the storing vessel 130 to the removing unit 120 by using the pump 104. The filtration membrane, washing solution, pump, and so forth that were used in this process were the same as those used in Experimental Examples B1 to B4. Meanwhile, the time from completion of the dispersion process to start of the filtration took 20 minutes; and at the time when the filtration was started, the aggregate of the organic substance fine particles and the precipitation thereof had already been clearly seen. In the membrane filtration process, the organic substance fine particle dispersion solution was withdrawn from the process equipment at the time when the organic substance fine particle dispersion solution in the storing vessel became 2 L (about 2.0 kg); and then, pH, conductivity, dispersion property, and dispersion stability of the organic substance fine particle dispersion solution were confirmed. By adding 3.0 L of pure water into the storing vessel 130, this procedure was repeated to carry out the reformation process of the organic substance fine particle dispersion solution. The results thereof are summarized in Table B4-5.

TABLE B4-5

| Experimental Example | Processing times [times] | pH | | Conductivity | | Initial precipitation confirmation time | Dispersion Stability Precipitation degree | EtOH residual rate [%] |
|---|---|---|---|---|---|---|---|---|
| | | pH | [° C.] | [µS/cm] | [° C.] | | | |
| B5-1 | 0 | 4.23 | 25.4 | 645 | 25.1 | 0.5 hour | F | 3.52 |
| B5-2 | 1 | 4.68 | 25.2 | 409 | 25.4 | 1 hour | F | 0.84 |
| B5-3 | 2 | 5.12 | 25.6 | 53.2 | 25.9 | 8 hours | F | 0.33 |
| B5-4 | 3 | 5.31 | 25.9 | 13.1 | 26.4 | 16 hours | F | 0.18 |
| B5-5 | 4 | 5.39 | 25.8 | 8.36 | 26.9 | 1 day later | D | 0.09 |

As can be seen in Table B4-5, the reformation process was carried out until pH of the organic substance fine particle dispersion solution reached 5.39. However, even if this process was repeated, it was difficult to raise the pH to the value higher than 5.39. In addition, even when this process was carried out to bring its pH to that of Experimental Examples B1, similar dispersion property and dispersion stability to those of Experimental Examples B1 could not be confirmed. This is because in Experimental Examples B5, the dispersion process with the batch system and the removal process with the membrane filtration were separately carried out, the removal process to remove the impurities from the dispersion solution by the removing unit could not be carried out before the fine particles were re-aggregated entirely by the impurities.

Experimental Examples B6 to B9

Experimental Examples B6 to B9 were carried out by changing the conditions of the reformation process of Experimental Examples B1. Meanwhile, the experiments of Experimental Examples B6 to B8 correspond to Examples of the present invention; and the experiments of Experimental Examples B9 correspond to Comparative Examples. The changed conditions are summarized in Table B4-6. Meanwhile, both the pressures Pa of the pressure gauges described in Table B4-6 are obtained from the two pressure gauges Pa shown in FIG. 1(A).

TABLE B4-6

|  | | Experimental Example B1 | Experimental Example B6 | Experimental Example B7 | Experimental Example B8 | Experimental Example B9 |
|---|---|---|---|---|---|---|
| (10) | Flow amount of the pump 104 | 6.4 L/min | 8.8 L/min | 6.4 L/min | 5.0 L/min | 6.4 L/min |
| (11) | Flow amount of the organic fine dispersion solution returned to the storing vessel 130 | 5.4 L/min | 7.0 L/min | 5.0 L/min | 4.5 L/min | 4.6 L/min |
| (12) | Amount of the filtrate L3 discharged by the removing unit 120 (Calculated value) | 1.0 L/min | 1.8 L/min | 1.4 L/min | 0.5 L/min | 1.8 L/min |
| (16) | Pressure meters | Pa: Both two 0.10 MPaG | Same as on the left | Pa: Both two 0.12 MPaG | Pa: Both two 0.10 MPaG | Same as on the left |
| (19) | Path length (Lea) | 0.3 m | Same as on the left | Same as on the left | 0.5 m | 1.2 m |
| (20) | Pipe's inner diameter (Leb) | 0.0105 m | Same as on the left | Same as on the left | Same as on the left | 0.0230 m |
| (21) | Flow rate of the fine particle dispersion solution in the just-before transporting path | 1.2 m/sec | 1.7 m/sec | 1.2 m/sec | 1.0 m/sec | 0.3 m/sec |
| (22) | Time T1 from the dispersing vessel 101 to start of removal of the impurity by the removing unit 120 | 0.24 sec | 0.18 sec | 0.24 sec | 0.52 sec | 3.64 sec |
| (23) | Thermometer installed in the dispersing vessel 101 | From 24° C. to 28° C. | From 24° C. to 28° C. | From 24° C. to 22° C. | From 24° C. to 28° C. | From 24° C. to 28° C. |

In Experimental Examples B6, the experimental condition was changed such that the flow rate of the pump 104 was increased from Experimental Examples B1, namely the flow rate of the organic substance fine particle dispersion solution from the storing vessel 130 to the dispersion processing equipment 110 and the removing unit 120 was increased, while both Lea and Leb were set to the same as those of Experimental Examples B1. Therefore, the flow rate (FL) of the dispersion solution in the just-before transporting path became faster, so that T1 became shorter. Under the condition of Experimental Examples B6, by carrying out the reformation process so as to reach pH or conductivity of Experimental Examples B1, the organic substance fine particle dispersion solution having the dispersion property or the dispersion stability which are better than those of Experimental Examples B1 could be obtained. As can be seen in Table B4-6, in Experimental Examples B6, the experimental condition was changed such that the flow rate of the pump 104 was made faster than that of B1, thereby enabling to increase the discharge amount of the filtrate L3; and thus, the processing time could be shortened. In Experimental Examples B7, the experimental condition was changed such that the pressure of the organic substance fine particle dispersion solution in the just-before transporting path was made higher than that of Experimental Examples B1. By carrying out the reformation process to pH or conductivity of Experimental Examples B1, the organic substance fine particle dispersion solution having similar dispersion property or dispersion stability to those of Experimental Examples B1 could be prepared; and in addition, because the discharge amount of the filtrate L3 could be increased, the processing time could be shortened.

In the organic substance fine particles obtained in Experimental Examples B6, the organic substance fine particle dispersion solution having the dispersion property or the dispersion stability which are better than those of Experimental Examples B1 means, as compared with the organic substance fine particle dispersion solution of, for example, Experimental Example B1-4 whose pH was adjusted to 5.52, the organic substance fine particle dispersion solution in which by adjusting the pH thereof to that of Experimental Example B1-4 the initial deposition confirmation time becomes longer and also the organic substance fine particles are confirmed to be in the state of more dispersed than Experimental Example B1-4 in the TEM observation.

In Experimental Examples B8, the experimental condition was changed such that the flow rate of the pump 104 was decreased and Lea was increased as compared with those of Experimental Examples B1. Under these conditions, the discharge amount of the filtrate L3 was decreased and T1 became longer; but the organic substance fine particle dispersion solution having similar dispersion property or dispersion stability to those of Experimental Examples B1 could be prepared by carrying out the reformation process until pH or conductivity thereof reached those of Experimental Examples B1.

In Experimental Examples B9, the experimental conditions, Lea and Leb, were changed from those of Experimental Examples B1 such that T1 became 3 seconds or more. Under these conditions, even if the process was repeated, it was difficult to raise the pH to more than 5.29; and in addition, similar dispersion property and dispersion stability to those of Experimental Examples B1 could not be confirmed, whereby it was confirmed that the organic substance fine particles precipitated within 3 days in all the conditions. This is caused presumably because T1 becomes 3 seconds or longer; and thus, the organic substance fine particles once dispersed by the physical energy E from the disperser 102 to the aggregate b return to the aggregate b during being transported from the disperser 102 to the removing unit 120, thereby resulting in the state as shown in FIG. 2(C).

Consequently, the dispersion property of the organic substance fine particles included in the organic substance fine particle dispersion solution could be controlled by changing the flow rate, the flow amount, or the fluid pressure in the just-before transporting path; and also, by changing these conditions, the dispersion property of the organic substance fine particles could be enhanced.

Experimental Examples C: Experiments on the Oxide Fine Particle Dispersion Solution As the previous processes before obtaining the dispersion solution, the oxide raw material solution, the oxide separating solvent, and the silicon oxide raw material solution each were prepared by using Clearmix (product name: CLM-2.2S, manufactured by M. Technique Co., Ltd.), which is the high speed rotational dispersion emulsifier. Specifically, according to the prescription of the first fluid (A-solution) described in Table C1, each component of the oxide raw material solution were uniformly mixed by stirring for 30 minutes by using Clearmix with the rotation number of the rotor thereof being 20000 rpm and at the preparation temperature of 40° C. to obtain the oxide raw material solution. Also, according to the prescription of the second fluid (B-solution) described in Table C1, each component of the oxide separating solvent were uniformly mixed by stirring for 30 minutes by using Clearmix with the rotation number of the rotor thereof being 15000 rpm and at the preparation temperature of 45° C. to obtain the oxide separating solvent. Further, according to the prescription of the third fluid, the silicon oxide raw material solution (C-solution) described in Table C1, each component of the silicon oxide raw material solution were uniformly mixed by stirring for 10 minutes by using Clearmix with the rotation number of the rotor thereof being 6000 rpm and at the preparation temperature of 20° C. to obtain the silicon oxide raw material solution.

Meanwhile, the substances represented by chemical formula or abbreviation described in Table C1 are 97% by weight $H_2SO_4$ for concentrated sulfuric acid (manufactured by Kishida Chemical Co., Ltd.), NaOH for sodium hydroxide (manufactured by Kanto Chemical Co., Ltd.), TEOS for tetraethyl orthosilicate (manufactured by Wako Pure Chemical Industries, Ltd.), and $Fe(NO_3)_3 \cdot 9H_2O$ for ferric nitrate nonahydrate (manufactured by Kanto Chemical Co., Ltd.).

Next, as the process to obtain the dispersion solution, the oxide raw material solution, the oxide separating solvent, and the silicon oxide raw material solution, all having been prepared as described above, were mixed by using the separation processing equipment illustrated in FIG. 3(A). Specifically, the oxide raw material solution was introduced as the A-solution into between the processing surfaces 1 and 2; and with operating the processing member 10 with the rotation number of 1130 rpm, the oxide separating solvent was introduced as the B-solution into the processing surfaces 1 and 2 so as to mix the oxide separating solvent and the oxide raw material solution in a thin film fluid, whereby the oxide fine particles were separated in between the processing surfaces 1 and 2. Next, the silicon oxide raw material solution was introduced as the C-solution into the processing surfaces 1 and 2 so as to mix in the thin film fluid with the mixed fluid including the oxide fine particles that were previously separated. As a result, the silicon oxide is precipitated on surface of the previously separated oxide fine particles, whereby the fluid including the oxide fine particles covered with the silicon oxide (hereunder, silicon-oxide-covered oxide fine particle dispersion solution) was ejected from between the processing surfaces 1 and 2 of the separation processing equipment. The ejected silicon-oxide-covered oxide fine particle dispersion solution was recovered in a beaker via the vessel v.

In Table C2, operation conditions of the separation processing equipment are summarized. The introduction temperatures (supply temperatures) and introduction pressures (supply pressures) of the A-solution, B-solution, and C-solution described in Table C2 were measured by using the thermometers and pressure meters installed in the sealed introduction paths to between the processing surfaces 1 and 2 (first introduction part d1, second introduction part d2, and third introduction part C3), wherein the introduction temperature of the A-solution in Table C2 is the temperature of the actual A-solution under the introduction pressure in the first introduction part d1, the introduction temperature of the B-solution is the temperature of the actual B-solution under the introduction pressure in the second introduction part d2, and the introduction temperature of the C-solution is the temperature of the actual C-solution under the introduction pressure in the third introduction part d3.

Measurement of pH was made by using a pH meter (catalogue No. C-71; manufactured by HORIBA, Ltd.). Before the A-solution, the B-solution, and the C-solution were introduced into the separation processing equipment, pH of these solutions were measured at room temperature. It was difficult to measure pH of the mixed fluid immediately after the oxide raw material solution was mixed with the oxide separating solvent and pH of the mixed fluid immediately after the fluid including the oxide fine particles previously separated was mixed with the silicon oxide raw material solution; and thus, pH of the silicon-oxide-covered oxide fine particle dispersion solution which was ejected from the equipment and recovered in the beaker was measured at room temperature.

TABLE C1

| | The prescription of the first fluid (A-solution) | | | | | | The prescription of the second fluid (B-solution) | | | | | |
|---|---|---|---|---|---|---|---|---|---|---|---|---|
| | Prescription [wt %] | | | | pH | | Prescription [wt %] | | | | pH | |
| | Material | [wt %] | Material | [wt %] | pH | [° C.] | Material | [wt %] | Material | [wt %] | pH | [° C.] |
| oxide raw material solution | $Fe(NO_3)_3 \cdot 9H_2O$ | 2.00 | Pure water | 98.00 | 2.85 | 38.6 | oxide separating solvent | NaOH | 9.00 | Pure water | 91.00 | >14 | — |

TABLE C1-continued

The prescription of the third fluid, Silicon oxide raw material solution (C-solution)

| Prescription [wt %] | | | | | | pH | |
|---|---|---|---|---|---|---|---|
| Material | [wt %] | Material | [wt %] | Material | [wt %] | pH | [° C.] |
| Pure water | 92.89 | 97 wt % $H_2SO_4$ | 5.11 | TEOS | 2.00 | <1 | — |

TABLE C2

| Introduction flow amount (supply flow amount) ml/min | | | Introduction temperatures (supply temperatures) [O° C.] | | | Introduction pressures (supply pressures) [MPaG] | | | Discharged solution | | Particle diameter (D) [nm] |
|---|---|---|---|---|---|---|---|---|---|---|---|
| A solution | B solution | C solution | A solution | B solution | C solution | A solution | B solution | C solution | pH | Temperature | |
| 400 | 50 | 100 | 142 | 86 | 89 | 0.451 | 0.50 | 0.50 | 12.56 | 32.9 | 8.20 |

Experimental Examples C1

The reformation experiments of the dispersion solutions relating to Experimental Examples C1 correspond to Examples of the present invention.

In the process of reforming the dispersion solution, from the silicon-oxide-covered oxide fine particle dispersion solution which was ejected from the separation processing equipment and then recovered in the beaker, impurities were removed and pH thereof was controlled by using the dispersion solution reformation equipment 100 illustrated in FIG. 1(A). In Table C12 to be described later, the methods and conditions of the reformation process of each Experimental Examples C1 to C3 of the present invention, as well as those of each Experimental Examples C5 and C6 are summarized. The process was carried out with the same procedure as that of Experimental Examples A except for the conditions described in Table C12.

During the time of continuing the reformation process under the condition of Experimental Examples C1 as described in Table C12, part of the oxide fine particle dispersion solution was withdrawn from the storing vessel 130 at an interval; and these were designated as Experimental Examples C1-1 to C1-9, and the dispersion solutions obtained by adding a pH adjusting agent to the oxide fine particle dispersion solution of Experimental Example C1-9 were designated as Experimental Examples C1-10, C1-11, and C1-12. Concentration of the oxide fine particles in all the oxide fine particle dispersion solutions of Experimental Examples C1-1 to C1-12 was 4.0% by weight as $Fe_2O_3$. In Table C3, pH and conductivity of the oxide fine particle dispersion solution during the reformation process of the oxide fine particle dispersion solution are summarized. By carrying out the reformation process, pH and conductivity of the oxide fine particle dispersion solution approached almost the same as those of the cross-flow washing solution and the pure water charged into the storing vessel 130. In each of Experimental Examples C1-1 to C1-12, part of the withdrawn oxide fine particle dispersion solution was diluted with propylene glycol (hereunder, PG), and this diluted solution was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. Part of the PG dispersion solution of the oxide fine particles thus obtained was diluted with isopropyl alcohol (hereunder, IPA), and then it was processed with an ultrasonic cleaning machine for 5 minutes. Then, the solution thus obtained was dropped onto a collodion film and dried in an atmosphere for 4 hours to obtain the sample for TEM observation. The rest of the PG dispersion solution of the oxide fine particles was subjected to the UV-Vis spectrum measurement.

(UV-Vis Spectrum)

For measurement of the UV-Vis spectrum, a UV-Vis absorption spectrophotometer (product name: UV-2450, manufactured by Shimadzu Corp.) was used. The transmission spectrum was measured with the measurement range of 200 nm to 800 nm, with the sampling rate of 0.2 nm, and with a slow measurement rate. For the transmission spectrum measurement, the dispersion solution obtained by dispersing the silicon-oxide-covered iron oxide into PG with the concentration thereof being $2.1 \times 10^{-3}$ mol/L (as $Fe_2O_3$) was used as the measurement sample.

TABLE C3

| Experimental Example | Processing duration [h] | pH | | Conductivity | | pH after adjusting | | Conductivity after adjusting | | Dispersion Stability initial precipitation confirmation time | Precipitation degree |
|---|---|---|---|---|---|---|---|---|---|---|---|
| | | pH | [° C.] | [µS/cm] | [° C.] | pH | [° C.] | [µS · cm] | [° C.] | | |
| C1-1 | 0 | 12.50 | 21.6 | 9540 | 21.6 | — | — | — | — | 0.2 hour | F |
| C1-2 | 0.29 | 10.93 | 26.3 | 421 | 26.3 | — | — | — | — | 2 hours | F |
| C1-3 | 1.10 | 8.14 | 23.9 | 8.36 | 23.9 | — | — | — | — | 1 week | B |
| C1-4 | 1.64 | 7.87 | 23.4 | 7.55 | 23.4 | — | — | — | — | 1 week | B |

TABLE C3-continued

| Experimental Example | Processing duration [h] | pH | pH [° C.] | Conductivity [µS/cm] | Conductivity [° C.] | pH after adjusting pH | pH after adjusting [° C.] | Conductivity after adjusting [µS · cm] | Conductivity after adjusting [° C.] | Dispersion Stability initial precipitation confirmation time | Precipitation degree |
|---|---|---|---|---|---|---|---|---|---|---|---|
| C1-5 | 3.16 | 7.22 | 23.3 | 5.69 | 23.3 | — | — | — | — | 1 week | A |
| C1-6 | 4.05 | 6.90 | 23.4 | 4.01 | 23.4 | — | — | — | — | 1 week | A |
| C1-7 | 5.16 | 6.71 | 23.1 | 3.21 | 23.1 | — | — | — | — | 1 week | A |
| C1-8 | 7.15 | 6.31 | 23.2 | 2.99 | 23.2 | — | — | — | — | 0.5 hour | F |
| C1-9 | 9.14 | 6.01 | 23.2 | 2.30 | 23.2 | — | — | — | — | 0 (immediately after) | F |
| C1-10 | Adding pH adjusting agent to the dispersion solution of Experimental Example C1-9 | | | | | 6.72 | 26.7 | 3.51 | 26.7 | 1 week | A |
| C1-11 | Adding pH adjusting agent to the dispersion solution of Experimental Example C1-9 | | | | | 7.24 | 26.8 | 6.25 | 26.8 | 1 week | A |
| C1-12 | Adding pH adjusting agent to the dispersion solution of Experimental Example C1-9 | | | | | 8.35 | 26.9 | 25.90 | 26.9 | 1 week | B |

(Dispersion Stability and Self-Dispersion Property)

In the oxide fine particle dispersion solutions of Experimental Examples C1-1, C1-2, C1-8, and C1-9, precipitation of the oxide fine particles was found at the time described in the initial deposition confirmation time in Table C3, wherein the phase including the oxide fine particles and the phase not substantially including the oxide fine particles were separated. In Experimental Examples C1-3 and C1-4, precipitation of the oxide fine particles was faintly observed at 1 week of the static state after the withdrawal. In the oxide fine particle dispersion solution of Experimental Examples C1-5 to C1-7, precipitation of an extremely minute amount of the oxide fine particles was observed at 1 week of the static state after the withdrawal, but the precipitation amount thereof was about 0.1% by weight relative to the oxide fine particles included in the dispersion solution. In Experimental Examples C1-3 and C1-4, when the dispersion solution was allowed to stand for one more week (2 weeks after withdrawal), a slightly more precipitation of the oxide fine particles was observed as compared with that observed at 1 week of the static state after the withdrawal, but the precipitation amount thereof was about 0.2% by weight relative to the oxide fine particles included in the dispersion solution. It became clear that the dispersion stability of the oxide fine particle dispersion solution can be enhanced by controlling pH of the oxide fine particle dispersion solution in the range of 6.5 and 8.5 by using the dispersion solution reformation equipment of the present invention. Furthermore, with regard to Experimental Examples C1-5 to C1-7, surprisingly, no deposition could be confirmed at 2 weeks of the static state after the withdrawal. In the oxide fine particles in the oxide fine particle dispersion solution whose pH was made in the range of 6.5 to 7.5, the precipitated fine particles once generated during 1 week of the static state was re-dispersed without carrying out any dispersion process, so that it was presumed that the dispersion solution included the oxide fine particles having self-dispersion property.

(Adjustment of pH after Completion of Removal Process)

An aqueous 0.05% by weight of ammonia solution was added as the pH adjusting agent into the oxide fine particle dispersion solution of Experimental Example C1-9, and then the dispersion process thereof was carried out by using Clearmix (product name: CLM-2.2S, rotor: R1, screen: S0.8-48, manufactured by M. Technique Co., Ltd.) at 20000 rpm for 30 minutes to obtain Experimental Examples C1-10 to C1-12. The results of Experimental Examples C1-10 to C1-12 are summarized in Table C3. Experimental Example C1-10 in which pH was adjusted at 6.72 and conductivity at 3.51 µS/cm (measurement temperature of 26.7° C.) and Experimental Example C1-11 in which pH was adjusted at 7.24 and conductivity at 6.25 µS/cm (measurement temperature of 26.8° C.) exhibited similar dispersion stability and self-dispersion property to those of the oxide fine particle dispersion solutions of Experimental Examples C1-5 to C1-7. Experimental Example C1-12 in which pH was adjusted at 8.35 and conductivity at 25.9 µS/cm (measurement temperature of 26.9° C.) exhibited similar dispersion stability and self-dispersion property to those of the oxide fine particle dispersion solutions of Experimental Examples C1-3 and C1-4. Meanwhile, when an aqueous 0.1% by weight of nitric acid solution was added to the oxide fine particle dispersion solution of Experimental Example C1-1 so as to bring pH thereof to 6.90 (measurement temperature of 23.4° C.), the conductivity thereof was 12460 µS/cm (12.46 mµS/cm), wherein precipitation was clearly observed within 0.1 hours after the preparation thereof, resulting in separation between the phase including the oxide fine particles and the phase not substantially including the oxide fine particles. From this, it can be seen that when the removal process to remove the impurities is not carried out in the reformation process of the present invention, the dispersion property cannot be controlled even if pH thereof is controlled.

(Assessment of Dispersion Property: TEM Observation)

Figure 10:
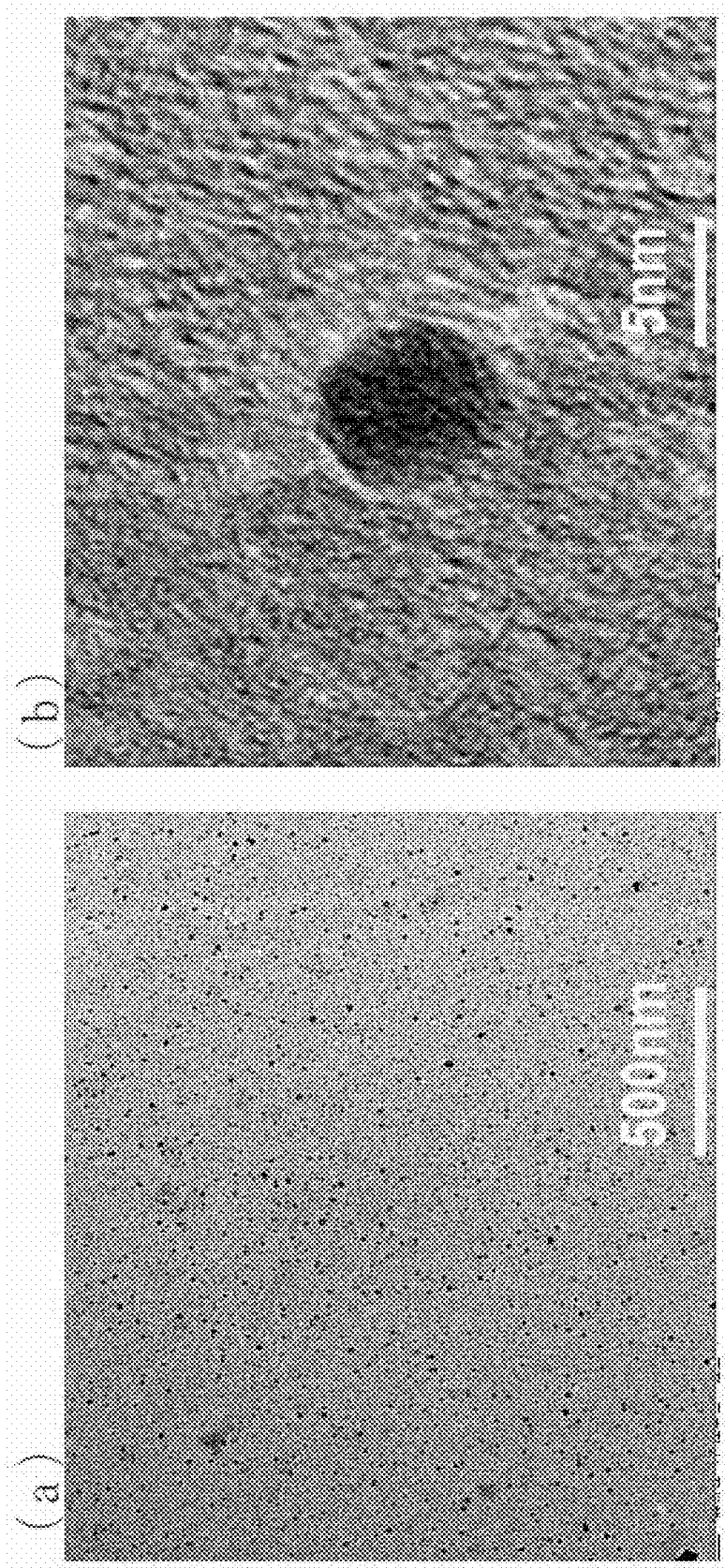
FIG. 10
These are the TEM pictures of the oxide fine particles in the oxide fine particle dispersion solution obtained in Experimental Example C1-6 of the present invention. Meanwhile, (a) and (b) are the observation results with the magnification of 10000 and 800000, respectively.

The TEM pictures of the oxide fine particles of Experimental Example C1-6 are shown in FIG. 10. From the TEM picture with the magnification of 10000 in FIG. 10(a), it was confirmed that the oxide fine particles were uniformly dispersed. From the TEM picture with the magnification of 800000 in FIG. 10(b), it was confirmed that the primary particle's diameter thereof was about 8 nm. Similar results were obtained in the oxide fine particles of Experimental Examples C1-5, C1-7, C1-10, and C1-11 (not shown by the drawing). Meanwhile, the TEM observation in Experimental Examples C was made by using the transmission electron microscope (JEM-2100, manufactured by JEOL Ltd.), wherein the dispersion property of the oxide fine particle dispersion solution was assessed under the observation conditions with the acceleration voltage of 80 kV and the observation magnification of 10000 or more.

Figure 11:
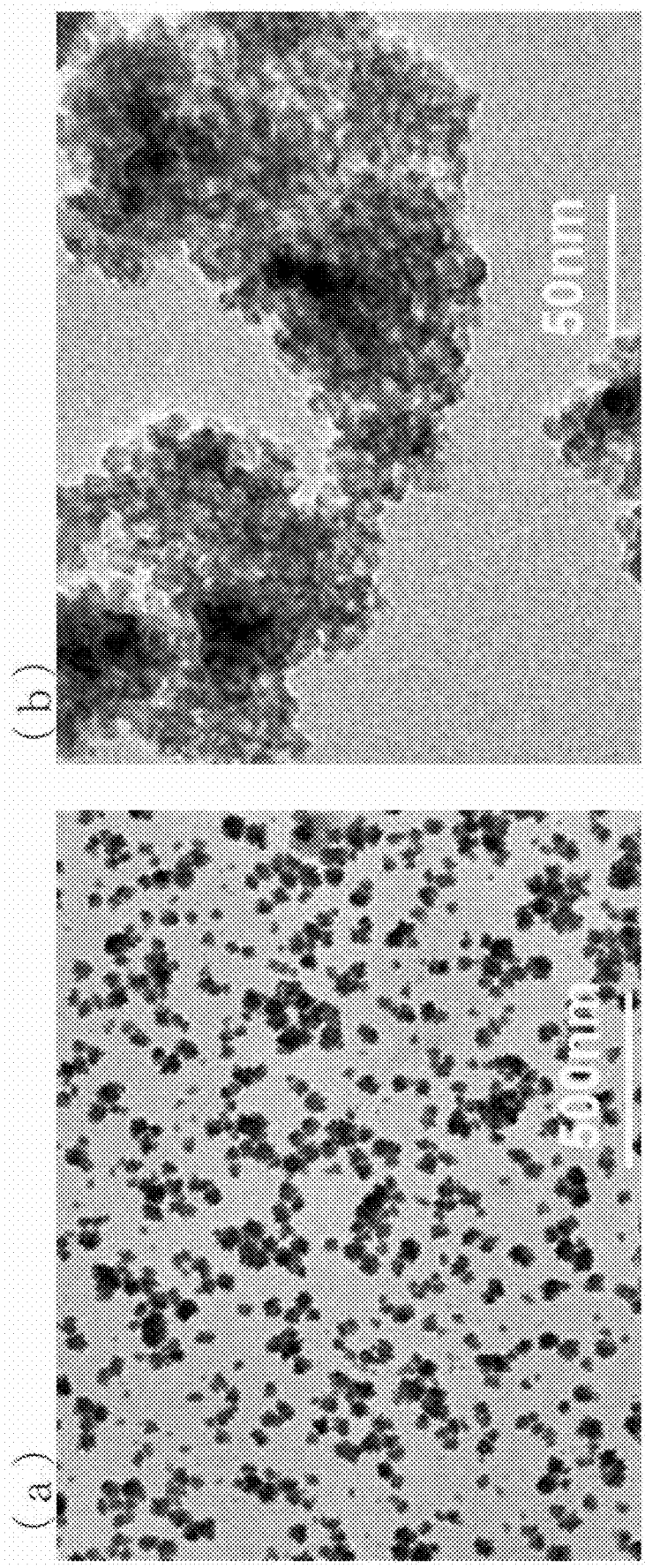
FIG. 11
These are the TEM pictures of the oxide fine particles in the oxide fine particle dispersion solution obtained in Experimental Example C1-9 of the present invention. Meanwhile, (a) and (b) are the observation results with the magnification of 10000 and 100000, respectively.

The TEM pictures of the oxide fine particles of Experimental Example C1-9 are shown in FIG. 11. From the TEM pictures with the magnification of 10000 shown in FIG. 11(*a*) and with the magnification of 100000 shown in (b), it was observed that as compared with Experimental Example C1-6 the oxide fine particles aggregated with more number of the aggregates. Similar results were observed in the oxide fine particles of Experimental Example C1-8 (not shown by the drawing).

Figure 12:
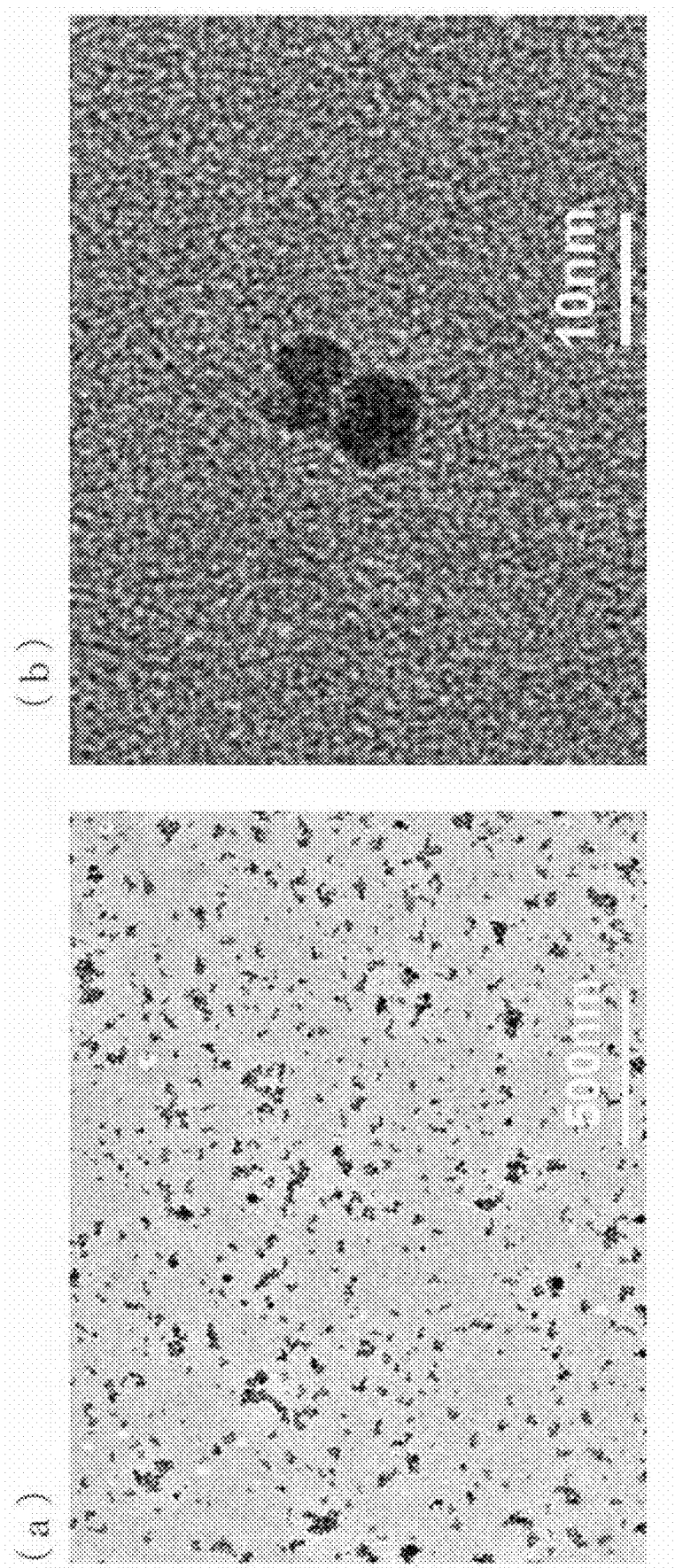
FIG. 12
These are the TEM pictures of the oxide fine particles in the oxide fine particle dispersion solution obtained in Experimental Example C1-4 of the present invention. Meanwhile, (a) and (b) are the observation results with the magnification of 10000 and 250000, respectively.

The TEM pictures of the oxide fine particles of Experimental Example C1-4 are shown in FIG. 12. From the TEM pictures with the magnification of 10000 shown in FIG. 12(*a*) and with the magnification of 25000 shown in (b), it was observed that the oxide fine particles aggregated more as compared with Experimental Example C1-6; however, as compared with the oxide fine particles of Experimental Example C1-9, number of the aggregates thereof was less, and the oxide fine particles were dispersed uniformly. Similar results were obtained in the oxide fine particles of Experimental Examples C1-3 and C1-12.

The TEM pictures of Experimental Examples C1-1 and C1-2 were taken immediately after start of the washing process of the oxide fine particle dispersion solution; therefore, not only the same aggregates of the oxide fine particles as those of Experimental Examples C1-8 and C1-9 but also impurities (NaOH, $NaNO_3$, $Na_2SO_4$, etc.) were observed (not shown by the drawing).

(Measurement Results of UV-Vis Spectra)

Figure 13:
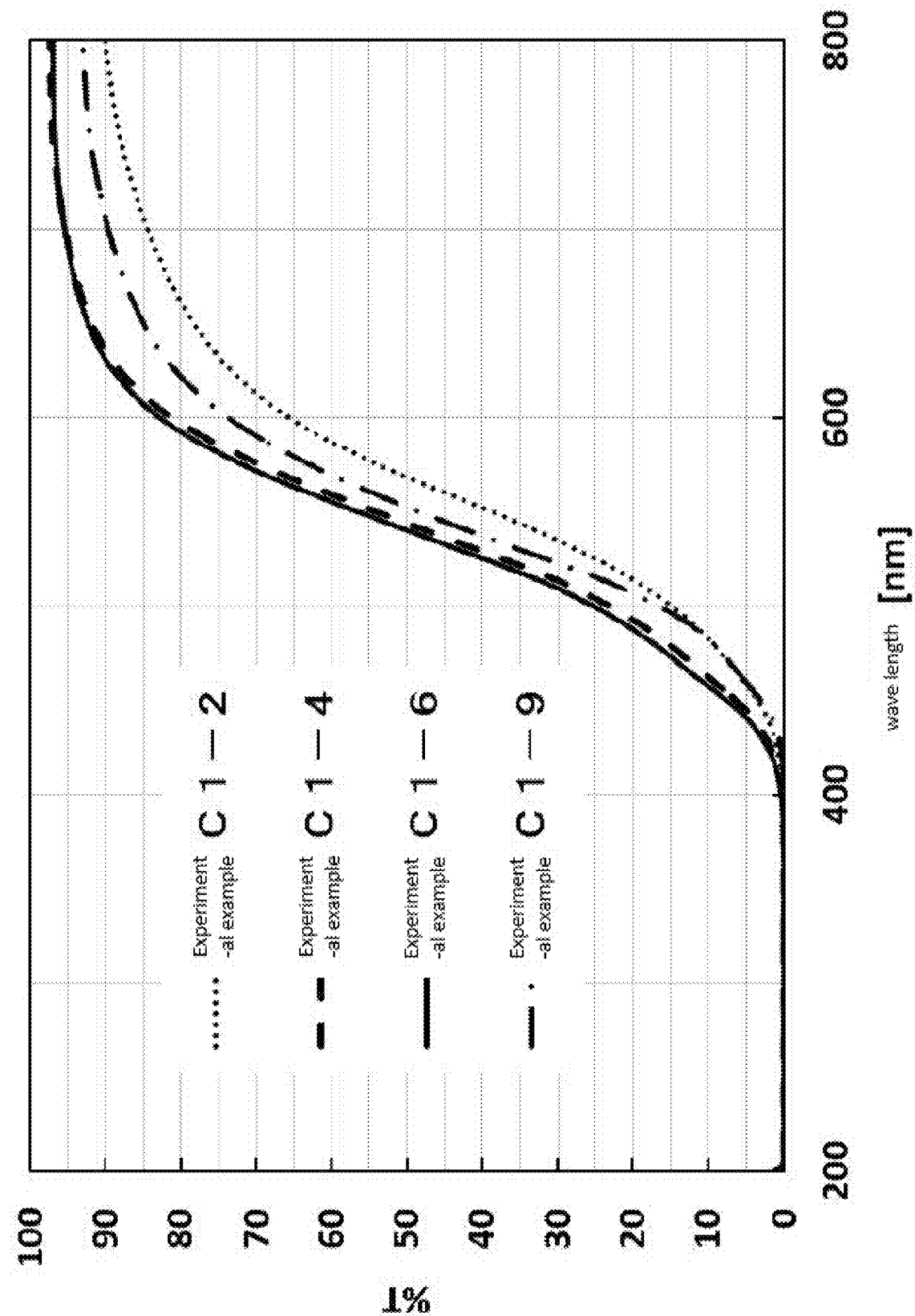
FIG. 13
This is the measurement results of the UV-Vis spectra (transmission spectra) of the propylene glycol dispersion solutions prepared by using oxide fine particle dispersion solutions with the conditions of Experimental Examples C1-2, C1-4, C1-6, and C1-9 of the present invention.

The measurement results of the UV-Vis spectra (transmission spectra) of the PG dispersion solutions prepared by using the oxide fine particle dispersion solutions of Experimental Examples C1-2, C1-4, C1-6, and C1-9 are shown in FIG. 13. The PG dispersion solutions prepared by using the oxide fine particle dispersion solutions of Experimental Examples C1-4 and C1-6 showed almost the identical spectrum form, wherein absorption was observed in the wavelength range of 200 nm to 400 nm, and 95% or more of transmittance was observed in the wavelength range of 700 nm to 800 nm. On the other hand, the PG dispersion solutions prepared by using the oxide fine particle dispersion solutions of Experimental Examples C1-2 and C1-9 showed lower transmittance than Experimental Examples C1-4 and C1-6 in the wavelength range of 700 nm to 800 nm. This is presumably because the dispersion property of the oxide fine particles in the oxide fine particle dispersion solutions of Experimental Examples C1-2 and C1-9 are poorer than that of Experimental Examples C1-4 and C1-6, the oxide fine particles included in the oxide fine particle dispersion solutions of Experimental Examples C1-2 and C1-9 are not uniformly dispersed in the PG dispersion solutions thereby forming the aggregates thereof, and thus, they show lower transmittance in the visible light region than the PG dispersion solutions of Experimental Examples C1-4 and C1-6.

As can be seen in the foregoing results, it was found that the dispersion property of the oxide fine particles in the oxide fine particle dispersion solution could be enhanced by preparing the oxide fine particle dispersion solution by using the equipment comprising the disperser and the equipment with which impurities were removed from the oxide fine particle dispersion solution by the cross-flow method using the filtration membrane, and by controlling pH or conductivity on the basis of the processing time of the oxide fine particle dispersion solution. In addition, it was found that the dispersion property of the oxide fine particle dispersion solution could be enhanced wherein the dispersion solution was prepared using the obtained oxide fine particle dispersion solution and other dispersing medium. Further, it was found that the dispersion property of the oxide fine particles included in the oxide fine particle dispersion solution could be controlled by controlling pH or conductivity of the dispersion solution after the removal process of the impurities in the reformation method of the dispersion solution of the present invention. Further, in the oxide fine particle dispersion solution whose pH was adjusted at 6.01, it was found that when pH thereof was readjusted in the range of 6.5 to 8.5, the dispersion stability could be enhanced; and in addition, the dispersion property of the oxide fine particle dispersion solution could be enhanced wherein the dispersion solution was prepared using the obtained oxide fine particle dispersion solution and other dispersing medium.

Experimental Examples C2

The reformation experiments of Experimental Examples C2 correspond to Comparative Examples of the present invention.

In Experimental Examples C2, the reformation process of the oxide fine particle dispersion solution was carried out by the same method as that of Experimental Examples C1 in removal of the impurities in the oxide fine particle dispersion solution as well as in pH adjustment, except that the disperser 102 and the dispersing vessel 101 in the equipment illustrated in FIG. 1(A) were removed so that the filtration was carried out by directly sending the oxide fine particle dispersion solution filled in the storing vessel 130 to the removing unit 120 by using the pump 104. The results of Experimental Examples C2 are summarized in Table C4.

TABLE C4

| Experimental Example | Processing duration [h] | pH pH | pH [° C.] | Conductivity [μS/cm] | Conductivity [° C.] | Dispersion Stability initial precipitation confirmation time | Precipitation degree |
|---|---|---|---|---|---|---|---|
| C2-1 | 0 | 12.50 | 21.6 | 9540 | 21.6 | 0.2 hour | F |
| C2-2 | 0.15 | 11.24 | 23.4 | 632 | 23.4 | 0.5 hour | F |
| C2-3 | 0.48 | 10.59 | 23.1 | 432 | 23.1 | 1 hour | F |
| C2-4 | 1.16 | 9.46 | 23.3 | 16.42 | 23.3 | 7 hours | E |
| C2-5 | 2.46 | 8.39 | 23.4 | 11.21 | 23.4 | 1 day later | D |
| C2-6 | 5.51 | 7.98 | 23.3 | 8.98 | 23.3 | 1 day later | D |
| C2-7 | 11.29 | 7.48 | 23.6 | 6.59 | 23.6 | 1 day later | D |

As described in Table C4, the reformation process was carried out until pH of the oxide fine particle dispersion solution reached 7.48. However, it was difficult to bring the pH thereof to lower than 7.48 even if the process was repeated. Further, even in the case that the reformation process was carried out until pH and conductivity reached those of Experimental Examples C1, similar dispersion property and dispersion stability to those of Experimental Examples C1 could not be confirmed.

Experimental Examples C3

The reformation experiments of Experimental Examples C3 correspond to Examples in which the circumferential velocity of the disperser in the present invention is 10 m/sec or less.

In Experimental Examples C3, the reformation process of the oxide fine particle dispersion solution was carried out with the same method as that of Experimental Examples C1, except that the circumferential velocity of the disperser in the equipment described in FIG. 1(A) was made to 7.1 m/sec. The conditions of Experimental Examples C3 are summarized in Table C12, and the results thereof are summarized in Table C5.

20000 rpm for 30 minutes to obtain Experimental Examples C3-9 to C3-11. Experimental Example C3-9 in which pH was adjusted at 6.81 and conductivity at 6.12 µS/cm (measurement temperature of 26.7° C.) and Experimental Example C3-10 in which pH was adjusted at 7.36 and conductivity at 6.77 µS/cm (measurement temperature of 26.8° C.) exhibited similar dispersion stability and self-dispersion property to those of the oxide fine particle dispersion solutions of Experimental Examples C3-6 and C3-7. Experimental Example C3-11 in which pH was adjusted at 8.25 and conductivity at 23.3 µS/cm (measurement temperature of 26.9° C.) exhibited similar dispersion stability and self-dispersion property to those of the oxide fine particle dispersion solutions of Experimental Examples C3-4 and C3-5.

Experimental Examples C4

In Experimental Examples C4, the silicon-oxide-covered oxide fine particle dispersion solution that was ejected from the separation processing equipment and recovered in the

TABLE C5

| Experimental Example | Processing duration [h] | pH pH | pH [° C.] | Conductivity [µS/cm] | Conductivity [° C.] | pH after adjusting pH | pH after adjusting [° C.] | Conductivity after adjusting [µS · cm] | Conductivity after adjusting [° C.] | Dispersion Stability initial precipitation confirmation time | Dispersion Stability Precipitation degree |
|---|---|---|---|---|---|---|---|---|---|---|---|
| C3-1 | 0 | 12.50 | 21.6 | 9540 | 21.6 | — | — | — | — | 0.2 hour | F |
| C3-2 | 0.37 | 10.98 | 26.3 | 549 | 26.3 | — | — | — | — | 1.5 hours | F |
| C3-3 | 1.08 | 9.54 | 23.3 | 12.10 | 23.3 | — | — | — | — | 7 hours | E |
| C3-4 | 2.16 | 8.49 | 23.6 | 14.26 | 23.6 | — | — | — | — | 1 day later | D |
| C3-5 | 3.15 | 7.69 | 23.3 | 8.16 | 23.3 | — | — | — | — | 2 days later | D |
| C3-6 | 4.59 | 7.31 | 23.6 | 6.66 | 23.6 | — | — | — | — | 1 week | C |
| C3-7 | 7.89 | 7.24 | 23.6 | 6.48 | 23.6 | — | — | — | — | 1 week | C |
| C3-8 | 13.59 | 6.31 | 23.6 | 4.12 | 23.6 | — | — | — | — | 0.5 hour | F |
| C3-9 | Adding pH adjusting agent to the dispersion solution of Experimental Example C3-8 | | | | | 6.81 | 26.7 | 6.12 | 26.7 | 4 days later | C |
| C3-10 | Adding pH adjusting agent to the dispersion solution of Experimental Example C3-8 | | | | | 7.36 | 26.8 | 6.77 | 26.8 | 4 days later | C |
| C3-11 | Adding pH adjusting agent to the dispersion solution of Experimental Example C3-8 | | | | | 8.25 | 26.9 | 23.30 | 26.9 | 2 days later | D |

As described in Table C5, as compared with Experimental Examples C1, the oxide fine particle dispersion solution needed longer time to reach pH and conductivity of Experimental Examples C1; but the process was carried out till pH of 6.31 by repeating the process. In examples in which the reformation process was carried out till pH of Experimental Examples C1 by continuing the reformation process (for example, Experimental Examples C3-5 to C3-7), the dispersion property and dispersion stability could also be improved as compared with Experimental Examples C2-5 to 2-7, which correspond to Comparative Examples of the present invention, though similar dispersion property and dispersion stability to those of Experimental Examples C1 could not be confirmed.
(Adjustment of pH after Completion of Dispersion Process and Removal Process)

An aqueous 0.05% by weight of ammonia solution was added as the pH adjusting agent into the oxide fine particle dispersion solution of Experimental Example C3-8 (pH 6.31), and then the dispersion process thereof was carried out by using Clearmix (product name: CLM-2.2S, rotor: R1, screen: S0.8-48, manufactured by M. Technique Co., Ltd.) at beaker in Experimental Examples C was subjected to the dispersion process with a batch system and then to the removal process by the membrane filtration, wherein the both processes were carried out separately. Meanwhile, Experimental Examples C4 correspond to Comparative Examples of the present invention. Specifically, 14 kg (about 14 L) of the oxide fine particle dispersion solution that was ejected from the separation processing equipment and recovered in the beaker was charged into the storing vessel 130, and then it was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. The temperature of the oxide fine particle dispersion solution during the dispersion process was in the range of 22 to 24° C. After completion of the dispersion process, by using the equipment not having the disperser 102 and the dispersing vessel 101 in the equipment described in FIG. 1(A), namely not having the dispersion processing equipment 110, the filtration was carried out by directly sending the oxide fine particle dispersion solution filled in the storing vessel 130 to the removing unit 120 by using the pump 104. The filtration membrane, washing solution, pump, and so forth that were used in this process were the same as those used in Experimental Examples C1 to C3. Meanwhile, the time from completion of the dispersion process to start of the filtration took 20 minutes; and at the time when the filtration was started, the aggregate of the oxide fine particles and the precipitation thereof had already been clearly seen. In the membrane filtration process, the oxide fine particle dispersion solution was withdrawn from the process equipment at the time when the oxide fine particle dispersion solution in the storing vessel became 1.5 L (about 1.5 kg); and then, pH, conductivity, dispersion property, and dispersion stability of the oxide fine particle dispersion solution were confirmed. By adding 13.5 L of pure water into the storing vessel 130, this procedure was repeated to carry out the reformation process of the oxide fine particle dispersion solution. The results thereof are summarized in Table C6.

TABLE C6

| Experimental Example | Processing times [times] | pH | pH [° C.] | Conductivity [µS/cm] | Dispersion Stability Initial precipitation confirmation [° C.] time | Precipitation degree |
|---|---|---|---|---|---|---|
| C4-1 | 0 | 12.50 | 21.6 | 9540 | 21.6 0.2 hour | F |
| C4-2 | 3 | 10.86 | 26.3 | 421 | 26.3 0.5 hour | F |
| C4-3 | 5 | 8.08 | 23.9 | 8.36 | 23.9 1 hour | F |
| C4-4 | 10 | 7.69 | 23.4 | 7.55 | 23.4 4 hours | F |
| C4-5 | 15 | 7.16 | 23.3 | 5.69 | 23.3 7 hours | E |
| C4-6 | 20 | 7.06 | 23.4 | 4.01 | 23.4 1 day later | D |
| C4-7 | 30 | 7.04 | 23.1 | 3.21 | 23.1 1 day later | D |

As can be seen in Table C6, the reformation process was carried out until pH of the oxide fine particle dispersion solution reached 7.04. However, even if this process was repeated, it was difficult to lower the pH to the value less than 7.04. In addition, even when the washing was carried out to bring its pH to that of Experimental Examples C1, similar dispersion property and dispersion stability to those of Experimental Examples C1 could not be confirmed. This is because in Experimental Examples C4, the dispersion process with the batch system and the removal process with the membrane filtration were separately carried out, the removal process to remove the impurities from the dispersion solution by the removing unit could not be carried out before the fine particles were re-aggregated entirely by the impurities.

(Preparation of Dispersion Solutions to be Used for Experimental Examples C5 and C6)

Experimental Examples C5 and C6 were carried out by using the oxide fine particle dispersion solution different from those of Experimental Examples C1 to C4. As the previous processes before obtaining the dispersion solutions to be used for Experimental Examples C5 and C6, the oxide raw material solution and the oxide separating solvent each were prepared by using Clearmix (product name: CLM-2.2S, manufactured by M. Technique Co., Ltd.), which is the high speed rotational dispersion emulsifier. Specifically, according to the prescription of the second fluid (B-solution) described in Table C7, each component of the oxide raw material solution were uniformly mixed by stirring for 30 minutes by using Clearmix with the rotation number of the rotor thereof being 20000 rpm and at the preparation temperature of 70° C. to obtain the oxide raw material solution. The oxide separating solvent according to the prescription of the first fluid (A-solution) described in Table C7 was only the solvent not having other substances dissolved therein; thus, nothing was especially carried out for preparation thereof. Meanwhile, the substances represented by chemical formula or abbreviation described in Table C7 are MeOH for methanol (manufactured by Godo Co., Ltd.), KOH for potassium hydroxide (manufactured by Nippon Soda Co., Ltd.), and ZnO for zinc oxide (manufactured by Kanto Chemical Co., Ltd.).

Next, the oxide raw material solution and the oxide separating solvent, both having been prepared as described above, were mixed by using the separation processing equipment illustrated in FIG. 1(B). Specifically, the oxide separating solvent was introduced as the A-solution into between the processing surfaces 1 and 2; and with operating the processing member 10 with the rotation number of 1700 rpm, the oxide raw material solution was introduced as the B-solution into the processing surfaces 1 and 2 so as to mix the oxide separating solvent and the oxide raw material solution in a thin film fluid, whereby the oxide fine particles were separated in between the processing surfaces 1 and 2, and thereby the fluid including the oxide fine particles (hereunder, oxide fine particle dispersion solution) was ejected from between the processing surfaces 1 and 2 of the separation processing equipment. The ejected oxide fine particle dispersion solution was recovered in a beaker via the vessel v.

In Table C8, operation conditions of the separation processing equipment are summarized. The introduction temperatures (supply temperatures) and introduction pressures (supply pressures) of the A-solution and B-solution described in Table C8 were measured by using the thermometers and pressure meters installed in the sealed introduction paths to between the processing surfaces 1 and 2 (first introduction part d1 and second introduction part d2), wherein the introduction temperature of the A-solution in Table C8 is the temperature of the actual A-solution under the introduction pressure in the first introduction part d1, and the introduction temperature of the B-solution is the temperature of the actual B-solution under the introduction pressure in the second introduction part d2.

Measurement of pH was made by using a pH meter (catalogue No. C-71; manufactured by HORIBA, Ltd.). Before the A-solution and B-solution were introduced into the separation processing equipment, pH of these solutions were measured at room temperature. Because pH measurement of the mixed fluid immediately after the oxide raw material solution was mixed with the oxide separating solvent was difficult, pH of the oxide fine particle dispersion solution which was ejected from the equipment and recovered in the beaker was measured at room temperature.

TABLE C7

| The prescription of the first fluid (A-solution) | | | | | The prescription of the second fluid (B-solution) | | | | | | | |
|---|---|---|---|---|---|---|---|---|---|---|---|---|
| Prescription | | | | | | Prescription [wt %] | | | | | pH | |
| [wt %] | | pH | | | [wt %] | | | | | | | |
| Material | [wt %] | Material | [wt %] | | Material | [wt %] | Material | [wt %] | Material | [wt %] | pH | [° C.] |
| Oxide separating solvent | MeOH | 100.00 | 7.0 | 25.4 | Oxide raw material solution | ZnO | 3.00 | KOH | 46.00 | Pure Water | 50.40 | >14 | — |

TABLE C8

| Introduction flow amount (supply flow amount) ml/min | | Introduction temperatures (supply temperatures) [o° C.] | | Introduction pressures (supply pressures) [MPaG] | | Discharged solution | | Particle diameter (D) [nm] |
|---|---|---|---|---|---|---|---|---|
| A solution | B solution | A solution | B solution | A solution | B solution | pH | Temperature | |
| 450 | 40 | 17 | 45 | 0.063 | 0.10 | >14 | — | 10.14 |

Experimental Examples C5

The reformation experiments of the dispersion solutions relating to Experimental Examples C5 correspond to Example of the present invention.

In the process of reforming the dispersion solution, from the oxide fine particle dispersion solution which was ejected from the separation processing equipment and then recovered in the beaker, impurities were removed and pH thereof was controlled by using the dispersion solution reformation equipment 100 illustrated in FIG. 1(A), whereby the reformation process of the oxide fine particle dispersion solution was carried out. In Table C12, the conditions of the above procedure are summarized. The process was carried out with the same procedure as that of Experimental Examples C1 except for the conditions described in Table C12.

During the time of continuing the above-mentioned reformation process, part of the oxide fine particle dispersion solution was withdrawn from the storing vessel 130 at an interval; and these were designated as Experimental Examples C5-1 to C5-7. Concentration of the oxide fine particles in all the oxide fine particle dispersion solutions under the conditions of Experimental Examples C5-1 to C5-7 was 4.0% by weight as ZnO. In Table C9, results of Experimental Examples C5 as well as pH and conductivity of the oxide fine particle dispersion solution during the reformation process of the oxide fine particle dispersion solution are summarized. By carrying out the reformation process, pH and conductivity of the oxide fine particle dispersion solution approached almost the same values as those of MeOH used in the reformation process. Part of the oxide fine particle dispersion solution was withdrawn from each of Experimental Examples C5-1 to C5-7 under the conditions described in Table C9. The part of the withdrawn oxide fine particle dispersion solution each was diluted with propylene glycol (hereunder, PG), and this diluted solution was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. The part of the PG dispersion solution of the oxide fine particles thus obtained was diluted with isopropyl alcohol (hereunder, IPA), and then it was processed with an ultrasonic cleaning machine for 5 minutes. Then, the solution thus obtained was dropped onto a collodion film and dried in an atmosphere for 4 hours to obtain the sample for TEM observation. The rest of the PG dispersion solution of the oxide fine particles was subjected to the UV-Vis spectrum measurement.

(UV-Vis Spectrum)

For measurement of the UV-Vis spectrum, a UV-Vis absorption spectrophotometer (product name: UV-2450, manufactured by Shimadzu Corp.) was used. The transmission spectrum was measured with the measurement range of 200 nm to 800 nm, with the sampling rate of 0.2 nm, and with a slow measurement rate. For the transmission spectrum measurement, the dispersion solution obtained by dispersing the zinc oxide into PG with the concentration thereof being $1.9 \times 10^{-3}$ mol/L (as ZnO) was used as the measurement sample.

TABLE C9

| Experimental Example | Processing duration [h] | pH | | Conductivity | | Dispersion Stability | |
|---|---|---|---|---|---|---|---|
| | | pH | [° C.] | [μS/cm] | [° C.] | Initial precipitation confirmation time | Precipitation degree |
| C5-1 | 0 | >14 | 21.6 | 3233 | 21.6 | 0.2 hour | F |
| C5-2 | 0.14 | 13.21 | 23.9 | 231 | 23.9 | 2 hours | F |

TABLE C9-continued

| | | Dispersion Stability | | | | |
|---|---|---|---|---|---|---|
| Experimental Example | Processing duration [h] | pH pH | pH [° C.] | Conductivity [µS/cm] | Initial precipitation confirmation [° C.] time | Precipitation degree |
| C5-3 | 1.59 | 8.23 | 23.9 | 6.41 | 23.9 1 week | B |
| C5-4 | 2.16 | 7.76 | 23.9 | 5.31 | 23.4 1 week | B |
| C5-5 | 3.16 | 7.31 | 23.9 | 3.26 | 23.4 1 week | A |
| C5-6 | 4.48 | 7.21 | 23.9 | 2.14 | 23.4 1 week | A |
| C5-7 | 5.90 | 7.02 | 23.9 | 1.84 | 23.6 1 week | A |

(Dispersion Stability and Self-Dispersion Property)

In the oxide fine particle dispersion solutions of Experimental Examples C5-1 and C5-2, clear precipitation of the oxide fine particles was found at 2 hours of the static state after the withdrawal, wherein the phase including the oxide fine particles and the phase not substantially including the oxide fine particles were separated. In Experimental Examples C5-3 and C5-4, precipitation of the oxide fine particles was faintly observed at 1 week of the static state after the withdrawal. In the oxide fine particle dispersion solution of Experimental Examples C5-5 to C5-7, deposition of an extremely minute amount of the oxide fine particles was observed at 1 week of the static state after the withdrawal, but the precipitation amount thereof was about 0.2% by weight relative to the oxide fine particles included in the dispersion solution. It became clear that the dispersion stability of the oxide fine particle dispersion solution can be enhanced by controlling pH of the oxide fine particle dispersion solution in the range of 7.0 and 8.5 by using the dispersion solution reformation equipment of the present invention. Furthermore, with regard to Experimental Example C5-5 to C5-7, it was confirmed that the precipitation of the oxide fine particles at 2 weeks of the static state after the withdrawal decreased, wherein the deposition could not be substantially confirmed, from the deposition thereof at 1 week of the static state after the withdrawal. In the oxide fine particles in the oxide fine particle dispersion solution whose pH was adjusted in the range of 7.0 to 7.5 in Experimental Example C5-5 to C5-7, the deposited fine particles once generated during 1 week of the static state was re-dispersed without carrying out any dispersion process, so that it was presumed that the dispersion solution included the oxide fine particles having self-dispersion property.

(TEM Observation)

Figure 14:
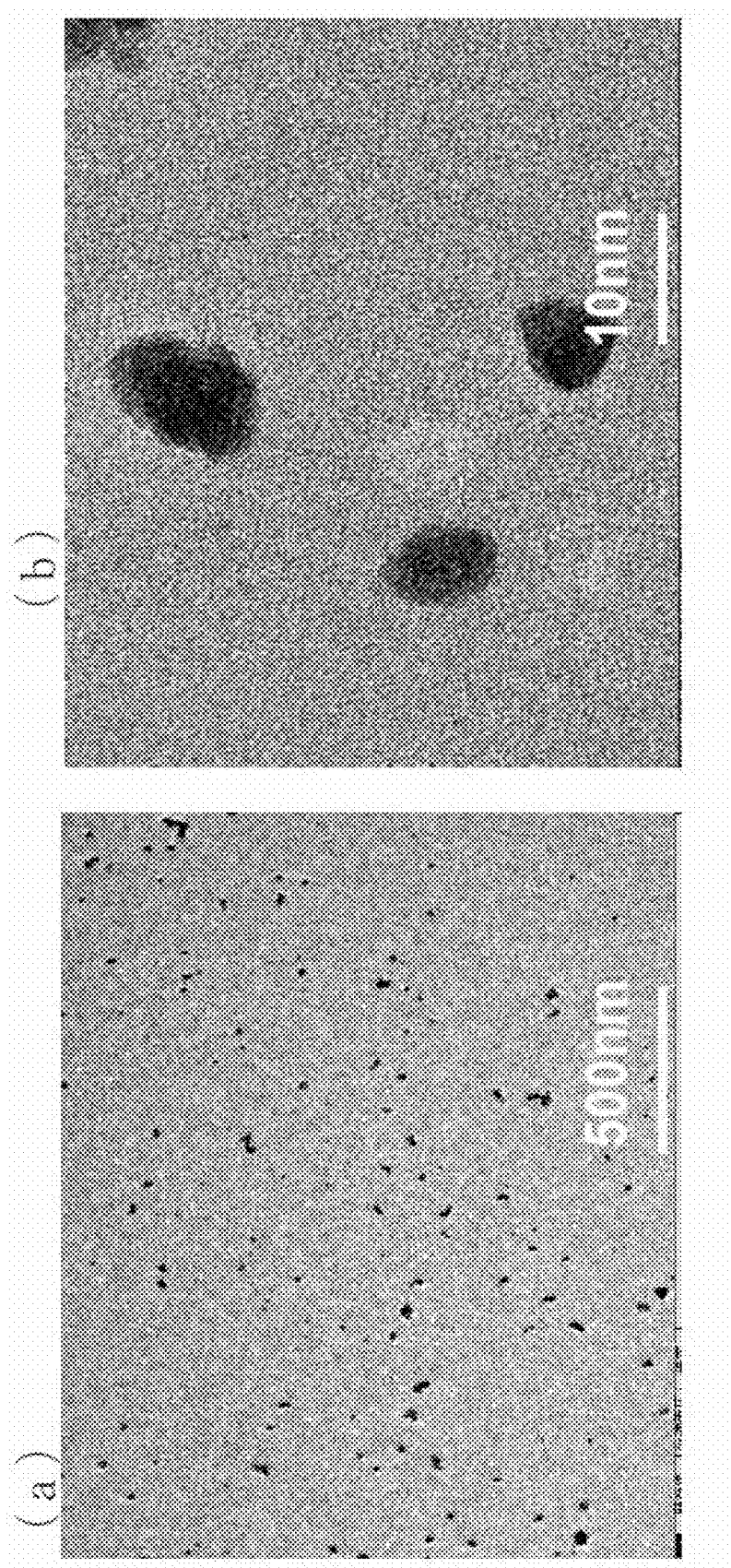
FIG. 14
These are the TEM pictures of the oxide fine particles in the oxide fine particle dispersion solution obtained in Experimental Example C5-6 of the present invention. Meanwhile, (a) and (b) are the observation results with the magnification of 10000 and 250000, respectively.

The TEM pictures of the oxide fine particles of Experimental Example C5-6 are shown in FIG. 14. From the TEM picture of FIG. 14(a), it was confirmed that the oxide fine particles were uniformly dispersed. From the TEM picture of FIG. 14(b), it was confirmed that the primary particle's diameter thereof was about 10 nm. Similar results were obtained in the oxide fine particles of Experimental Examples C5-5 and C5-7 (not shown by the drawing).

Figure 15:
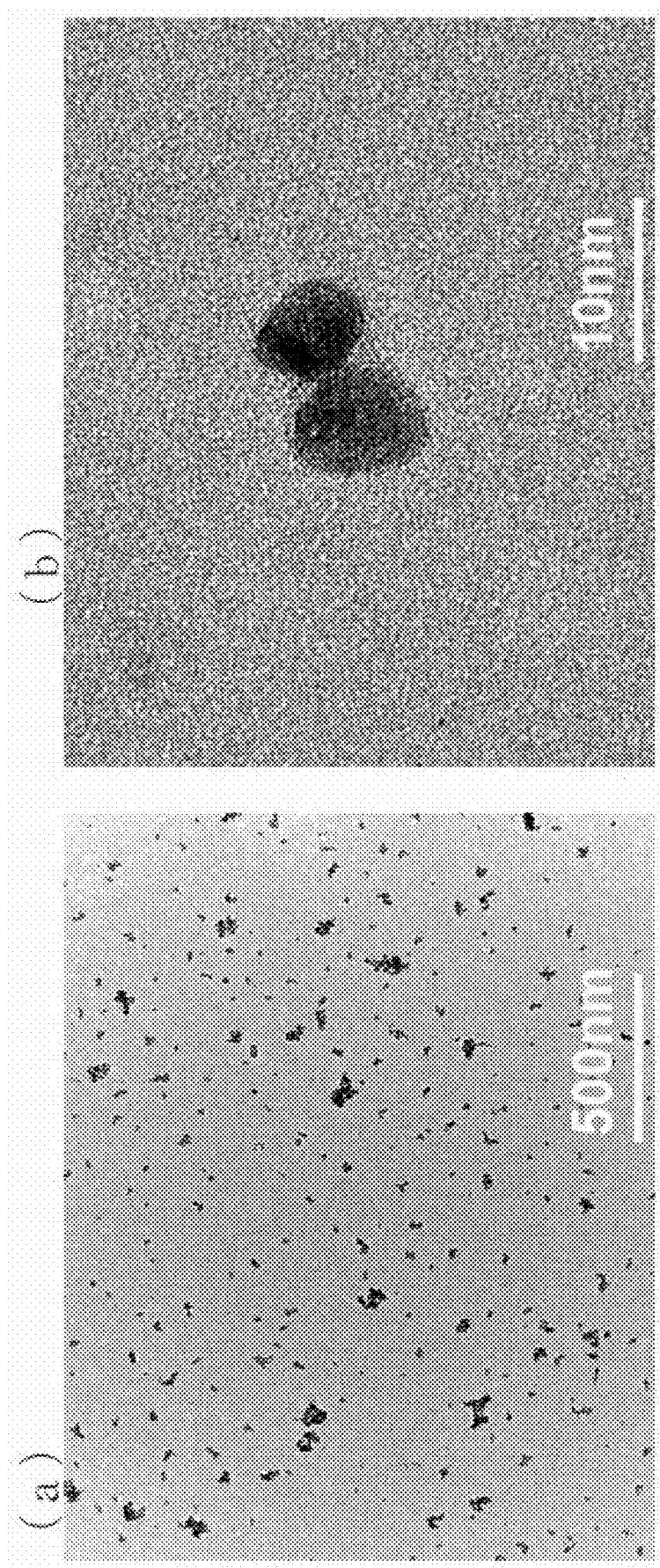
FIG. 15
These are the TEM pictures of the oxide fine particles in the oxide fine particle dispersion solution obtained in Experimental Example C5-3 of the present invention. Meanwhile, (a) and (b) are the observation results with the magnification of 10000 and 250000, respectively.

The TEM pictures of the oxide fine particles of Experimental Example C5-3 are shown in FIG. 15. From the TEM pictures of FIG. 15(a) and FIG. 15(b), it was observed that the oxide fine particles aggregated more as compared with Experimental Example C5-6; however, as compared with the oxide fine particles of Experimental Examples C5-1 and C5-2, number of the aggregates thereof was less, and the oxide fine particles were dispersed uniformly. Similar results were obtained in the oxide fine particles of Experimental Example C5-4 (not shown by the drawing).

Figure 16:
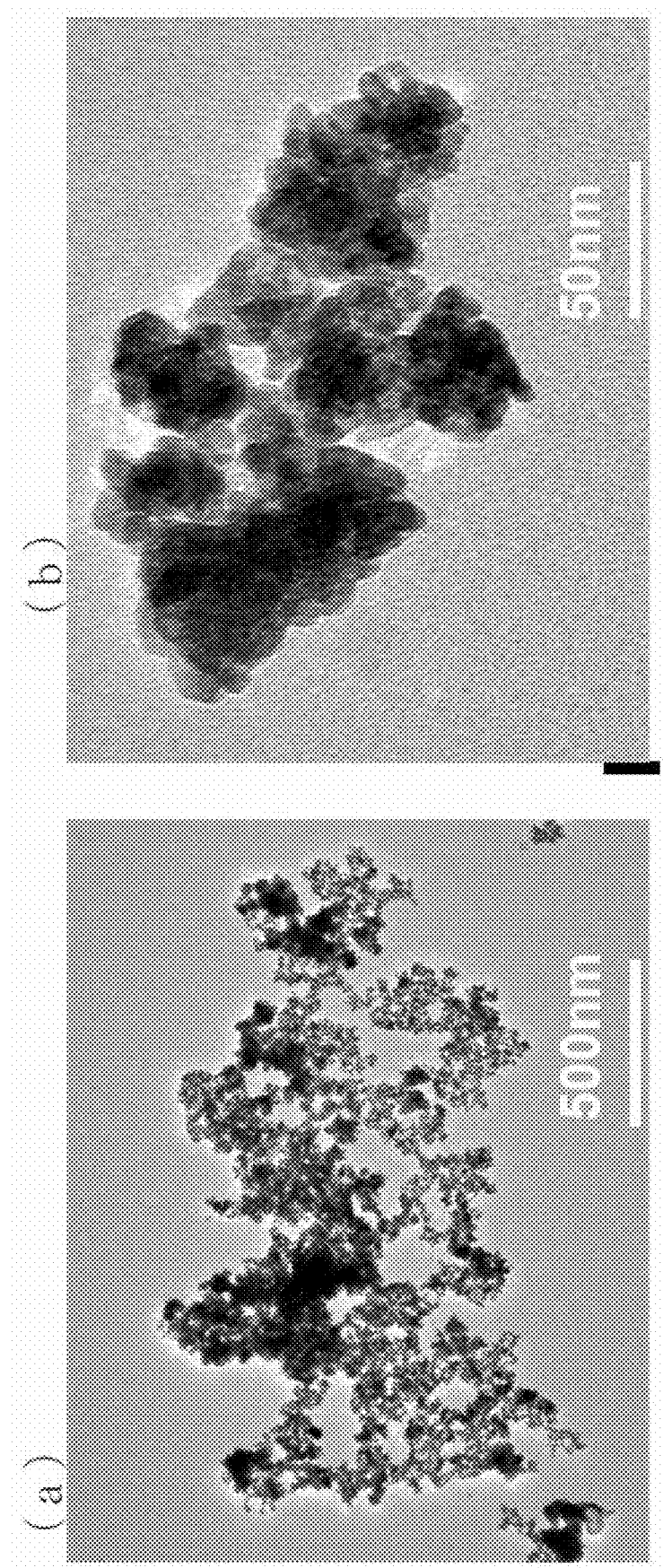
FIG. 16
These are the TEM pictures of the oxide fine particles in the oxide fine particle dispersion solution obtained in Experimental Example C5-2 of the present invention. Meanwhile, (a) and (b) are the observation results with the magnification of 10000 and 100000, respectively.

The TEM pictures of the oxide fine particles of Experimental Example C5-2 are shown in FIG. 16. From the TEM pictures of FIG. 16(a) and FIG. 16(b), it was observed that as compared with Experimental Examples C5-3 and C5-6 the oxide fine particles aggregated with more number of the aggregates. Similar results were observed in the oxide fine particles prepared under the condition of Experimental Example C5-1.

(Measurement of UV-Vis Spectra)

Figure 17:
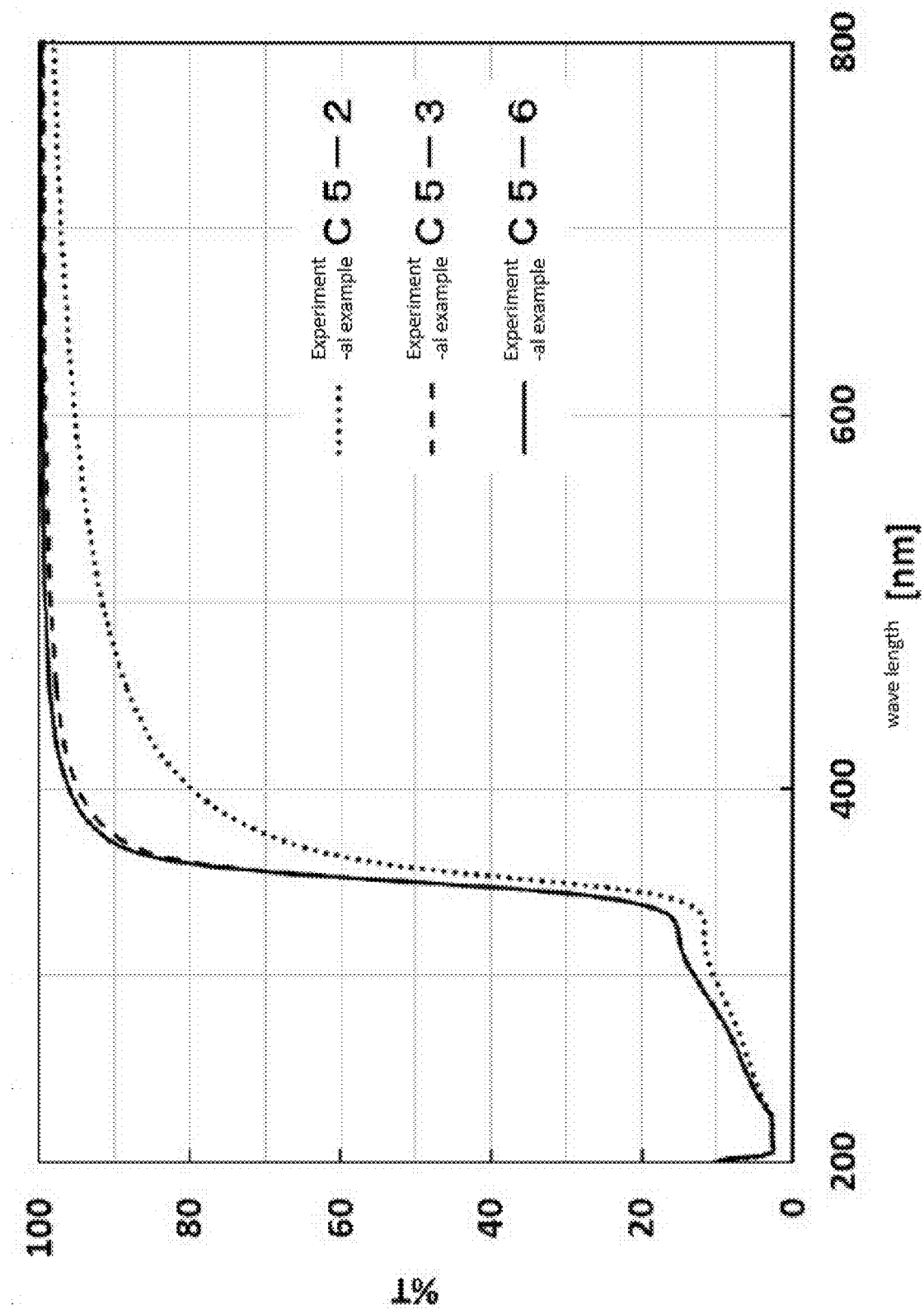
FIG. 17
This is the measurement results of the UV-Vis spectra (transmission spectra) of the propylene glycol dispersion solutions prepared by using oxide fine particle dispersion solutions with the conditions of Experimental Examples C5-2, C5-3, and C5-6 of the present invention.

The measurement results of the UV-Vis spectra (transmission spectra) of the PG dispersion solutions prepared by using the oxide fine particle dispersion solutions of Experimental Examples C5-2, C5-3, and C5-6 are shown in FIG. 17. The PG dispersion solutions prepared by using the oxide fine particle dispersion solutions of Experimental Examples C5-3 and C5-6 showed almost the identical spectrum form, wherein 90% or more of transmittance was observed in the wavelength range of 400 nm to 800 nm. On the other hand, the PG dispersion solution prepared under the condition of Experimental Example C5-2 showed lower transmittance than Experimental Examples C5-3 and C5-6 in the wavelength range of 700 nm to 800 nm. This is presumably because the dispersion property of the oxide fine particles in the oxide fine particle dispersion solution prepared under the condition of Experimental Example C5-2 is poorer than that of Experimental Examples C5-3 and C5-6, the oxide fine particles prepared under the condition of Experimental Examples C5-2 are not uniformly dispersed in the PG dispersion solution thereby forming the aggregates thereof, and thus, they show lower transmittance in the visible light region than the PG dispersion solutions of Experimental Examples C5-3 and C5-6.

As can be seen in the foregoing results, it was found that the dispersion property of the oxide fine particle dispersion solution could be enhanced by preparing the oxide fine particle dispersion solution by using the equipment comprising the disperser and the equipment with which impurities were removed from the oxide fine particle dispersion solution with the cross-flow method using the filtration membrane, and by controlling pH or conductivity on the basis of the processing time of the oxide fine particle dispersion solution. In addition, it was found that the dispersion property of the oxide fine particle dispersion solution could be enhanced wherein the dispersion solution was prepared by using the obtained oxide fine particle dispersion solution and other dispersing medium. Further, it was found that the dispersion property of the oxide fine particle dispersion solution could be controlled by controlling pH or conductivity of the dispersion solution after the removal process of the impurities in the reformation method of the dispersion solution of the present invention.

Experimental Examples C6

The reformation experiments of Experimental Examples C6 correspond to Comparative Examples of the present invention.

In Experimental Examples C6, the reformation process of the oxide fine particle dispersion solution was carried out by the same method as that of Experimental Examples C5, except that the disperser and the dispersing vessel in the equipment illustrated in FIG. 1(A) were removed, thereby the filtration was carried out by directly sending the oxide fine particle dispersion solution filled in the storing vessel 130 to the removing unit 120 by using the pump 104. The results of Experimental Examples C6 are summarized in Table C10.

TABLE C10

| Experimental Example | Processing duration [h] | pH pH | pH [° C.] | Conductivity [µS/cm] | Conductivity [° C.] | Dispersion Stability Initial precipitation confirmation time | Precipitation degree |
|---|---|---|---|---|---|---|---|
| C6-1 | 0 | >14 | 21.6 | 3233 | 21.6 | 0.2 hour | F |
| C6-2 | 0.28 | 13.46 | 24.3 | 332 | 24.3 | 0.5 hour | F |
| C6-3 | 1.14 | 9.97 | 24.1 | 15.60 | 24.1 | 1 hour | F |
| C6-4 | 2.39 | 8.79 | 24.3 | 11.29 | 24.3 | 2 hours | F |
| C6-5 | 3.34 | 8.19 | 24.3 | 5.79 | 24.3 | 5 hours | F |
| C6-6 | 4.98 | 7.71 | 24.1 | 5.29 | 24.1 | 11 hours | E |
| C6-7 | 5.28 | 7.59 | 24.3 | 4.39 | 24.3 | 17 hours | E |

As described in Table 010, the reformation process was carried out until pH of the oxide fine particle dispersion solution reached 7.59. However, it was difficult to bring the pH thereof to lower than 7.59 even if the process was repeated. Further, even in the case of the oxide fine particle dispersion solutions (Experimental Examples C6-5 to C6-7) in which the reformation process was carried out until pH reached to that of Experimental Examples C5, similar dispersion property and dispersion stability to those of the oxide fine particle dispersion solution as obtained in Experimental Examples C5 could not be confirmed.

Experimental Examples C7

In Experimental Examples C7, the oxide fine particle dispersion solution used in Experimental Examples C5 was subjected to the dispersion process with a batch system and then to the removal process by the membrane filtration, wherein the both processes were carried out separately. Meanwhile, Experimental Examples C7 correspond to Comparative Examples of the present invention.

Specifically, 14 kg (about 14 L) of the oxide fine particle dispersion solution that was ejected from the separation processing equipment and recovered in the beaker was charged into the storing vessel 130, and then it was subjected to the dispersion process by using Clearmix (product name: CLM-2.2S, rotor: R1, screen: S0.8-48, manufactured by M. Technique Co., Ltd.) at 20000 rpm (circumferential velocity of 31.4 m/sec) for 30 minutes. The temperature of the oxide fine particle dispersion solution during the dispersion process was in the range of 23 to 24° C. After completion of the dispersion process, by using the equipment not having the disperser 102 and the dispersing vessel 101 in the equipment described in FIG. 1(A), namely not having the dispersion processing equipment 110, the filtration was carried out by directly sending the oxide fine particle dispersion solution filled in the storing vessel 130 to the removing unit 120 by using the pump 104. The filtration membrane, washing solution, pump, and so forth that were used in this process were the same as those used in Experimental Examples C1 to C4. Meanwhile, the time from completion of the dispersion process to start of the filtration took 20 minutes; and at the time when the filtration was started, the aggregate of the oxide fine particles and the precipitation thereof had already been clearly seen. In the membrane filtration process, the oxide fine particle dispersion solution was withdrawn from the process equipment at the time when the oxide fine particle dispersion solution in the storing vessel became 1.5 L (about 1.2 kg); and then, pH, conductivity, dispersion property, and dispersion stability of the oxide fine particle dispersion solution were confirmed. By adding 13.5 L of MeOH into the storing vessel 130, this procedure was repeated to carry out the reformation process of the oxide fine particle dispersion solution. The results thereof are summarized in Table C11.

TABLE C11

| Experimental Example | Processing times [times] | pH pH | pH [° C.] | Conductivity [µS/cm] | Conductivity [° C.] | Dispersion Stability Initial precipitation confirmation time | Precipitation degree |
|---|---|---|---|---|---|---|---|
| C7-1 | 0 | 12.50 | 21.6 | 9540 | 21.6 | 0.2 hour | F |
| C7-2 | 3 | 10.86 | 26.3 | 421 | 26.3 | 0.5 hour | F |
| C7-3 | 5 | 8.08 | 23.9 | 8.36 | 23.9 | 1 hour | F |
| C7-4 | 10 | 7.69 | 23.4 | 7.55 | 23.4 | 4 hours | F |
| C7-5 | 15 | 7.16 | 23.3 | 5.69 | 23.3 | 7 hours | E |
| C7-6 | 20 | 7.06 | 23.4 | 4.01 | 23.4 | 1 day later | D |
| C7-7 | 30 | 7.04 | 23.1 | 3.21 | 23.1 | 1 day later | D |

As can be seen in Table C11, the reformation process was carried out until pH of the oxide fine particle dispersion solution reached 7.88. However, even if this process was repeated, it was difficult to lower the pH to the value less than 7.88. In addition, even when the washing was carried out to bring its pH to that of Experimental Examples C4, similar dispersion property and dispersion stability to those of Experimental Examples C4 could not be confirmed. This is because in Experimental Examples C7, the dispersion process with the batch system and the removal process with the membrane filtration were separately carried out, the removal process to remove the impurities from the dispersion solution by the removing unit could not be carried out before the fine particles were re-aggregated entirely by the impurities.

TABLE C12

|   |   | Experimental example C1 | Experimental example C2 | Experimental example C3 | Experimental example C5 | Experimental example C6 |
|---|---|---|---|---|---|---|
|   | Processed liquid | Oxide fine particle dispersion solution: Solution of iron oxide fine particle whose surface is covered with a silicon oxide | Same as on the left | Same as on the left | MeOH 15 L (≈12 kg) | Same as on the left |
| (1) | First solution charged into the storing vessel 130 | Type: Pure Water, pH 5.89 (measurement temperature of 22.4° C.), Conductivity 0.80 μS/cm (measurement temperature of 22.4° C.), Charged amount 15 kg | Same as on the left | Same as on the left | Type:MeOH, pH 7.00 (measurement temperature of 23.5° C.), Conductivity 0.01 μS/cm (measurement temperature of 23.5° C.), Flow amount: 0.7 L/h, 24° C. | Same as on the left |
| (2) | Type, flow amount, and temperature of the cross-flow washing solution | Type: Pure Water, pH 5.89 (measurement temperature of 22.4° C.), Conductivity 0.80 μS/cm (measurement temperature of 22.4° C.), Flow amount 1.5 L/min, 21° C. | Same as on the left | Same as on the left | Same as on the left | Same as on the left |
| (3) | Disperser 102 | Clearmix (product name: CLM-2.2S, rotor: R1, screen: S0.8-48, manufactured by M. Technique Co., Ltd.) | Not installed | Clearmix (product name: CLM-2.2S, rotor: R1, screen: S0.8-48, manufactured by M. Technique Co., Ltd.) | Same as on the left | Not installed |
| (4) | Removing unit 120 | Hollow fiber type dialyzer (product name; APS-21MD New, membrane area; 2.1 m$^2$, material; polysulfone, manufactured by Asahi Kasei Medical Co., Ltd.) | Same as on the left | Same as on the left | Same as on the left | Same as on the left |
| (5) | Rotation number of the rotor | 20000 rpm (circumferential velocity of 31.4 m/sec) | 4500 rpm (circumferential velocity of 23.6 m/sec) | 10000 rpm (circumferential velocity of 7.9 m/sec) | — | — |
| (6) | Starting to charge the metal fine particle dispersion solution | When the pure water in the storing vessel 130 was discharged until 1 L. | Same as on the left | Same as on the left | Same as on the left | Same as on the left |
| (7) | Amount of the metal fine particle dispersion solution charged into the storing vessel 130 | 14 L ((≈14 kg) | Same as on the left | Same as on the left | 15 L (≈12 kg) | Same as on the left |
| (8) | pH of the metal fine dispersion solution in the storing vessel 130 | 12.50 (measurement temperature of 21.6° C.) | Same as on the left | Same as on the left | Same as on the left | Same as on the left |
| (9) | Conductivity of the oxide fine particle dispersion solution in the storing vessel 130 | 9540 μS/cm (measurement temperature of 21.6° C.) | Same as on the left | Same as on the left | 3233 μS/cm (measurement temperature of 22.6° C.) | Same as on the left |
| (10) | Flow amount of the pump 104 | 4.4 L/min | Same as on the left | Same as on the left | Same as on the left | Same as on the left |
| (11) | Flow amount of the metal fine dispersion solution returned to the storing vessel 130 | 3.7 L/min | Same as on the left | Same as on the left | Same as on the left | Same as on the left |

TABLE C12-continued

|  |  | Experimental example C1 | Experimental example C2 | Experimental example C3 | Experimental example C5 | Experimental example C6 |
|---|---|---|---|---|---|---|
| (12) | Amount of the filtrate L3 discharged by the removing unit 120 (Calculated value) | 0.7 L/min | Same as on the left | Same as on the left | Same as on the left | Same as on the left |
| (13) | Timing of charging the dilution into the storing vessel 130 | When the dispersion solution in the storing vessel 130 was concentrated to 1.5 L (about 1.5 kg). | Same as on the left | Same as on the left | Same as on the left | Same as on the left |
| (14) | Type and amount of the second dilution charged into the storing vessel 130 | Type: pure water, 3 L (≈3.0 kg), (pH: 5.89 (measurement temperature of 22.4° C.), conductivity: 0.80 μS/cm (measurement temperature of 23.1° C.)), Charged amount:13.5 L(≈13.5 kg) | Same as on the left | Same as on the left | Same as on the left | Same as on the left |
| (15) | Concentration of the oxide fine particles in the oxide fine particle dispersion solution | Between 0.4 wt % to 2.0 wt % | Same as on the left | Same as on the left | Between 1.0 wt % to 10.0 wt % | Same as on the left |
| (16) | Pressure meters | Pa: Both two 0.10 MPaG | Same as on the left | Same as on the left | Same as on the left | Same as on the left |
| (17) | Pressure meters | Pb: 0.15 MPaG | Same as on the left | Same as on the left | Same as on the left | Same as on the left |
| (18) | Pressure meters | Pc: 0.02 MPaG | Same as on the left | Same as on the left | Same as on the left | Same as on the left |
| (19) | Path length (Lea) | 0.3 m | — | Same as on the left | Same as on the left | — |
| (20) | Pipe's inner diameter (Leb) | 0.0105 m | — | 0.0105 m | Same as on the left | — |
| (21) | Flow rate of the fine particle dispersion solution in the just-before transporting path | 1.2 m/sec | — | 1.2 m/sec | Same as on the left | — |
| (22) | Time T1 from the dispersing vessel 101 to start of removal of the impurity by the removing unit 120 | 0.24 sec | — | 0.24 sec | Same as on the left | — |
| (23) | Thermometer installed in the dispersing vessel 101 | From 22° C. to 24° C. | Same as on the left | Same as on the left | From 23° C. to 24° C. | Same as on the left |
| (24) | Temperature of the metal fine particle dispersion solution | From 22° C. to 24° C. | Same as on the left | Same as on the left | From 23° C. to 24° C. | Same as on the left |
| (25) | Conductivity meter | Conductivity meter (catalogue number; ES-51, manufactured by HORIBA, Ltd.) | Same as on the left | Same as on the left | Same as on the left | Same as on the left |

EXPLANATION OF SYMBOLS a Oxide fine particle
b Aggregate
c Impurity
d Filtration membrane
E Physical energy

The invention claimed is:

1. A method for reforming a fine particle dispersion solution, wherein the fine particle dispersion solution includes aggregate of the fine particle, and impurities comprising in-solution impurities present in the dispersion solution independent of the aggregate and in-particle impurities present in the aggregate, the method comprising the steps of:
performing a dispersion process, comprising:
applying a physical energy from a disperser to the aggregate of the fine particle included in the fine particle dispersion solution;
dispersing the aggregate of the fine particle to smaller particles compared with the aggregate of the fine particles; and
discharging the in-particle impurities from the aggregate into the dispersion solution, the discharged in-particle impurities becoming in-solution impurities;
transporting the dispersion solution after the dispersion process to a removing unit via a transporting path; and
performing a removal process to remove the in-solution impurities including the discharged in-particle impurities from the step of discharging, from the dispersion solution by the removing unit,
wherein the removal process to remove the in-solution impurities including the discharged in-particle impurities from the step of discharging from the dispersion solution is started by the removing unit within 3 seconds after the in-particle impurities are discharged into the dispersion solution.

2. The method for reforming the fine particle dispersion solution according to claim 1, wherein the dispersion process and the removal process are carried out continuously and repeatedly.

3. The method for reforming the fine particle dispersion solution according to claim 1, wherein the removing unit is equipped with a filtration membrane, and the in-solution impurities are removed from the dispersion solution by using the filtration membrane.

4. The method for reforming the fine particle dispersion solution according to claim 3, wherein the filtration membrane is an ultrafiltration membrane, and the dispersion solution is supplied to the filtration membrane to carry out filtration by a cross-flow method so that the in-solution impurities are removed from the dispersion solution.

5. The method for reforming the fine particle dispersion solution according to claim 1, wherein the dispersion process is performed by the disperser being a rotation type disperser which rotates a stirring blade in the dispersion solution, and the dispersion process is carried out with setting a circumferential velocity of the stirring blade at 10 m/sec or more.

6. The method for reforming the fine particle dispersion solution according to claim 1, further comprising controlling dispersion property of the fine particles in the fine particle dispersion solution by controlling pH of the fine particle dispersion solution obtained after the removal process.

7. The method for reforming the fine particle dispersion solution according to claim 1, wherein a primary particle diameter of the fine particle is 200 nm or less.

8. The method for reforming the fine particle dispersion solution according to claim 1, wherein the fine particle is a metal fine particle, an organic substance fine particle, or an oxide fine particle.

9. A method for producing a fine particle dispersion solution, comprising the steps of:
 providing a processing device comprising processing surfaces which are disposed and configured to approach to and separate from each other, at least one of the processing surfaces rotating relative to the other of the processing surfaces;
 mixing a fine particle raw material solution including at least a raw material of the fine particle and a fine particle separating solvent including at least a fine particle separating substance to separate the fine particle in a space between the processing surfaces to form a mixed fluid;
 separating the fine particle in the mixed fluid, forming the fine particle dispersion solution; and
 performing the method for reforming the fine particle dispersion solution according to claim 1.

10. A method for reforming a fine particle dispersion solution, wherein the fine particle dispersion solution includes aggregate of the fine particle, and impurities comprising in-solution impurities present in the dispersion solution independent of the aggregate and in-particle impurities present in the aggregate, the method comprising the steps of:
 performing a dispersion process, comprising:
  applying a physical energy from a disperser to the aggregate of the fine particle included in the fine particle dispersion solution;
  dispersing the aggregate of the fine particle to smaller particles compared with the aggregate of the fine particles; and
  discharging the in-particle impurities from the aggregate into the dispersion solution, the discharged in-particle impurities becoming in-solution impurities;
 performing a removal process to remove the in-solution impurities including the discharged in-particle impurities from the step of discharging, from the dispersion solution by a removing unit within 3 seconds after the in-particle impurities are discharged into the dispersion solution; and
 controlling dispersion property of the fine particles in the fine particle dispersion solution by controlling pH of the fine particle dispersion solution obtained after the removal process.

* * * * *